US012158149B2

(12) United States Patent
Koh et al.

(10) Patent No.: US 12,158,149 B2
(45) Date of Patent: Dec. 3, 2024

(54) FLUID TRANSFER APPARATUS

(71) Applicant: KOREA ATOMIC ENERGY RESEARCH INSTITUTE, Daejeon (KR)

(72) Inventors: Yongkwon Koh, Daejeon (KR); Jangsoon Kwon, Goyang-si (KR); Kijong Jang, Daejeon (KR)

(73) Assignee: KOREA ATOMIC ENERGY RESEARCH INSTITUTE, Gyeonggi-do (KR)

( * ) Notice: Subject to any disclaimer, the term of this patent is extended or adjusted under 35 U.S.C. 154(b) by 556 days.

(21) Appl. No.: 17/427,440

(22) PCT Filed: Oct. 4, 2019

(86) PCT No.: PCT/KR2019/012998
§ 371 (c)(1),
(2) Date: Jul. 30, 2021

(87) PCT Pub. No.: WO2020/159033
PCT Pub. Date: Aug. 6, 2020

(65) Prior Publication Data

US 2022/0127997 A1 Apr. 28, 2022

(30) Foreign Application Priority Data

Feb. 1, 2019 (KR) ........................ 10-2019-0014104

(51) Int. Cl.
*F04C 2/22* (2006.01)
*F01C 21/10* (2006.01)
(Continued)

(52) U.S. Cl.
CPC .............. *F04C 2/22* (2013.01); *F01C 21/108* (2013.01); *F02B 53/00* (2013.01); *F04C 2/344* (2013.01);
(Continued)

(58) Field of Classification Search
CPC ...... F04C 23/001; F04C 2/344; F04C 11/001; F04C 15/00; F04C 15/0049; F04C 18/22;
(Continued)

(56) References Cited

U.S. PATENT DOCUMENTS 3,883,273 A * 5/1975 King ..................... F04C 23/001
418/60
4,973,233 A * 11/1990 Kurio .................... F01C 11/002
29/888.012
(Continued)

FOREIGN PATENT DOCUMENTS

EP 943799 A2 * 9/1999 .......... F04B 11/0016
EP 3012452 A1 * 4/2016 ................ F04B 1/12
(Continued)

OTHER PUBLICATIONS

International Search Report for International Application No. PCT/KR2019/012998 dated Jan. 15, 2020.
(Continued)

*Primary Examiner* — Wesley G Harris
(74) *Attorney, Agent, or Firm* — Harness, Dickey & Pierce, P.L.C.

(57) ABSTRACT

The present invention provides a fluid transfer apparatus comprising: a rotating shaft comprising a rotation unit extending along an axial direction and a first eccentric unit and a second eccentric unit disposed to be spaced apart from each other along the axial direction; a first rotor housing forming a first fluid compression space in the shape of an epitrochoid curved surface; a second rotor housing forming a second fluid compression space in the shape of an epitrochoid curved surface, and positioned to be spaced apart from the first rotor housing along the axial direction; a first rotor disposed in the first fluid compression space so as to delimit the first fluid compression space into multiple variable-displacement spaces, and coupled to the first eccentric unit
(Continued)

while surrounding the first eccentric unit in the radial direction of the first eccentric unit; and a second rotor disposed in the second fluid compression space so as to delimit the second fluid compression space into multiple variable-displacement spaces, and coupled to the second eccentric unit while surrounding the second eccentric unit in the radial direction of the second eccentric unit.

18 Claims, 32 Drawing Sheets

(51) Int. Cl.

| | |
|---|---|
| ***F02B 53/00*** | (2006.01) |
| ***F04C 2/344*** | (2006.01) |
| ***F04C 11/00*** | (2006.01) |
| ***F04C 15/00*** | (2006.01) |
| ***F04C 18/22*** | (2006.01) |
| ***F04C 23/00*** | (2006.01) |
| ***F04C 25/02*** | (2006.01) |
| ***F04C 29/00*** | (2006.01) |

(52) U.S. Cl.
CPC ............ *F04C 11/001* (2013.01); *F04C 15/00* (2013.01); *F04C 15/0049* (2013.01); *F04C 18/22* (2013.01); *F04C 23/001* (2013.01); *F04C 25/02* (2013.01); *F04C 29/00* (2013.01); *F02B 2053/005* (2013.01); *F04C 2210/1005* (2013.01); *F04C 2210/128* (2013.01); *F04C 2210/206* (2013.01); *F04C 2210/208* (2013.01); *F04C 2210/221* (2013.01); *F04C 2240/20* (2013.01); *F04C 2240/30* (2013.01); *F04C 2240/603* (2013.01); *F05B 2210/11* (2013.01); *F05B 2210/12* (2013.01); *F05B 2210/16* (2013.01); *F05B 2240/20* (2013.01)

(58) Field of Classification Search
CPC ................. F04C 29/00; F04C 2240/30; F04C 2240/603; F04C 14/04; F04C 29/0057; F04C 29/12; F04C 2240/20; F04C 2250/30; F04C 15/06; F04C 2/22; F04C 2/08; F04C 13/008; F04C 15/0065; F01C 21/108; F01C 21/106; F02B 53/00; F05B 2210/11; F05B 2260/96
See application file for complete search history.

(56) References Cited

U.S. PATENT DOCUMENTS

| | | | | |
|---|---|---|---|---|
| 6,860,724 | B2 | 3/2005 | Cho et al. | |
| 7,175,401 | B2 | 2/2007 | Cho et al. | |
| 8,707,929 | B2 * | 4/2014 | Thomassin | F01C 21/003 123/245 |
| 2008/0226480 | A1 * | 9/2008 | Ferran | F04C 23/001 418/5 |
| 2011/0300014 | A1 * | 12/2011 | Huang | F04B 39/0055 418/206.5 |
| 2012/0171069 | A1 * | 7/2012 | Huang | F04C 2/16 428/131 |
| 2015/0167668 | A1 | 6/2015 | Zubenin et al. | |

FOREIGN PATENT DOCUMENTS

| | | | | |
|---|---|---|---|---|
| JP | H08233381 | A | 9/1996 | |
| JP | 2000205148 | A | 7/2000 | |
| JP | 3777898 | B2 | 5/2006 | |
| JP | 2018003599 | A | 1/2018 | |
| KR | 100507973 | B1 | 8/2005 | |
| KR | 101655160 | B1 | 9/2016 | |
| KR | 101881546 | B1 | 7/2018 | |
| KR | 101874808 | B1 | 8/2018 | |
| KR | 101915976 | B1 | 11/2018 | |
| KR | 20190018359 | A | 2/2019 | |
| WO | WO-2013162427 | A1 * | 10/2013 | F01C 21/02 |

OTHER PUBLICATIONS

Search Report for Korean Application No. 10-2019-0014104 dated Feb. 7, 2019.
Search Report for Korean Application No. 10-2019-0085938 dated Jun. 4, 2019.
Notice of Allowance for Korean Application No. 10-2019-0014104 dated Apr. 2, 2020.
Notice of Allowance for Korean Application No. 10-2019-0085938 dated Apr. 24, 2020.

* cited by examiner

FLUID TRANSFER APPARATUS

CROSS-REFERENCE TO RELATED APPLICATIONS

This application is the National Stage filing under 35 U.S.C. 371 of International Application No. PCT/KR2019/012998, filed on Oct. 4, 2019, which claims the benefit of earlier filing date and right of priority to Korean Patent Application No. 10-2019-0014104 filed on Feb. 1, 2019, the contents of which are all hereby incorporated by reference herein in their entirety.

BACKGROUND OF THE INVENTION

Field

The present disclosure relates to a fluid transfer apparatus configured to suck, press, and transfer fluid.

Background Art

In 1951, the German engineer Felix Wankel completed a principle of a rotary engine capable of producing power by rotating a triangular rotor. The so-called Wankel engine is an engine in which a triangular rotor rotates eccentrically to realize rotational power while intake, compression, combustion, and exhaust are simultaneously performed according to volume change in three spaces divided by the triangular rotor inside a cylinder having an epitrochoid surface.

The Wankel engine has advantages of having low power loss and achieving high output power and smooth rotation because the engine does not have a reciprocating motion of a piston. Patent Documents, Korean Registration Patent Application No. 10-1655160 (Sep. 1, 2016) and Korean Registration Patent Application No. 10-1881546 (Jul. 18, 2018) disclose a rotary piston pump using such a principle of the Wankel engine. The rotary piston pump disclosed in the patent document has a rotor housing having an inner circumferential surface in an epitrochoid shape, and is configured to repeatedly compress and expand a variable volume space of the rotor housing while a rotor rotates eccentrically in an inner space of the rotor housing.

The rotary piston pump disclosed in the patent document has advantages in that it can transfer a relatively high flow of fluid compared to previous piston pumps, as well as generating high pressure even though it has a simple structure. The rotary piston pump disclosed in the patent document is a positive displacement pump, and airtightness between the rotor housing and the rotor is a very important factor that greatly affects pump performance.

However, the rotary piston pump essentially requires at least a pair of inflow check valves and a pair of outflow check valves to transfer fluid. The rotary piston pump has a simple structure, but requires a spring installation space, a channel connection space, a space for installing a check valve plate or ball due to the two pairs of check valves. In addition, although the rotary piston pump has the advantage of low noise, the repetitive operation of the check valves causes an occurrence of noise, especially, under a high-speed condition. Further, the rotary piston pump having the check valves can transfer fluid only in one direction, but not in both directions due to the characteristics of the check valves.

Therefore, in order to overcome such disadvantages, it is needed to develop a fluid transfer apparatus having a structure capable of maintaining a high flow of fluid and suction (vacuum) and buster (pressurization) functions while transferring fluid without check valves, and a fluid transfer apparatus capable of transferring fluid in both directions while implementing miniaturization and low noise through a simpler structure excluding the check valves.

In addition, a rotary piston pump and a vacuum self-priming buster pump can transfer fluid according to a volume variation due to eccentric rotation of a triangular rotor, and thus have a structure inevitably causing vibration due to the eccentric rotation and pulsation due to the volume variation. There is also a disadvantage in that noise is generated due to the vibration and pulsation. Therefore, it is needed to develop a rotary piston pump and a vacuum self-priming buster pump that can maintain a high flow rate, and suction (vacuum) and buster functions, which are the advantages of the rotary piston pump, reduce vibration and pulsation, implement miniaturization and low noise, and bidirectionally transfer fluid.

DISCLOSURE

Technical Problem

One aspect of the present disclosure is to provide a fluid transfer apparatus having a structure capable of transferring fluid in both directions.

Another aspect of the present disclosure is to provide a fluid transfer apparatus capable of realizing miniaturization with a simple structure, low noise, and easy maintenance, by way of removing check valves from a rotary piston pump.

Still another aspect of the present disclosure is to provide a fluid transfer apparatus having a modular, simple structure for ease of manufacture.

Still another aspect of the present disclosure is to provide a fluid transfer apparatus having improved airtightness and durability.

Still another aspect of the present disclosure is to provide a fluid transfer apparatus from which a vibration phenomenon due to eccentric rotation of a rotor is reduced.

Still another aspect of the present disclosure is to provide a fluid transfer apparatus capable of reducing a pulsation phenomenon occurring due to a volume variation.

Still another aspect of the present disclosure is to propose a fluid transfer apparatus having a vacuum function to suck in air as well as a compression function to pressurize fluid (water, oil, air).

Still another aspect of the present disclosure is to provide a fluid transfer apparatus having a hydraulic/pneumatic motor function capable of generating rotational force using hydraulic pressure and pneumatic pressure by applying a fluid transfer principle in reverse.

Technical Solution

In order to achieve those aspects and other advantages according to the present disclosure, there is provided a fluid transfer apparatus including a rotating shaft having a rotation unit extending in an axial direction, and a first eccentric unit and a second eccentric unit disposed to be spaced apart from each other along the axial direction, a first rotor housing defining a first fluid compression space having an epitrochoid shape, a second rotor housing defining a second fluid compression space having an epitrochoid shape, and disposed to be spaced apart from the first rotor housing in the axial direction, a first rotor disposed in the first fluid compression space so as to divide the first fluid compression space into a plurality of variable-volume spaces, and coupled to the first eccentric unit while surrounding the first eccentric unit in a radial direction of the first eccentric unit, and a second rotor disposed in the second fluid compression space so as to divide the second fluid compression space into a plurality of variable-volume spaces, and coupled to the second eccentric unit while surrounding the second eccentric unit in a radial direction of the second eccentric unit. Fluid in the first fluid compression space may be transferred to the second fluid compression space or vice versa according to a rotating direction of the rotating shaft.

Advantageous Effects

According to the present disclosure having the configuration as described above, bidirectional fluid transfer can be performed from one end to another end of a fluid transfer apparatus or vice versa.

The fluid transfer apparatus according to the present disclosure can transfer fluid without a check valve, generate high pressure and vacuum, reduce material costs by simplification of structure, and also reduce noise and vibration.

The fluid transfer apparatus according to the present disclosure can be easily fabricated by modularizing all of components such as rotors, rotor housings, rotor housing covers, and fluid entrance housings.

The fluid transfer apparatus according to the present disclosure can suppress a decrease in airtightness by vanes provided in rotors, and can improve durability.

The fluid transfer apparatus according to the present disclosure can greatly reduce vibration due to eccentric rotation of first and second rotors by arranging the first rotor and the second rotor symmetrically with respect to a rotating shaft and connecting channels through a channel housing.

The fluid transfer apparatus according to the present disclosure can greatly reduce a pulsation phenomenon, caused by a volume variation, by employing a pulsation reducing unit that is configured to vary volumes of fluid entrance spaces according to variations of an inflow amount and an outflow amount of fluid.

According to the present disclosure, it may be possible to reach a high degree of vacuum faster than the related art rotary vacuum pump.

The present disclosure can achieve a high vacuum performance so as to exhibit a faster self-priming function than the related art self-priming pump. Therefore, the fluid transfer apparatus according to the present disclosure can serve as a multi-purpose pump with vacuum, self-priming, and pressurization functions, so as to have high utilization as a general pump as well as an industrial pump. In particular, since a volume variation is made in a rotary manner, the fluid transfer apparatus can be very useful to transfer high-viscosity liquid.

In addition, the present disclosure can obtain a far-reaching effect in industrial fields through various uses such as an oil vacuum pump, a fluid transfer self-priming pump, a replacement for a water ring pump that sucks air, a vacuum cleaner having an air compressor, a small air compressor, a sprayer, and the like.

The present disclosure can additionally be applied to a pneumatic or hydraulic motor, a pneumatic drive, etc. in which a rotating shaft rotates when pressure is applied to a fluid entrance by applying a fluid transfer principle in reverse.

MODES FOR CARRYING OUT THE PREFERRED IMPLEMENTATIONS

Figure 1:
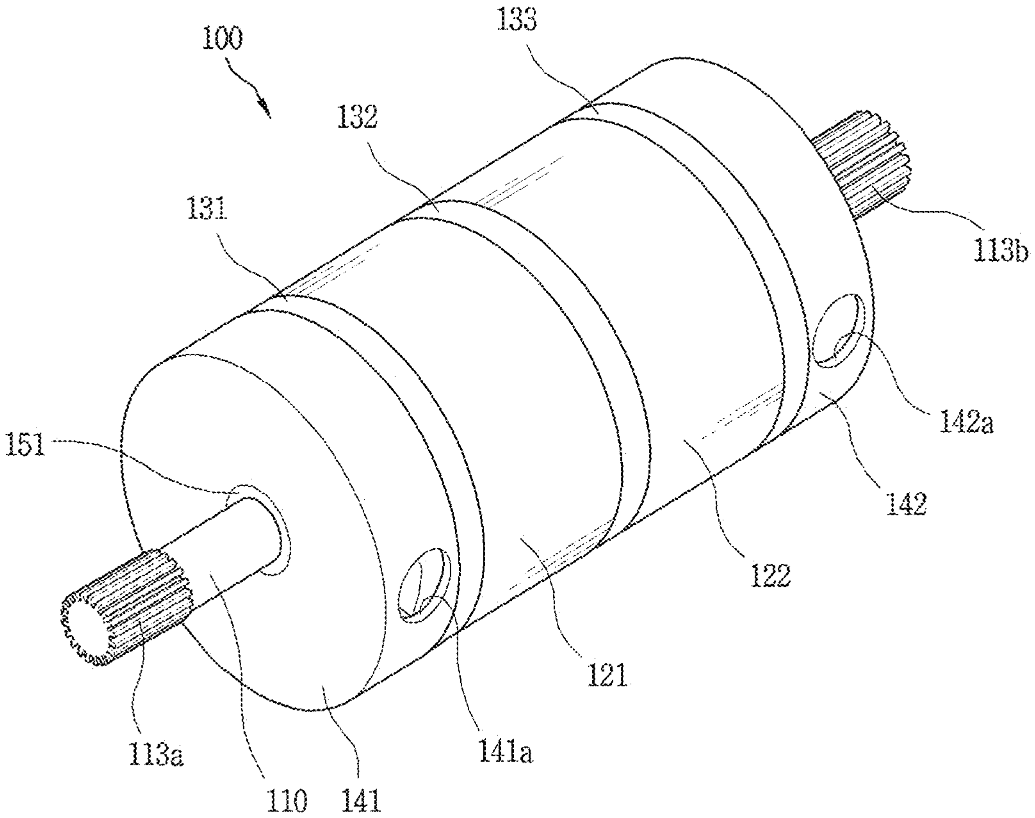
FIG. 1 is a perspective view illustrating appearance of a fluid transfer apparatus in accordance with one implementation proposed by the present disclosure.

Hereinafter, a fluid transfer apparatus according to the present disclosure will be described in detail with reference to the drawings.

In this specification, the same or similar reference numerals are given to the same or similar configurations even in different implementations, and the description thereof is replaced with the first description.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

FIG. 1 is a perspective view illustrating appearance of a fluid transfer apparatus 100 in accordance with one implementation proposed by the present disclosure.

The fluid transfer apparatus 100 may have appearance defined by a rotating shaft 110, a rotor housing 121, 122, a rotor housing cover 131, 132, 133, and a fluid entrance housing 141, 142. The appearance of the fluid transfer apparatus 100 may be formed in a cylindrical shape as illustrated in FIG. 1, but may not be limited thereto.

The rotor housing 121, 122 may be provided in plurality, referred to as a first rotor housing 121 and a second rotor housing 122. The rotor housing cover 131, 132, 133 may be provided in plurality, referred to as a first rotor housing cover 131, a second rotor housing cover 132, and a third rotor housing cover 133. The fluid entrance housing 141, 142 may be provided in plurality, referred to as a first fluid entrance housing 141 and a second fluid entrance housing 142.

The first fluid entrance housing 141, the first rotor housing cover 131, the first rotor housing 121, the second rotor housing cover 132, the second rotor housing 122, the third rotor housing cover 133, and the second fluid entrance housing 142 may be disposed sequentially from one end to another end of the fluid transfer apparatus 100. One end and another end of the rotating shaft 110 may be exposed to the one end and the another end of the fluid transfer apparatus 100, respectively.

The first fluid entrance housing 141 may be disposed on the one end of the fluid transfer apparatus 100. The second fluid entrance housing 142 may be disposed on the another end of the fluid transfer apparatus 100. The first fluid entrance housing 141 and the second fluid entrance housing 142 may define an outer surface of the fluid transfer apparatus 100.

The first fluid entrance housing 141 and the second fluid entrance housing 142 may be provided with fluid entrances 141*a* and 142*a*, respectively. The fluid entrances 141*a* and 142*a* may protrude from outer circumferential surfaces of the fluid entrance housings 141 and 142, respectively, but may not be limited thereto.

The fluid transfer apparatus 100 proposed in the present disclosure may transfer fluid in both directions. Accordingly, the two fluid entrances 141*a* and 142*a* may be either a fluid inlet or a fluid outlet depending on a direction that the fluid is transferred.

The rotor housing covers 131, 132, and 133 and the rotor housings 121 and 122 may be disposed in an alternating manner. The rotor housing covers 131, 132, and 133 may be spaced apart from one another. The rotor housings 121 and 122 may be disposed between the rotor housing covers 131, 132, and 133 adjacent to each other. The rotor housing covers 131, 132, and 133 and the rotor housings 121 and 122 may form a continuous outer circumferential surface of the fluid transfer apparatus 100 together with the fluid entrance housings 141 and 142.

The rotating shaft 110 may be inserted through the fluid transfer apparatus 100. The rotating shaft 110 may be connected to a power source such as a motor or a generator, to receive rotational driving force from the power source and rotate by the received rotational driving force. Gear units 113*a* and 113*b* for receiving the rotational driving force from the power source or transmitting rotational force generated in the fluid transfer apparatus 100 by hydraulic pressure and pneumatic pressure may be provided on both ends of the rotating shaft 110.

For smooth rotation and sealing of the rotating shaft 110, the fluid transfer apparatus 100 may include bearings 151 and 152 and retainers 161 and 162. The bearings 151 and 152 may be formed in an annular shape to surround the rotating shaft 110. Inner circumferential surfaces of the bearings 151 and 152 may be brought into contact with the rotating shaft 110. Outer circumferential surfaces of the bearings 151 and 152 may be coupled into rotating shaft accommodation holes formed in the fluid entrance housings 141 and 142.

Hereinafter, an inner structure of the fluid transfer apparatus 100 will be described.

Figure 2:
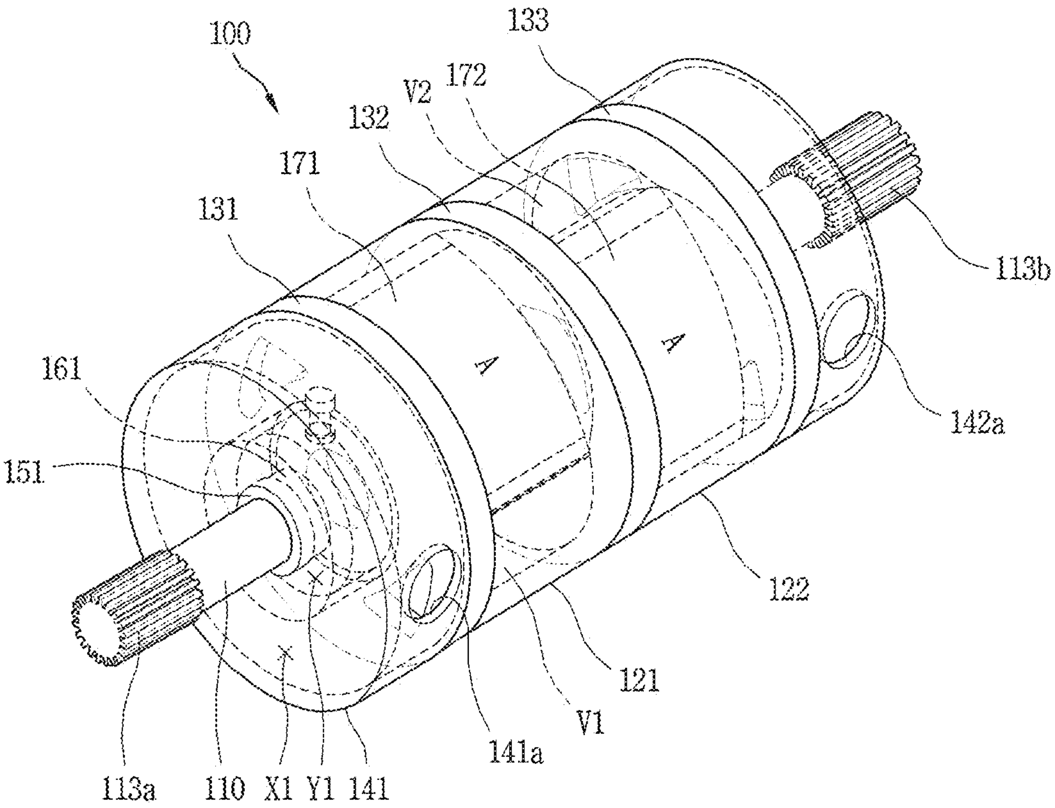
FIG. 2 is a conceptual view illustrating the inside of the fluid transfer apparatus illustrated in FIG. 1 on the assumption that a rotor housing and a fluid entrance housing of the fluid transfer apparatus are made of a transparent material.

FIG. 2 is a conceptual view illustrating the inside of the fluid transfer apparatus 100 illustrated in FIG. 1 on the assumption that the rotor housings 121 and 122 and the fluid entrance housings 141 and 142 of the fluid transfer apparatus 100 are made of a transparent material.

Figure 3:
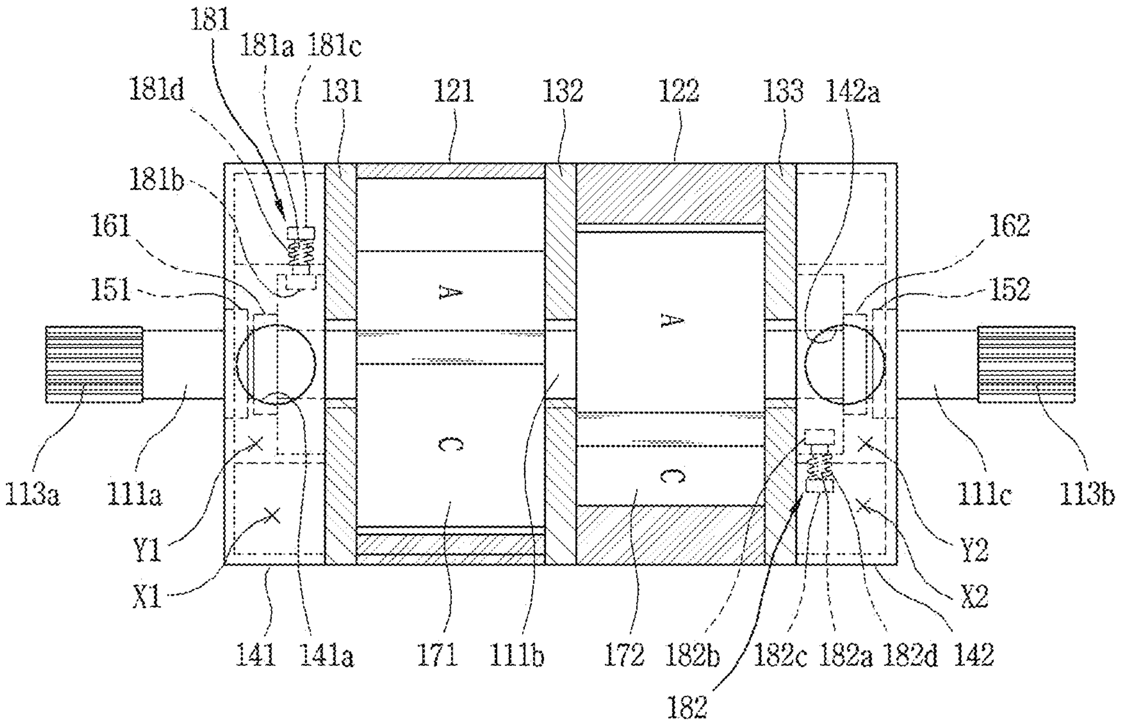
FIG. 3 is a conceptual view of the fluid transfer apparatus illustrated in FIG. 1, viewed from one side, on the assumption that a rotor housing and a fluid entrance housing of the fluid transfer apparatus are made of a transparent material.

FIG. 3 is a conceptual view of the fluid transfer apparatus 100 illustrated in FIG. 1, viewed from one side, on the assumption that the rotor housings 121 and 122 and the fluid entrance housings 141 and 142 of the fluid transfer apparatus 100 are made of a transparent material.

Figure 4:
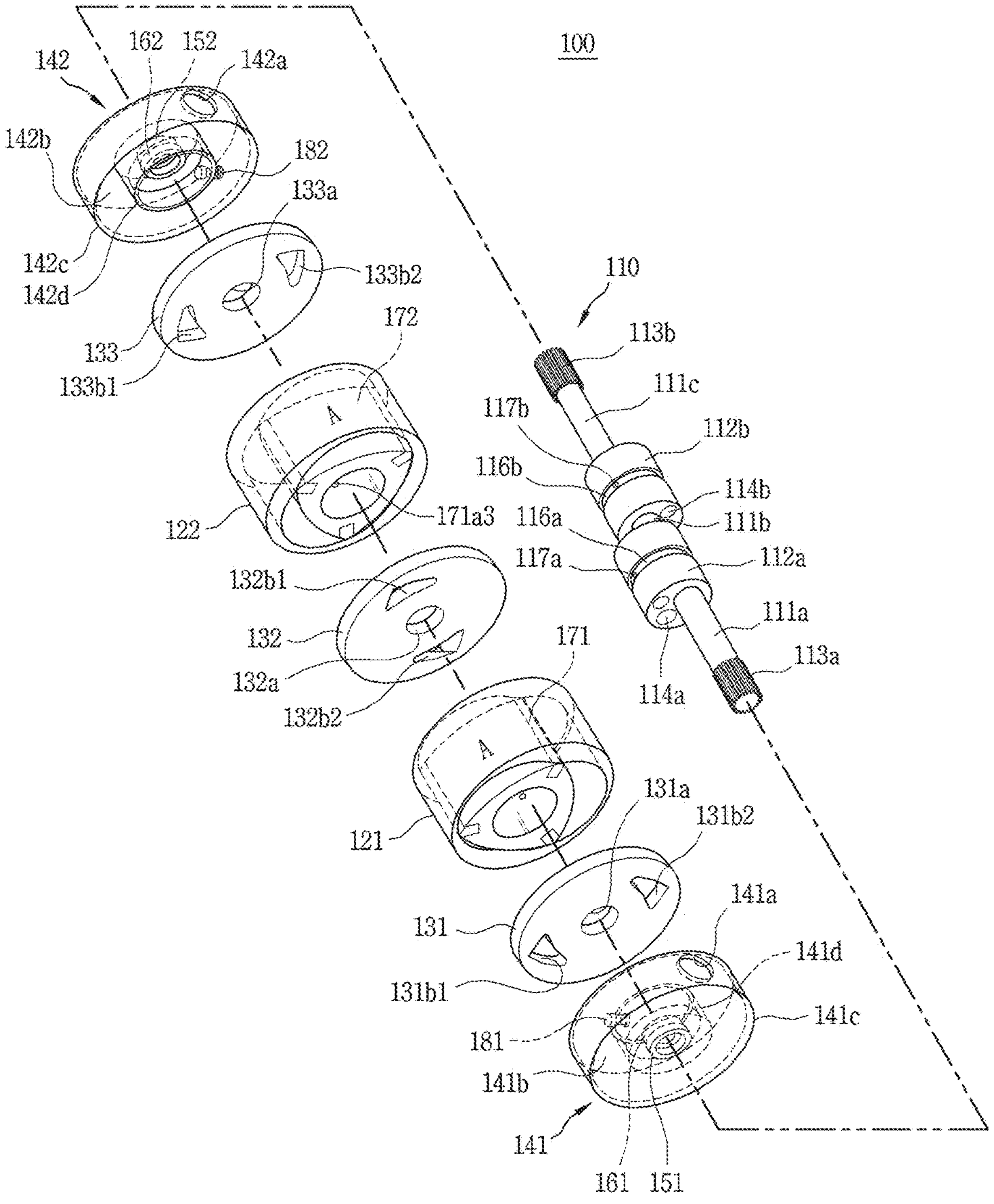
FIG. 4 is an exploded perspective view of the fluid transfer apparatus illustrated in FIG. 1.

FIG. 4 is an exploded perspective view of the fluid transfer apparatus illustrated in FIG. 1.

The rotating shaft 110 may be inserted through the center of the fluid transfer apparatus 100, and the both ends of the rotating shaft 110 may be exposed to the outside of the fluid transfer apparatus 100. The rotating shaft 110 may include rotation units 111*a*, 111*b*, and 111*c* rotating in place and eccentric units 112*a* and 112*b* rotating eccentrically.

The rotation units 111*a*, 111*b*, and 111*c* may extend in an axial direction. The axial direction refers to a direction extending from one end of the rotation unit 111*a*, 111*b*, 111*c* toward another end or in its reverse direction. The eccentric units 112*a* and 112*b* may be eccentrically coupled to the rotation units 111*a*, 111*b*, and 111*c*. Therefore, when the rotation units 111*a*, 111*b*, and 111*c* rotate in place, the eccentric units 112*a*, and 112*b* may rotate eccentrically centering on the rotation units 111*a*, 111*b*, and 111*c*.

The rotation units 111*a*, 111*b*, and 111*c* and the eccentric units 112*a* and 112*b* may be alternately disposed in the axial direction. The first rotation unit 111*a*, the first eccentric unit 112*a*, the second rotation unit 111*b*, the second eccentric unit 112*b*, and the third rotation unit 111*c* may be arranged sequentially from the one end to the another end of the rotating shaft 110. In the axial direction, the first rotation unit 111*a*, the second rotation unit 111*b*, and the third rotation unit 111*c* may be located at positions spaced apart from one another in the axial direction. In addition, the first eccentric unit 112*a* and the second eccentric unit 112*b* may also be located at positions spaced apart from each other in the axial direction.

The first rotation unit 111*a* may be formed on the one end of the rotating shaft 110. The first rotation unit 111*a* may be coupled to the first eccentric unit 112*a* in the axial direction.

The first eccentric unit 112*a* may be disposed between the first rotation unit 111*a* and the second rotation unit 111*b* in the axial direction. The first eccentric unit 112*a* may be connected to the first rotation unit 111*a* and the second rotation unit 111*b* in the axial direction.

The second rotation unit 111*b* may be disposed between the first eccentric unit 112*a* and the second eccentric unit 112*b* in the axial direction. The second rotation unit 111*b* may be connected to the first eccentric unit 112*a* and the second eccentric unit 112*b* in the axial direction.

The second eccentric unit 112*b* may be disposed between the second rotation unit 111*b* and the third rotation unit 111*c* in the axial direction. The second eccentric unit 112*b* may be connected to the second rotation unit 111*b* and the third rotation unit 111*c* in the axial direction.

The third rotation unit 111*c* may be formed on the another end of the rotating shaft 110. The third rotation unit 111*c* may be coupled to the second eccentric unit 112*b* in the axial direction.

The relative positions of the first eccentric unit 112*a* and the second eccentric unit 112*b* may be defined when the rotating shaft 110 is projected on a plane while viewing the rotating shaft 110 from the one end to the another end. For example, since the first eccentric unit 112*a* and the second eccentric unit 112*b* are eccentrically coupled to the rotation units 111*a*, 111*b*, and 111*c*, distances from a center of the rotation units 111*a*, 111*b*, and 111*c* to outer circumferential surfaces of the eccentric units 112*a* and 112*b* may not be constant. Accordingly, a direction having a longest distance of the distances from the center of the rotation units 111*a*, 111*b*, and 111*c* to the outer circumferential surfaces of the eccentric units 112*a* and 112*b* may be defined as a direction in which the eccentric units 112*a* and 112*b* are formed.

In this case, the first eccentric unit 112*a* and the second eccentric unit 112*b* may be disposed to have an angle of 90° with respect to the rotation units 111*a*, 111*b*, and 111*c*. This relationship can be confirmed in FIG. 5.

Figure 5:
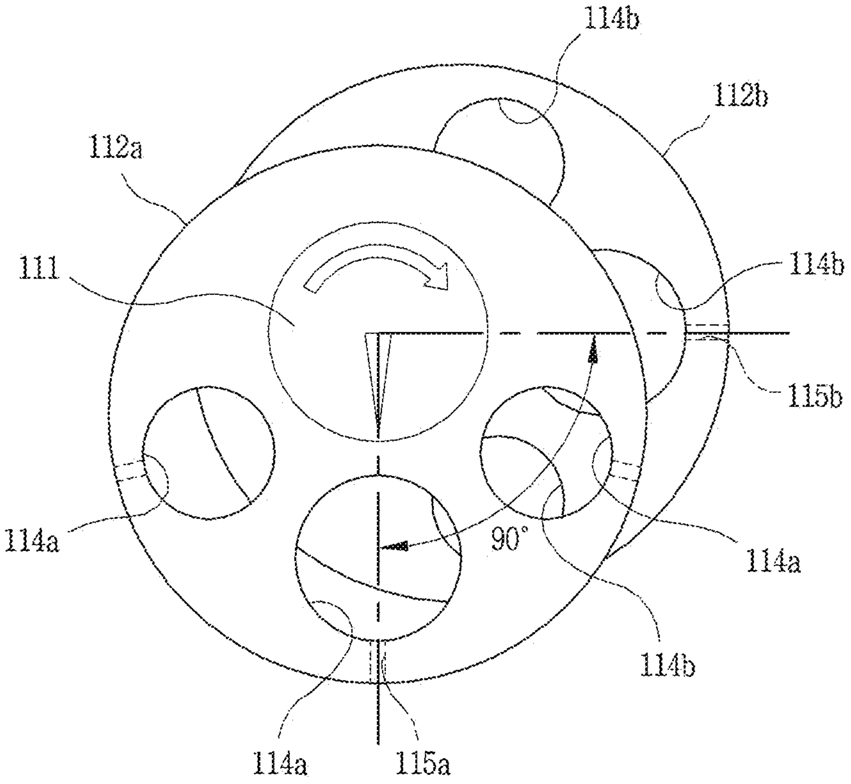
FIG. 5 is a conceptual view of a first eccentric unit and a second eccentric unit, viewed in an axial direction.

FIG. 5 is a conceptual view of the first eccentric unit 112*a* and the second eccentric unit 112*b*, viewed in the axial direction.

Since the second eccentric unit 112*b* is disposed behind the first eccentric unit 112*a*, FIG. 5 illustrates the first eccentric unit 112*a* and the second eccentric unit 112*b* which are viewed from the one end of the rotating shaft 110.

When the rotating shaft 110 is projected onto quadrants while viewing the rotating shaft 110 from the one end to the another end, the rotation unit 111 may be disposed at the origin of the quadrants. The first eccentric unit 112*a* may be formed in a y ($y<0$) axis direction with respect to the rotation unit 111*a*, and the second eccentric unit 112*b* may be formed in an x ($x>0$) axis direction with respect to the rotation unit 111. If a clockwise direction is referred to as a first direction, the first eccentric unit 112*a* may rotate eccentrically ahead of the second eccentric unit 112*b* by 90° while the rotating shaft 110 rotates in the first direction.

When the rotating shaft 110 is projected onto quadrants while viewing the rotating shaft 110 from the another end to the one end, the rotation unit 111 may be disposed at the origin of the quadrants. The second eccentric unit 112*b* may be formed in the x ($x<0$) axis direction with respect to the rotation unit 111*a*, and the first eccentric unit 112*a* may be formed in the y ($y<0$) axis direction with respect to the rotation unit 111. If a reverse direction of the first direction is referred to as a second direction, the second eccentric unit 112*b* may rotate eccentrically ahead of the first eccentric unit 112*a* by 90° while the rotating shaft 110 rotates in the second direction.

The first rotor housing 121 and the second rotor housing 122 will be described with reference to FIGS. 2 to 4 again.

The first rotor housing 121 and the second rotor housing 122 may be disposed to be spaced apart from each other in the axial direction. The first rotor housing 121 may be disposed at a position corresponding to the first eccentric unit 112*a*, and the second rotor housing 122 may be disposed at a position corresponding to the second eccentric unit 112*b*.

The first rotor housing 121 may define a first fluid compression space V1. The first fluid compression space V1 may be opened toward the first rotor housing cover 131 and the second rotor housing cover 132. The second rotor housing 122 may define a second fluid compression space V2. The second fluid compression space V2 may be opened toward the second rotor housing cover 132 and the third rotor housing cover 133.

The first rotor housing 121 and the second rotor housing 122 may be formed in a hollow cylindrical or polygonal shape. When the first rotor housing 121 and the second rotor housing 122 are viewed in the axial direction, an inner circumferential surface of the first rotor housing 121 and an inner circumferential surface of the second rotor housing 122 may have an epitrochoid shape. Regions in the epitrochoid shape may correspond to the first fluid compression space V1 and the second fluid compression space V2, respectively.

Figure 6A:
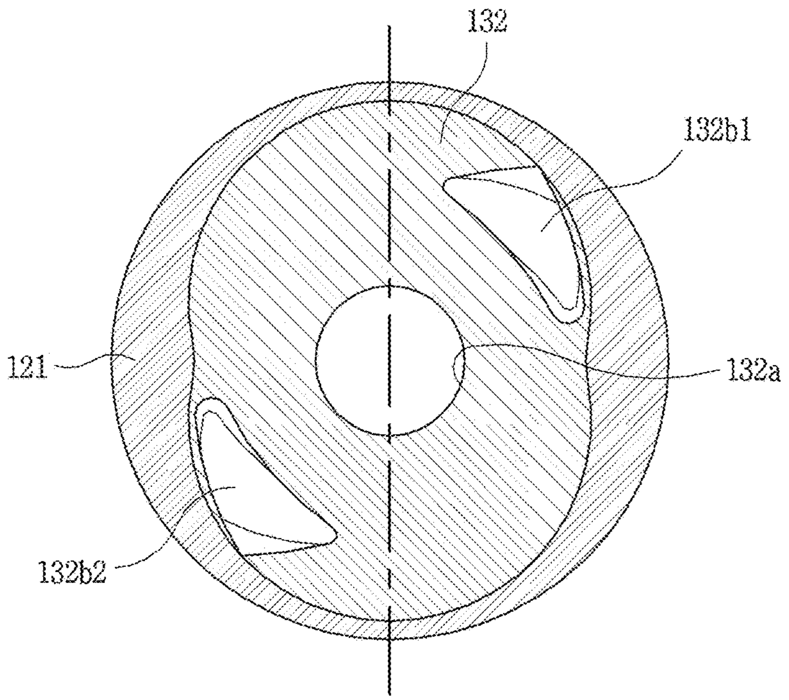
FIG. 6A is a conceptual view of a first rotor housing and a second rotor housing cover, viewed from one end of a rotating shaft.
Figure 6B:
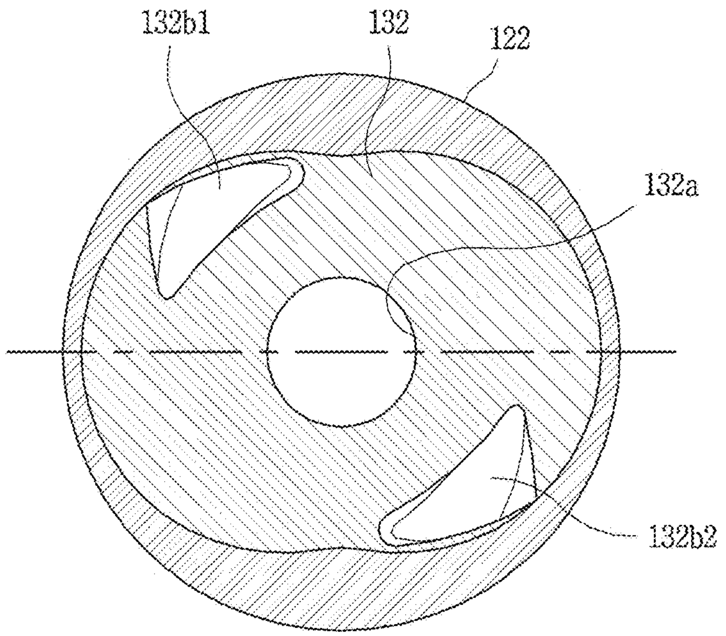
FIG. 6B is a conceptual view of a second rotor housing and a second rotor housing cover, viewed in the axial direction.

The shapes of the first fluid compression space V1 and the second fluid compression space V2 may be seen in more detail with reference to FIGS. 6A and 6B. FIG. 6A is a conceptual view of the first rotor housing 121 and the second rotor housing cover 132, viewed from the one end of the rotating shaft 110, and FIG. 6B is a conceptual view of the second rotor housing 122 and the second rotor housing cover 132, viewed from the another end of the rotating shaft 110 in the axial direction.

The epitrochoid shape refers to a curve drawn by a point of a second circle that rolls on an outside of a first circle while being in contact with the first circle. The epitrochoid shape may vary depending on a size ratio of the first circle and the second circle, and may be shown in various manners. The epitrochoid shape illustrated in FIGS. 6A and 6B is in a peanut shape that satisfies the relationship R=2r when the radius of the first circle is R and the radius of the second circle is r. Here, a coefficient 2 may correspond to the number of inflection points (peaks) appearing in the epitrochoid shape.

Arrangement directions of the first rotor housing 121 and the second rotor housing 122 may be determined based on a direction that the epitrochoid curve is facing. For example, when the epitrochoid curve of the first rotor housing 121 and the epitrochoid curve of the second rotor housing 122 exactly overlap each other on a plane, it can be said that the first rotor housing 121 and the second rotor housing 122 are arranged to face the same direction.

On the other hand, when the epitrochoid curve of the first rotor housing 121 is erected vertically as illustrated in FIG. 6A and the epitrochoid curve of the second rotor housing 122 is horizontally laid as illustrated in FIG. 6B, it can be said that the first rotor housing 121 and the second rotor housing 122 are arranged to face different directions. The arrangement directions may be described as having an angle of 90° with each other with respect to the rotation units 111*a*, 111*b*, and 111*c*. In the present disclosure, the first rotor housing 121 and the second rotor housing 122 may be disposed to have an angle of 90° with respect to the rotation units 111*a*, 111*b*, and 111*c*.

However, since the arrangement directions of the rotor housings 121 and 122 are relative to each other, the criterion for determining the arrangement directions may arbitrarily vary. For example, the criterion for determining the arrangement directions of the rotor housings 121 and 122 may be defined as a direction that a virtual line connecting the longest or shortest distance of the epitrochoid curve faces. Even so, the arrangement directions of the first rotor housing 121 and the second rotor housing 122 may still have the angle of 90° with each other.

A first rotor 171 and a second rotor 172 each may have a shape of a triangular prism (pole). It will be understood that the shape of the rotors 171 and 172 is similar to an equilateral triangular prism but its side surfaces are curved surfaces each having a shape which convexly protrudes outward. The curved surfaces may correspond to the epitrochoid curves of the rotor housings 121 and 122. A triangle having rounded edges (sides) like a radial cross section of each of the first rotor 171 and the second rotor 172 may be referred to as a Reuleaux triangle.

The first rotor 171 may be disposed in the first fluid compression space V1 so as to divide the first fluid compression space V1 of the first rotor housing 121 into a plurality of variable-volume spaces. Similar to this, the second rotor 172 may be disposed in the second fluid compression space V2 so as to divide the second fluid compression space V2 of the second rotor housing 122 into a plurality of variable-volume spaces. The volume is the same term as the capacity of a space accommodating or containing fluid to be compressed. Therefore, the variable-volume space means that a volume or capacity is inconstant and varies in response to the rotation of the rotor 171, 172.

As the first rotor 171 is disposed in the first fluid compression space V1 and the second rotor 172 is disposed in the second fluid compression space V2, the first fluid compression space V1 and the second fluid compression space V2 each may be divided into three variable-volume spaces. As the first rotor 171 and the second rotor 172 rotate, the three variable-volume spaces may change in volume or capacity while repeatedly being compressed and expanded.

The first eccentric unit 112*a* may be disposed in the first fluid compression space V1 of the first rotor housing 121. The first rotor 171 may be coupled to the first eccentric unit 112*a* while surrounding the first eccentric unit 112*a* in the radial direction of the first eccentric unit 112*a*. Likewise, the second eccentric unit 112*b* may be disposed in the second fluid compression space V2 of the second rotor housing 122. The second rotor 172 may be coupled to the second eccentric unit 112*b* while surrounding the second eccentric unit 112*b* in the radial direction of the second eccentric unit 112*b*.

The first rotor 171 may be coupled to the first eccentric unit 112*a* so as to move together with the first eccentric unit 112*a*. The second rotor 172 may be coupled to the second eccentric unit 112*b* so as to move together with the second eccentric unit 112*b*. The rotation units 111*a*, 111*b*, and 111*c* of the rotating shaft 110 may rotate in place, but the first eccentric unit 112*a* and the second eccentric unit 112*b* may rotate eccentrically unlike the rotation units 111*a*, 111*b*, and 111*c*. Accordingly, the first rotor 171 and the second rotor 172 coupled to the first eccentric unit 112*a* and the second eccentric unit 112*b*, respectively, may move within regions defined by the epitrochoid curve while rotating centering on the first eccentric unit 112*a* and the second eccentric unit 112*b*, respectively.

The first rotor 171 and the second rotor 172 each may have a body and vanes. A detailed description of this structure will be described later with reference to FIGS. 8A to 8C.

On the other hand, the first rotor housing cover 131 may cover the first fluid communication space V1 at one side. The second rotor housing cover 131 may be disposed on one side of the first rotor housing 121. Here, the one side of the first rotor housing 121 refers to a position between the first fluid entrance housing 141 and the first rotor housing 121.

The second rotor housing cover 132 may cover the first fluid compression space V1 and the second fluid communication space V2. The second rotor housing cover 132 may be disposed between the first rotor housing 121 and the second rotor housing 122. One surface of the second rotor housing cover 132 may face the first fluid communication space V1, and another surface of the second rotor housing cover 133 may face the second fluid compression space V2.

The third rotor housing cover 133 may cover the second fluid communication space V2. When the second rotor housing cover 132 is disposed on one side of the second rotor housing 122, the third rotor housing cover 133 may be disposed on another side of the second rotor housing 122. For example, the third rotor housing cover 133 may be disposed at an opposite side to the second rotor housing cover 132 based on the second rotor housing 122.

The first rotor housing cover 131, the second rotor housing cover 132, and the third rotor housing cover 133 may commonly be formed in a shape of a circular or polygonal plate. In addition, each of the circular plate or the polygonal plate may commonly be provided with a rotating shaft through hole 131*a*, 132*a*, 133*a* and a channel 131*b*1, 131*b*2, 132*b*1, 132*b*2, 133*b*1, 133*b*2.

Each rotating shaft through hole 131*a*, 132*a*, 133*a* may be formed through a center of the circular plate or polygonal plate in the axial direction. The rotating shaft through holes 131*a*, 132*a*, and 133*a* may be regions for accommodating the rotation units 111*a*, 111*b*, and 111*c* of the rotating shaft 110, respectively.

The first rotation unit 111*a* may be inserted through the rotating shaft through hole 131*a* of the first rotor housing cover 131. The second rotation unit 111*b* may be inserted through the rotating shaft through hole 132*a* of the second rotor housing cover 132. The third rotation unit 111*c* may be inserted through the rotating shaft through hole 133*a* of the third rotor housing cover 133.

The first rotor housing cover 131 may be coupled to an outer circumferential surface of the first rotation unit 111*a*. The second rotor housing cover 132 may be coupled to an outer circumferential surface of the second rotation unit 111*b*. The third rotor housing cover 133 may be coupled to an outer circumferential surface of the third rotation unit 111*c*.

A distance between the first rotor housing cover 131 and the second rotor housing cover 132 in the axial direction may correspond to a thickness of the first rotor 171. Likewise, a distance between the second rotor housing cover 132 and the third rotor housing cover 133 in the axial direction may correspond to a thickness of the second rotor 172.

The channel 131*b*1, 131*b*2, 132*b*1, 132*b*2, 133*b*1, 133*b*2 may be formed through the circular plate or the polygonal plate in the axial direction. The channel 132*b*1, 132*b*2, 133*b*1, 133*b*2, 134*b*1, 134*b*2 may allow fluid to pass therethrough in the axial direction.

The channel 131*b*1, 131*b*2, 132*b*1, 132*b*2, 133*b*1, 133*b*2 may be provided in plurality for each one of the rotor housing covers 131, 132, and 133. For example, as shown in the drawings, one rotor housing cover 131, 132, 133 may be provided with two channels 131*b*1, 131*b*2, 132*b*1, 132*b*2, 133*b*1, 133*b*2. The two channels 131*b*1 and 131*b*2, 132*b*1 and 132*b*2, 133*b*1 and 133*b*2, 134*b*1 and 134*b*2 may be formed in a symmetrical shape at positions symmetrical to each other with respect to the rotating shaft through hole 131*a*, 132*a*, 133*a*, 134*a*.

Figure 7:
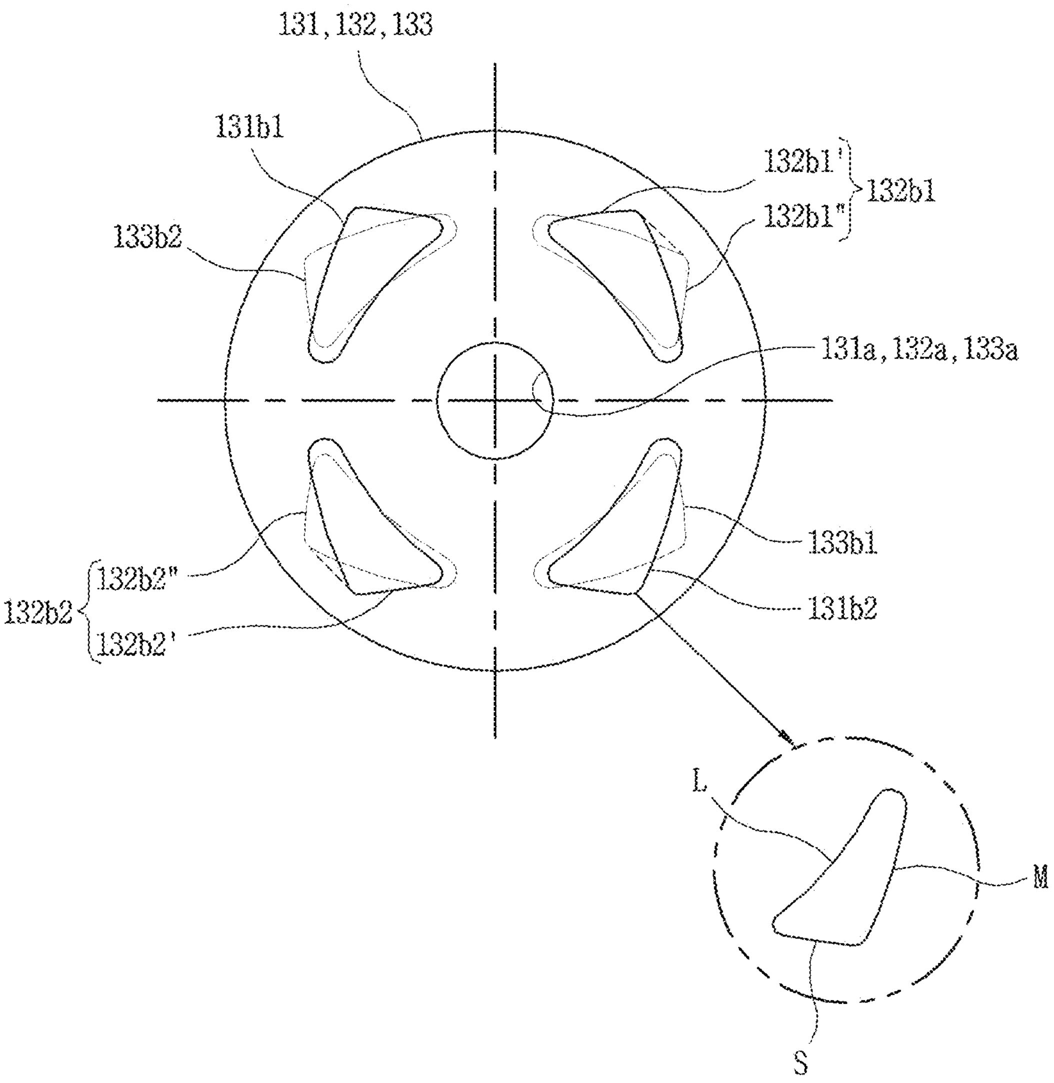
FIG. 7 is a conceptual view illustrating a first rotor housing cover, a second rotor housing cover, and a third rotor housing cover which are projected onto quadrants.

The shapes of the channels 131*b*1, 131*b*2, 132*b*1, 132*b*2, 133*b*1, and 133*b*2 and the positions of the channels formed through the respective rotor housing covers 131, 132, and 133 will be described with reference to FIGS. 6A, 6B, and 7. As described above, FIGS. 6A and 6B are conceptual view of the first rotor housing 121 and the second rotor housing 122, viewed in the axial direction. On the other hand, FIG. 7 is a conceptual view illustrating that the first rotor housing cover 131, the second rotor housing cover 132, and the third rotor housing cover 133 are projected onto quadrants.

Positions of the channels 131*b*1 and 131*b*2, 132*b*1 and 132*b*2, 133*b*1 and 133*b*2 formed through each of the rotor housing covers 131, 132, and 133 may be described in a manner that each of the rotor housing covers 131, 132, and 133 is projected on one quadrant in a direction of viewing the rotating shaft 110 from the another end to the one end. Here, the rotating shaft through holes 131*a*, 132*a*, 133*a*, and 134*a* may be located at the center of the quadrants.

One channel 131*b*1 of the two channels 131*b*1 and 131*b*2 of the first rotor housing cover 131 may be located on a second quadrant, and another one channel 131*b*2 of the two channels 131*b*1 and 131*b*2 may be located on a fourth quadrant. One channel 132*b*1 of the two channels 132*b*1 and 132*b*2 of the second rotor housing cover 132 may be located on a first quadrant, and another one 132*b*2 of the two channels 132*b*1 and 132*b*2 may be located on a third quadrant. One channel 133*b*1 of the two channels 133*b*1 and 133*b*2 of the third rotor housing cover 133 may be located on the fourth quadrant, and another one 133*b*2 of the two channels 133*b*1 and 133*b*2 may be located on the second quadrant.

As the two channels 131*b*1 and 131*b*2 of the first rotor housing cover 131 and the two channels 133*b*1 and 133*b*2 of the third rotor housing cover 133 are located on the second quadrant and the fourth quadrant, the two channels 131*b*1 and 131*b*2 of the first rotor housing cover 131 and the two channels 133*b*1 and 133*b*2 of the third rotor housing cover 133 may be located on positions overlapping each other in the axial direction. In addition, the two channels 131*b*1 and 131*b*2 of the first rotor housing cover 131 and the two channels 133*b*1 and 133*b*2 of the third rotor housing cover 133 may not overlap each other even in shape but may be symmetrical to each other based on a straight line corresponding to y=−x.

The shape of each of the channels 131*b*1, 131*b*2, 132*b*1, 132*b*2, 133*b*1, and 133*b*2 may be described as being defined by a long side L, a middle side M, and a short side S. The long side L, the middle side M, and the short side S may not necessarily mean a straight line, and may also be curved. The long side L, the middle side M, and the short side S are relative lengths. The long side L is the longest and the short side S is the shortest. The middle side M has a length between the long side L and the short side S.

The long side L, the middle side M, and the short side S may be respectively located at positions forming a shape similar to a triangle. The long side L may face the rotating shaft through hole 131*a*, 132*a*, 133*a*. Here, when the long side L faces the rotating shaft through hole 131*a*, 132*a*, 133*a*, it may mean that a virtual normal of the long side L passes through the rotating shaft through hole 131*a*, 132*a*, 133*a*. The long side L may be located closer to the rotating shaft through hole 131*a*, 132*a*, 133*a* than the middle side M or the short side S.

One end of the middle side M may be connected to one end of the long side L. One end of the short side S may be connected to another end of the long side L. And another end of the middle side M and another end of the short side S may be connected to each other at an opposite side of the rotating shaft through hole 131*a*, 132*a*, 133*a* with respect to the long side L. The long side L, the middle side M, and the short side S may be connected together in a curved form.

The two channels 131*b*1 and 131*b*2 on both surfaces of the first rotor housing cover 131 may have the same shape. The two channels 133*b*1 and 133*b*2 on both surfaces of the third rotor housing cover 133 may have the same shape. Therefore, it may be understood that the two channels 131*b*1 and 131*b*2 of the first rotor housing cover 131 and the two channels 133*b*1 and 133*b*2 of the third rotor housing cover 133 may penetrate through the circular or polygonal plate while maintaining the same shape in the axial direction. On the other hand, the two channels 132*b*1 and 132*b*2 on both surfaces of the second rotor housing cover 132 may have different shapes. This will be described.

For the sake of explanation, a surface facing the first rotor 171 of the both surfaces of the second rotor housing cover 132 is referred to as a first surface, and a surface facing the second rotor 172 is referred to as a second surface. And, one of the two channels 132*b*1 and 132*b*2 of the second rotor housing cover 132 is referred to as a first channel 132*b*1 and another one is referred to as a second channel 132*b*2.

At this time, a shape 132*b*1' of the first channel 132*b*1 exposed on the first surface of the both surfaces of the second rotor housing cover 132 and a shape 132*b*1" of the first channel 132*b*1 exposed on the second surface may be symmetrical to each other with respect to a straight line corresponding to y=x in the quadrant. Likewise, a shape **132*b*2' of the second channel 132*b*2 exposed on the first surface of the both surfaces of the second rotor housing cover 132 and a shape 132*b*2" of the second channel 132*b*2** exposed on the second surface may be symmetrical to each other with respect to a straight line corresponding to y=x in the quadrant.

Accordingly, the first channel **132*b*1 and the second channel 132*b*2 of the second rotor housing cover 132 may gradually or stepwise change from the shapes 132*b*1' and 132*b*2' exposed to the first surface to the shapes 132*b*1" and 132*b*2"** exposed to the second surface in a direction from the first surface toward the second surface.

On the other hand, in the rotary piston pump disclosed in Korean Registration Patent Application No. 10-1655160 (Sep. 1, 2016), which is the background technology of the present disclosure, an inlet and an outlet always communicate with each other except when channels are blocked. Therefore, it is impossible to transfer fluid that generates pressure without a check valve.

On the other hand, in the fluid transfer apparatus 100 of the present disclosure, the first rotor housing 121 and the second rotor housing 122 may be disposed to have an angle of 90° with each other and the channels **131*b*1, 131*b*2, 132*b*1, 132*b*2, 133*b*1, and 133*b*2 of each of the rotor housing covers 131, 132, and 133 may be formed, as described above, to correspond to the positions of the rotor housings 121 and 122. In addition, the first eccentric unit 112*a* and the second eccentric unit 112*b* of the rotating shaft 110 may allow the first rotor 171 and the second rotor 172 to move while maintaining the angle of 90° with respect to the rotation units 111*a*, 111*b*, and 111*c***.

With this structure, the first fluid entrance **141*a* and the second fluid entrance 142*a* may not communicate with each other even while the volumes of the variable-volume spaces formed in the first rotor housing 121 and the volumes of the variable-volume spaces formed in the second rotor housing 122** are changing. Therefore, according to the present disclosure, it is possible to transfer the fluid without a check valve.

The operation of the fluid transfer apparatus 100 will be described later with reference to FIG. 9 and sequential drawings. Hereinafter, the fluid entrance housings 141 and 142 will be described.

The fluid entrance housings 141 and 142 may be disposed at both outermost sides of the fluid transfer apparatus 100, respectively. The fluid entrance housings 141 and 142 may define a part of the outer circumferential surface of the fluid transfer apparatus 100 and both side surfaces of the fluid transfer apparatus 100. The both side surfaces may be upper and lower surfaces depending on an installation direction of the fluid transfer apparatus 100.

The first fluid entrance housing 141 and the second fluid entrance housing 142 may have a cylindrical shape. The first fluid entrance housing 141 may be opened toward the first rotor housing cover 131 and the second fluid entrance housing 142 may be opened toward the third rotor housing cover 133. The opening of each of the first fluid entrance housing 141 and the second fluid entrance housing 142 may correspond to a portion where one of bottom surfaces of the cylindrical shape is formed.

Each of the first fluid entrance housing 141 and the second fluid entrance housing 142 may include a plate **141*b*, 142*b*, an outer wall 141*c*, 142*c*, a fluid entrance (inlet/outlet) 141*a*, 142*a*, and an inner wall 141*d*, 142*d***.

The plates **141*b* and 142*b* may be formed in a circular shape or a polygonal shape. The plate 141*b* of the first fluid entrance housing 141 may be disposed to face the first rotor housing cover 131 at a position spaced apart from the first rotor housing cover 131 in the axial direction. The plate 142*b* of the second fluid entrance housing 142 may be disposed to face the third rotor housing cover 133 at a position spaced apart from the third rotor housing cover 133** in the axial direction.

The outer walls **141*c* and 142*c* may protrude along edges (rims) of the plates 141*b* and 142*b* to form fluid entrance spaces X1 and X2. For example, when the plates 141*b* and 142*b* are circular, the outer walls 141*c* and 142*c* may protrude in an annular shape along circumferences of the plates 141*b* and 142*b*. The outer wall 141*c* of the first fluid entrance housing 141 may come in close contact with the edge (rim) of the first rotor housing cover 131. The outer wall 142*c* of the second fluid entrance housing 142 may come in close contact with the edge of the third rotor housing cover 133**.

As the outer wall **141*c* of the first fluid entrance housing 141 comes in close contact with the first rotor housing cover 131, a first fluid entrance space X1 may be defined between the first fluid entrance housing 141 and the first rotor housing cover 131**. The first fluid entrance space X1 may be formed in an annular shape. A first pressure transmission space Y1 to be described later may be defined in the center of the annular shape.

Similarly, as the outer wall **142*c* of the second fluid entrance housing 142 comes in close contact with the third rotor housing cover 133, a second fluid entrance space X2 may be defined between the second fluid entrance housing 142 and the third rotor housing cover 133**. The second fluid entrance space X2 may be formed in an annular shape. A second pressure transmission space Y2 to be described later may be defined in the center of the annular shape.

The fluid entrances **141*a* and 142*a* may be formed through the outer walls 141*c* and 142*c*, respectively, in the radial direction. Fluid to be compressed may be introduced into the fluid transfer apparatus 100 or completely-compressed fluid may be discharged out of the fluid transfer apparatus 100 through the fluid entrances 141*a* and 142*a***.

The inner walls **141*d* and 142*d* may protrude from the plates 141*b* and 142*b* in the same direction as the outer walls 141*c* and 142*c*. For example, the outer wall 141*d* of the first fluid entrance housing 141 may protrude toward the first rotor housing cover 131. The outer wall 142*d* of the second fluid entrance housing 142 may protrude toward the third rotor housing cover 133**.

The inner walls **141*d* and 142*d* may be formed along circumferences or peripheries smaller than those of the outer walls 141*c* and 142*c* so as to define pressure transmission spaces Y1 and Y2, which are separate from the fluid entrance spaces X1 and X2, in regions surrounded by the fluid entrance spaces X1 and X2, respectively. Since the pressure transmission spaces Y1 and Y2 are separated from the fluid entrance spaces X1 and X2, fluids in the fluid entrance spaces X1 and X2 cannot directly flow into the pressure transmission spaces Y1 and Y2 unless they pass through pressure check valves 181 and 182**, which will be described later.

Retainers 161 and 162 for preventing fluid leakage may be installed respectively in the pressure transmission spaces Y1 and Y2 surrounded by the inner walls **141*d* and 142*d*. The retainers 161 and 162 may be located at positions facing the bearings 151 and 152 in the axial direction. While the bearings 151 and 152 are exposed to the outside of the fluid entrance housings 141 and 142, the retainers 161 and 162 may be disposed at an inner side than the bearings 151 and 152, so as not to be exposed to the outside of the fluid entrance housings 141 and 142. The retainers 161 and 162 may surround the rotation units 111***a*, 111*b*, and 111*c* of the rotating shaft 110. The retainers 161 and 162 may prevent fluid from leaking through between the rotating shaft accommodating holes and the rotation units 111*a*, 111*b*, and 111*c*.

The pressure check valves 181 and 182 may be installed in the inner walls 141*d* and 142*d*. The pressure check valves 181 and 182 may be configured to be opened and closed based on a difference in pressure between the fluid entrance spaces X1 and X2 and the pressure transmission spaces Y1 and Y2, and restoring forces of elastic members 181*d* and 182*d*, which are provided on the pressure check valves 181 and 182.

Each of the pressure check valves 181 and 182 may include a valve rod 181*a*, 182*a*, a first flange 181*b*, 182*b*, a second flange 181*c*, 182*c*, and an elastic member 181*d*, 182*d*.

The valve rod 181*a*, 182*a* may be inserted through a pressure check valve installation hole formed through the inner wall 141*d*, 142*d* in the radial direction. A first end of the valve rod 181*a*, 182*a* may be exposed to the pressure transmission space Y1, Y2 and a second end may be exposed to the fluid entrance space X1, X2.

The first flange 181*b*, 182*b* may be formed on the first end of the valve rod 181*a*, 182*a*. The second flange 181*c*, 182*c* may be formed on the second end of the valve rod 181*a*, 182*a*.

The first flange 181*b*, 182*b* may have a larger outer diameter than the valve rod 181*a*, 182*a*. The second flange 181*c*, 182*c* may also have a larger outer diameter than the valve rod 181*a*, 182*a*. Therefore, when any one of the first flange 181*b*, 182*b* and the second flange 181*c*, 182*c* is in close contact with the pressure check valve installation hole, the pressure check valve 181, 182 may be closed. On the other hand, when the first flange 181*b*, 182*b* and the second flange 181*c*, 182*c* are spaced apart from the pressure check valve installation hole, the pressure check valve 181, 182 may be opened.

The elastic member 181*d*, 182*d* may be coupled to the valve rod 181*a*, 182*a*. The elastic member 181*d*, 182*d* may be configured as a coil spring surrounding the valve rod 181*a*, 182*a*. The valve rod 181*a*, 182*a* may be disposed between an outer circumferential surface of the inner wall 141*d*, 142*d* and the second flange 181*c*, 182*c*.

With this structure, the pressure check valve 181, 182 may be opened only in one direction from the fluid entrance space X1, X2 toward the pressure transmission space Y1, Y2. For example, when a difference in pressure between the fluid entrance space X1, X2 and pressure transmission space Y1, Y2 becomes greater than the restoring force of the elastic member 181*d*, 182*d* due to very high pressure generated in the fluid entrance space X1, X2, the valve rod 181*a*, 182*a* of the pressure check valve 181, 182 may push the elastic member 181*d*, 182*d* so as to be inserted into the pressure transmission space Y1, Y2. Accordingly, the first flange 181*b*, 182*b* may be spaced apart from the inner circumferential surface of the inner wall 141*d*, 142*d*, and the pressure check valve 181, 182 may be opened.

Conversely, when the difference in pressure between the fluid entrance space X1, X2 and the pressure transmission space Y1, Y2 is smaller than the restoring force of the elastic member 181*d*, 182*d*, the valve rod 181*a*, 182*a* may be restored to its initial position. Accordingly, the first flange 181*b*, 182*b* may be brought into close contact with the inner circumferential surface of the inner wall 141*d*, 142*d* to close the pressure check valve installation hole and thus the pressure check valve 181, 182 may be closed.

When fluid is introduced through the fluid entrance 141*a* formed at the first fluid entrance housing 141, the rotating shaft 110 may rotate in a first direction, which is a clockwise direction. The fluid introduced through the fluid entrance 141*a* of the first fluid entrance housing 141 while the rotating shaft 110 is rotating in the first direction may be compressed sequentially in the first fluid compression space V1 and the second fluid compression space V2, and then discharged through the fluid entrance 142*a* of the second fluid entrance housing 142.

High pressure may be generated in the fluid entrance space X2 of the second fluid entrance housing 142 by the fluid sequentially compressed in the first fluid compression space V1 and the second fluid compression space V2. The pressure check valve 182 installed in the inner wall 142*d* of the second fluid entrance housing 142 may be opened by this pressure. This pressure may be transmitted to the pressure transmission space Y1 of the first fluid entrance housing 141 through a detailed structure of the rotating shaft 110, which will be described later. Accordingly, the pressure in the pressure transmission space Y1 may become higher than the pressure in the fluid entrance space X1 of the first fluid entrance housing 141, so that the pressure check valve 181 can be closed.

On the other hand, when fluid is introduced through the fluid entrance 142*a* formed at the second fluid entrance housing 142, the rotating shaft 110 may rotate in a second direction, which is opposite to the first direction. The fluid introduced through the fluid entrance 142*a* of the second fluid entrance housing 142 while the rotating shaft 110 is rotating in the second direction may be compressed sequentially in the second fluid compression space V2 and the first fluid compression space V1, and then then discharged through the fluid entrance 141*a* of the first fluid entrance housing 141.

High pressure may be generated in the fluid entrance space X1 of the first fluid entrance housing 141 by the fluid sequentially compressed in the second fluid compression space V2 and the first fluid compression space V1. The pressure check valve 181 installed in the inner wall 141*d* of the first fluid entrance housing 141 may be opened by this pressure. This pressure may be transmitted to the pressure transmission space Y2 of the second fluid entrance housing 142 through a detailed structure of the rotating shaft 110, which will be described later. Accordingly, the pressure in the pressure transmission space Y2 may become higher than the pressure in the fluid entrance space X2 of the second fluid entrance housing 142, so that the pressure check valve 182 can be closed.

As such, the first pressure check valve 181 installed in the first fluid entrance housing 141 and the second pressure check valve 182 installed in the second fluid entrance housing 142 may be selectively opened or closed, and may not be opened or closed at the same time. The selective opening or closing means that the second pressure check valve 182 is closed when the first pressure check valve 181 is opened and the first pressure check valve 181 is closed when the second pressure check valve 182 is opened.

The pressure check valves 181 and 182 according to the present disclosure should be distinguished from check valves disclosed in Korean Registration Patent Application No. 10-1655160 (Sep. 1, 2016). The check valve disclosed in Korean Registration Patent Application No. 10-1655160 (Sep. 1, 2016) has to be opened or closed repeatedly for the transfer of fluid, which causes noise and vibration. On the other hand, when a fluid transfer direction is decided to any one direction, the pressure check valve 181, 182 of the present disclosure may be maintained in an opened or closed state until before the fluid transfer direction is switched to a reverse direction, which may not cause noise or vibration.

Figure 8A:
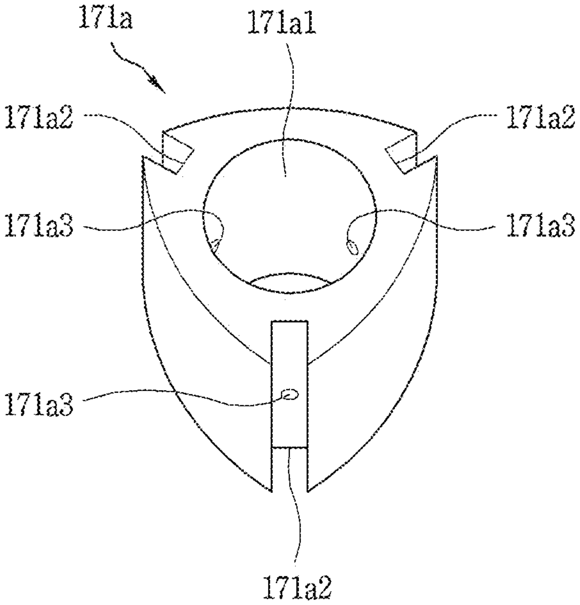
FIGS. 8A to 8C are conceptual views illustrating a detailed structure of a rotor.
Figure 8B:
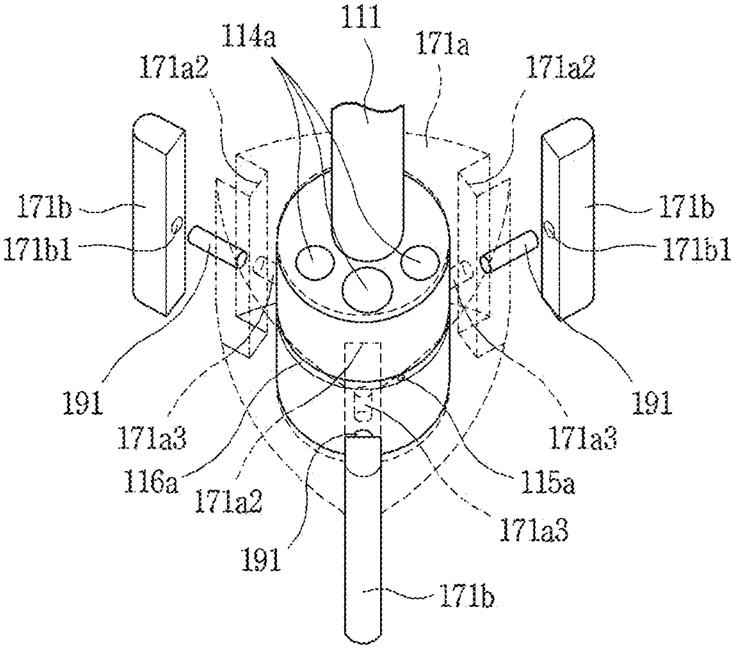
Figure 8C:
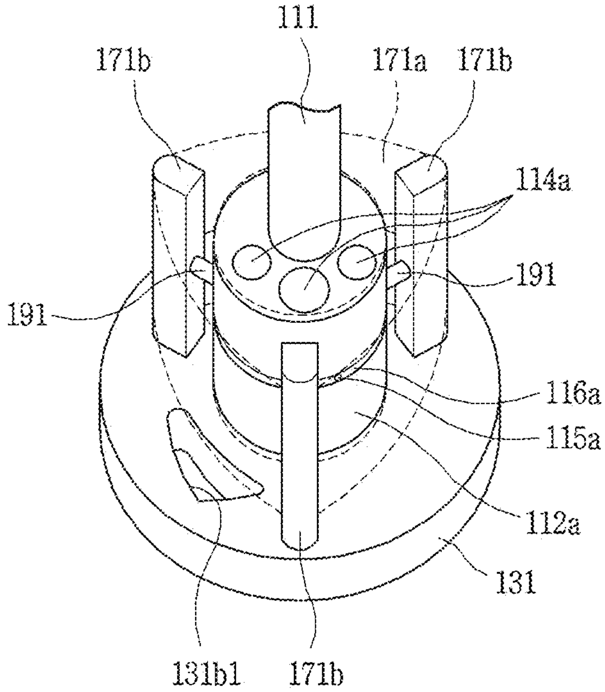

Hereinafter, an unexplained structure of the rotating shaft 110 and detailed structures of the rotors 171 and 172 will be described with reference to FIGS. 4, 5 and 8A to 8C. FIGS. 8A to 8C are conceptual views illustrating a detailed structure of the first rotor 171. The description of the first rotor 171 with reference to FIGS. 8A to 8C is equally applied to the second rotor 172.

When the rotor 171, 172 continuously moves within the rotor housing 121, 122, airtightness may be deteriorated due to friction and wear between the rotor 171, 172 and the rotor housing 121, 122. The structure of the rotating shaft 110 and the rotor 171, 172 to be described below is to prevent the deterioration of the airtightness even when the fluid transfer apparatus 100 operates for a long time.

Several holes and grooves may be formed in the rotating shaft 110.

First, an axial hole 114*a*, 114*b* may be formed through at least one of the first eccentric unit 112*a* and the second eccentric unit 112*b* in the axial direction. In order to transmit pressure, the axial hole 114*a*, 114*b* may preferably be formed through each of the first eccentric unit 112*a* and the second eccentric unit 112*b*. The axial hole 114*a*, 114*b* may be provided in plurality, and FIG. 5 illustrates a structure in which three axial holes 114*a* and 114*b* are formed in the first eccentric unit 112*a* and the second eccentric unit 112*b*, respectively.

Since an inner diameter of the rotating shaft through hole 131*a*, 132*a*, 133*a* is larger than an outer diameter of the rotation unit 111*a*, 111*b*, 111*c*, the axial holes 114*a*, 114*b* may communicate with the pressure transmission space Y1, Y2. Accordingly, the pressure of the pressure transmission space Y1, Y2 may be transmitted in the axial direction through the axial holes 114*a*, 114*b*.

A radial hole 115*a*, 115*b* may be formed through at least one of the first eccentric unit 112*a* and the second eccentric unit 112*b*, such that an outer circumferential surface of the first eccentric unit 112*a* communicates with an inner circumferential surface of the axial hole 114*a* formed through the first eccentric unit 112*a* or an outer circumferential surface of the second eccentric unit 112*b* communicates with an inner circumferential surface of the axial hole 114*b* formed through the second eccentric unit 112*b*. The radial holes 115*a*, 115*b* may be provided as many as the number of axial holes 114*a*, 114*b* to have 1:1 correspondence.

A circumferential groove 116*a*, 116*b* may be formed in at least one of the first eccentric unit 112*a* and the second eccentric unit 112*b* to correspond to the radial hole 115*a*, 115*b* in the axial direction. As the circumferential groove 116*a*, 116*b* is formed, the pressure transmitted through the radial hole 115*a*, 115*b* may be uniformly transmitted to the circumference of the first eccentric unit 112*a* or the second eccentric unit 112*b*.

While the rotating shaft 110 rotates in the first direction, the first rotor 171 may firstly compress fluid flowing into the first fluid compression space V1, and the second rotor 172 may secondarily compress the fluid flowing into the second fluid compression space V2 from the first fluid compression space V1.

On the other hand, while the rotating shaft 110 rotates in the second direction opposite to the first direction, the second rotor 172 may firstly compress fluid flowing into the second fluid compression space V2, and the first rotor 171 may secondarily compress the fluid flowing into the first fluid compression space V1 from the second fluid compression space V2.

Referring to FIGS. 8A to 8C, the first rotor 171 may include a body 171*a* and vanes 171*b*. The second rotor 172 may also have the same structure.

The body 171*a* may include an accommodating portion 171*a*1, vane slots 171*a*2, and vane slot holes 171*a*3.

The accommodating portion 171*a*1 may be formed through a center of a triangular prism having rounded edges in the axial direction to accommodate the first eccentric unit 112*a*. The accommodating portion 171*a*1 may have an inner diameter which is equal to an outer diameter of the first eccentric unit 112*a*.

The vane slots 171*a*2 may be formed in vertexes of the triangular prism having the rounded edges in the radial direction. The vane slots 171*a*2 each may have a shape recessed from the vertex of the Reuleaux triangle toward the center of the Reuleaux triangle to accommodate the vane 171*b*.

The vane slot holes 171*a*3 may be formed in the radial direction at positions, at which they correspond to the circumferential groove 116*a* of the first eccentric unit 112*a* in the axial direction, such that outer circumferential surfaces of the vane slots 171*a*2 communicate with an inner circumferential surface of the accommodating portion 171*a*1.

The vanes 171*b* may be inserted into the vane slots 171*a*2 to move together with the body 171*a*. The vanes 171*b* may be maintained in a line-contact state with the inner circumferential surface of the first rotor housing 121 in the axial direction.

As previously described for the opening principle of the pressure check valves 181 and 182, when high pressure is formed in the fluid entrance spaces X1 and X2, the pressure may be transmitted to the axial holes 114*a* of the first eccentric unit 112*a* and the axial holes 114*b* of the second eccentric unit 112*b* through the pressure transmission spaces Y1 and Y2. The axial holes 114*a* of the first eccentric unit 112*a* may communicate with the circumferential groove 116*a* through the radial holes 115*a*, and the axial holes 114*b* of the second eccentric unit 112*b* may communicate with the circumferential groove through the radial holes 115*b*.

Since the vane slot holes 171*a*3 of the body 171 are formed at positions corresponding to the circumferential groove 116*a*, 116*b* of the eccentric unit 112*a*, 112*b*, the pressure may then be transmitted to the vanes 171*b* inserted in the vane slots 171*a*2 through the circumferential groove 116*a*, 116*b* and the vane slot holes 171*a*3. The vanes 171*b* may then be pushed by the pressure in the radial direction.

Accordingly, even if being worn, the vanes 171*b* may be brought into close contact with the inner circumferential surface of the first rotor housing 121 or the inner circumferential surface of the second rotor housing 122, and move in the line-contact state in the axial direction with the inner circumferential surface of the first rotor housing 121 or the inner circumferential surface of the second rotor housing 122. According to this structure, airtightness can be continuously maintained.

The vanes 171*b* may be free in the axial direction unlike other directions, and the rotor housing covers 131, 132, and 133 may be provided with the channels 131*b*1, 131*b*2, 132*b*1, 132*b*2, 133*b*1, and 133*b*2. As a result, there may be a risk that the vanes 171*b* are separated from the vane slots 171*a*2 along the channels when the rotors 171 and 172 rotate. Therefore, it is necessary to fix the vanes 171*b* in the axial direction. To fix each vane 171*b* in the axial direction, a vane rod 191 may be used.

The vane 171*b* may be provided with a rod coupling hole 171*b*1 formed at a position facing the vane slot hole 171*a*3 in the radial direction of the first rotor 171 or the second rotor 172. The vane rod 191 may be inserted into the rod coupling hole 171*b*1 of the vane 171*b* and the vane slot hole 171*a*3 of the vane slot 171*a*2, so as to fix the vane 171*b* in the axial direction. When the vane 171*b* is fixed in the axial direction, the vane 171*b* can be prevented from being separated through the channels 131*b*1, 131*b*2, 132*b*1, 132*b*2, 133*b*1, 133*b*2 of the rotor housing covers 131, 132, and 133.

Hereinafter, the operation of the fluid transfer apparatus 100 will be described.

Figure 9A:
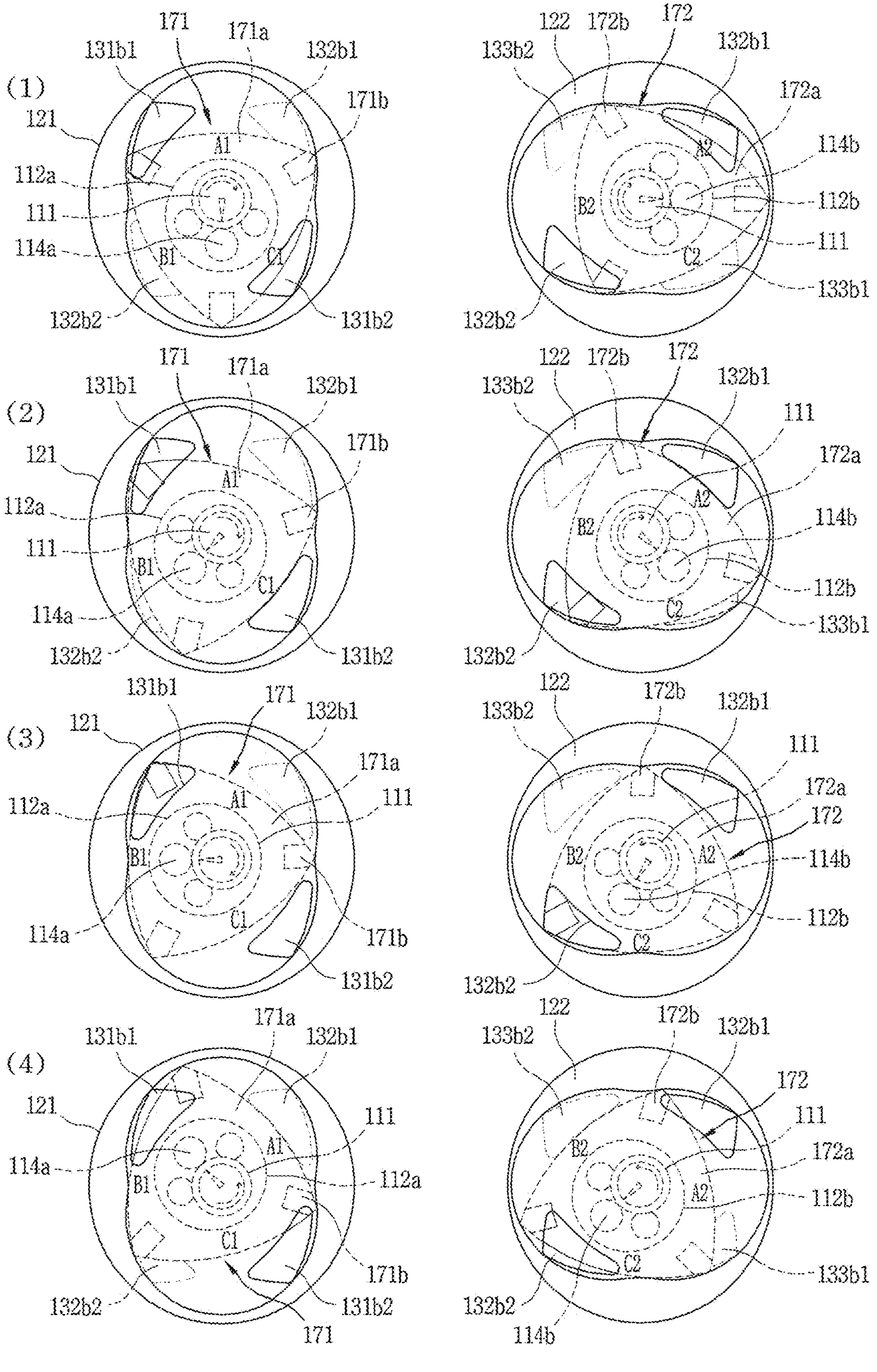
FIGS. 9A and 9B are conceptual views sequentially illustrating changes in open/closed states of channels and changes in volume of variable-volume spaces, in response to movement of a rotor until fluid introduced in the fluid transfer apparatus is discharged out of the fluid transfer apparatus.
Figure 9B:
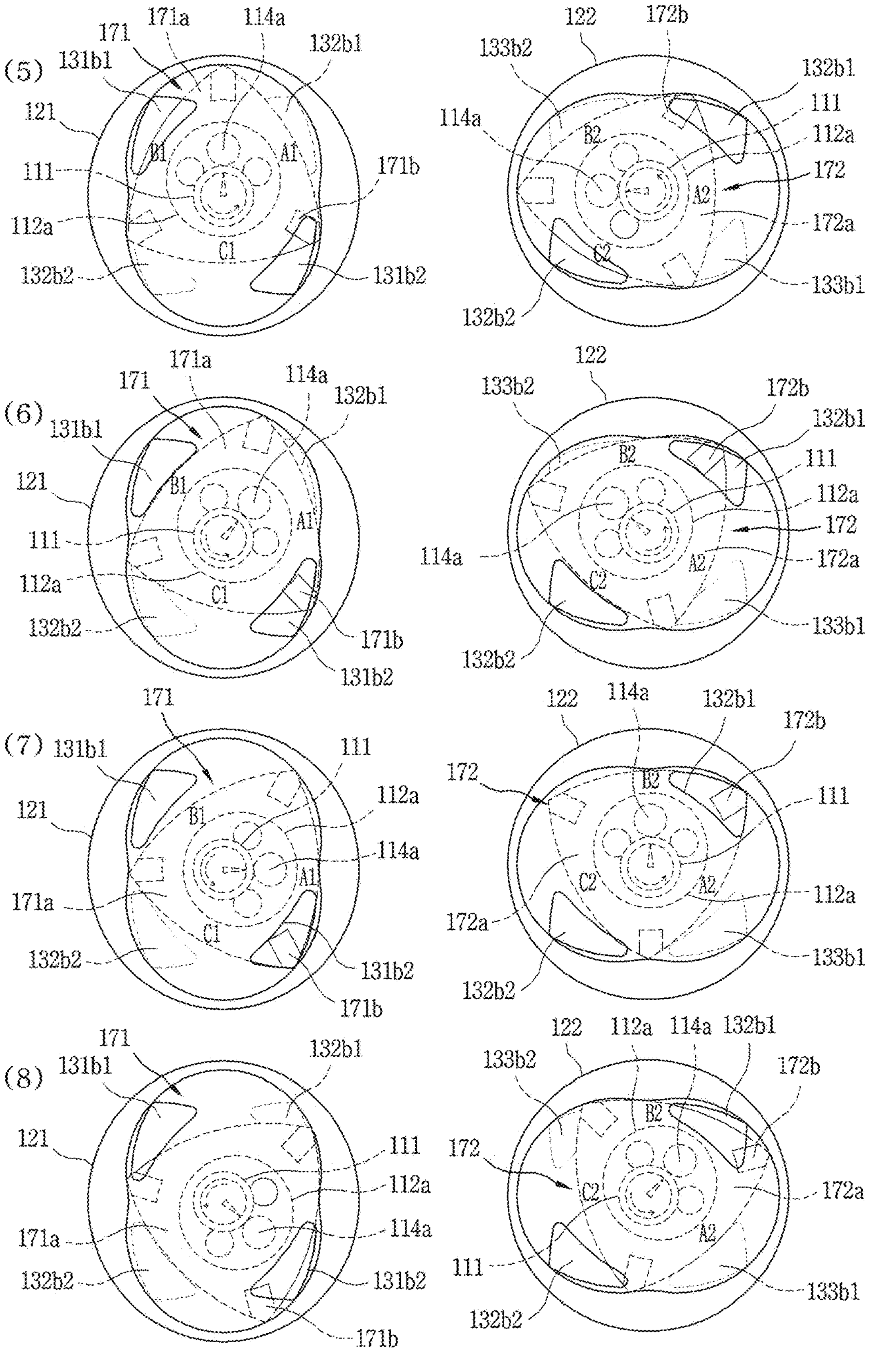

FIGS. 9A and 9B are conceptual views sequentially illustrating changes in open/closed states of channels and changes in volume of variable-volume spaces, in response to movement of the rotor 171, 172 until fluid introduced in the fluid transfer apparatus 100 is discharged out of the fluid transfer apparatus 100.

FIGS. 9A and 9B illustrate from top to bottom the operation of the fluid transfer apparatus 100 that appears whenever the rotating shaft 110 rotates by 45° in a first direction as a clockwise direction. Drawings on the left in FIG. 9 illustrate a state in which the first rotor housing cover 131, the first rotor 171, the first rotor housing 121, and the second rotor housing cover 132 are projected in a direction viewing the rotating shaft 110 from one end toward another end. And, drawings on the right in FIG. 9 illustrate a state in which the second rotor housing cover 132, the second rotor 172, the second rotor housing 122, and the third rotor housing cover 133 are projected in a direction viewing the rotating shaft 110 from the one end toward the another end.

When the rotating shaft 110 rotates in a first direction, which is a clockwise direction, fluid may be compressed according to the order illustrated in FIGS. 9A and 9B. The fluid may be compressed first in the first fluid compression space V1 and then compressed in the second fluid compression space V2. When the fluid transfer apparatus 100 continuously operates, the process of FIGS. 9A and 9B may be repeated. A1, B1, and C1 may denote variable-volume spaces defined by three sides A, B, and C of the first rotor 171 and the first rotor housing 121. Similarly, A2, B2, and C2 may denote variable-volume spaces defined by three sides A, B, and C of the second rotor 172 and the second rotor housing 122.

First, the drawing (1) may correspond to an initial condition before the fluid transfer apparatus 100 operates.

When the rotating shaft 110 rotates 90° from the drawing (1) to the drawing (3) via the drawing (2), the volume of the space A1 in the first rotor housing 121 may decrease and the volume of the space A2 in the second rotor housing 122 may increase.

At the same time, the volume of the space B1 may decrease and the volume of the space B2 may also decrease. Since the channel 131*b*1 as an inlet of the space B1 and the channel 133*b*2 as an inlet of the space B2 are blocked by the first rotor 171, fluid in the space B1 may be discharged together with fluid in the space B2 through the channel 133*b*2 via the channel 132*b*2.

At this time, as the volume of the space C2 decreases, fluid in the space C2 may be discharged through the channel 133*b*1.

When the first rotor 171 moves in the first fluid compression space V1 in response to the eccentric rotation of the first eccentric unit 112*a* or the second rotor 172 moves in the second fluid compression space V2 in response to the eccentric rotation of the second eccentric unit 112*b*, any one of the three rounded edges forming the first rotor 171 or the second rotor 172 may meet a middle side M of the channel, and another edge may meet a short side S of the channel at the same time. Accordingly, while the first rotor 171 is moving in the drawing (3), the channel 131*b*1 and the channel 132*b*2 may be momentarily closed by the first rotor 171 and simultaneously the channel 132*b*2 and the channel 133*b*1 may be closed by the second rotor 172.

Next, while proceeding from the drawing (3) to (5) via (4), the volume of the space A2 may increase but the volume of the space A1 connected through the channel 132*b*1 may decrease. The fluid in the space A2 may be discharged through the channel 133*b*1 as much as a difference between the decreased volume of the space A1 and the increased volume of the space A2.

Due to the decrease in the volume of the space B2, the fluid may be discharged through the channel 133*b*2. In the state of the drawing (3), the space C2 may have the minimum volume. As the volume of the space C2 increases, the fluid in the space C1 may flow into the spaced C2 through the channel 132*b*2. As the volume of the space C1 also increases, the fluid may be introduced through the channel 131*b*2.

Next, as shown in the drawings (5), (6), and (7), while the rotating shaft 110 is rotating, the fluid in the space A1 may flow into the space A2 through the channel 132*b*1 and the fluid in the space A2 may be discharged through the channel 133*b*1. The fluid in the space B2 may be discharged through the channel 133*b*2. As the volume of the space C2 continuously increases, the fluid in the space C1 may be introduced through the channel 132*b*2. At this time, as the volume of the space C1 decreases, the fluid may be introduced through the channel 131*b*2 as much as a difference between the increased volume of the space C2 and the decreased volume of the space C1.

In the drawing (7), the channels 131*b*2 and 132*b*1 may be momentarily closed by the first rotor 171, and simultaneously the channels 132*b*1 and 133*b*2 may be closed by the second rotor 172. The movement of fluid while the rotating shaft 110 is rotating from the drawings (7) to (8) may be understood by the foregoing description.

After the state in the drawings (7) and (8), as described above, the first rotor 171 and the second rotor 172 may return to the positions as illustrated in the drawing (1). However, only the position of the side A may be replaced with the side B. And the aforementioned processes may be repeated.

During the process of going back to the state of the drawing (1) sequentially via those states of the drawings (1) to (8), the rotating shaft 110 may rotate 360°. While the rotating shaft 110 rotates, the fluid may be transferred through the repetitive increase and decrease in volume of each variable-volume space. During the process, the first fluid entrance 141*a* and the second fluid entrance 142*a* may always be blocked from each other.

Therefore, the fluid transfer apparatus 100 of the present disclosure can continuously transfer fluid from the first fluid entrance 141*a* to the second fluid entrance 142*a* or vice versa in the state in which the first fluid entrance 141*a* and the second fluid entrance 142*a* do not directly communicate with each other. This may result in achieving excellent vacuum and pressurization performance without the need for a check valve.

When the angle of the rotating shaft 110 in the drawing (1) corresponding to the initial operating condition of the fluid transfer apparatus 100 is 0°, which is a reference angle, the space A1 may have the maximum volume at 0° and have the minimum volume at 270° corresponding to the drawing (7). While the process proceeds from the drawings (1) to (7), the volume of the space A1 may continue to decrease. And in the drawing (8), the volume of the space A1 may start to increase again.

Figure 10:
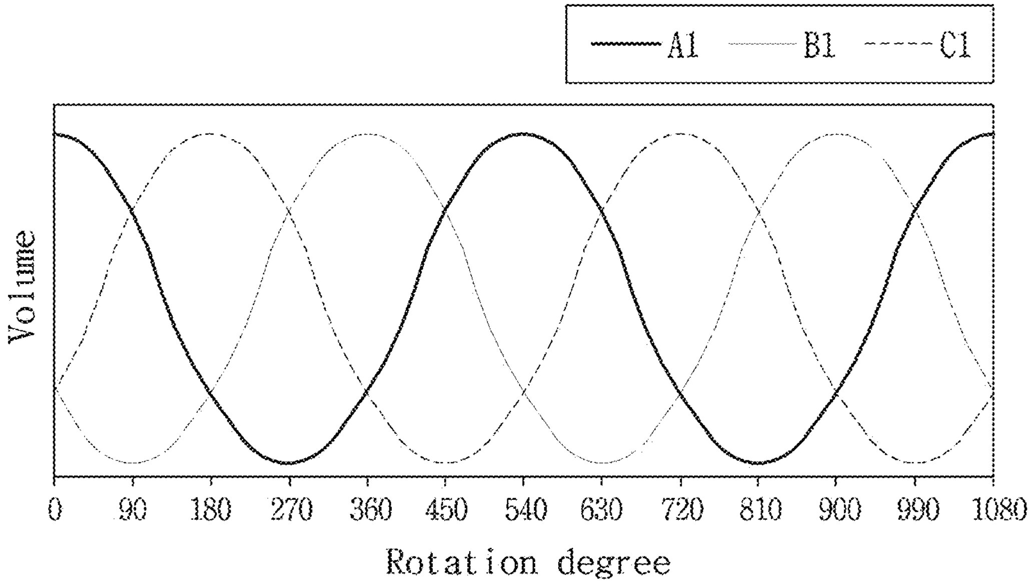
FIG. 10 is a graph showing changes in volume of variable-volume spaces according to a rotation angle of a rotating shaft.

In this manner, as the rotating shaft 110 rotates, each variable-volume space may repeatedly increase and decrease in volume, and the changes in volume of each variable-volume space may follow a sinusoidal curve as shown in FIG. 10.

FIG. 10 is a graph showing changes in volume of variable-volume spaces according to a rotation angle of the rotating shaft.

The changes in volume of the spaces B1 and C1 may also follow a sinusoidal curve just like the changes in volume of the space A1. And the changes in volume of the spaces A1, B1, and C1 may have a phase difference of 180° with respect to the rotation angle of the rotating shaft 110. Fluid may be discharged from the fluid transfer apparatus 100 as much as the change in volume of each variable-volume space.

In addition, the inflow of the fluid may occur while the volume of each variable-volume space increases from the minimum to the maximum, and the outflow of the fluid may occur while the volume of each variable-volume space decreases from the maximum to the minimum. As such, the volume change may follow the sinusoidal curve. Therefore, the volume variation of the space A1 according to the rotation angle of the rotating shaft may be the smallest at the rotation angles (e.g., 0°, 270°, 540°, 810°, 1080°, etc.) having the maximum volume and the minimum volume, and may also be the largest at intermediate angles (135°, 405°, 675°, 945°) of the rotation angles with the maximum volume and the minimum volume.

Figure 11:
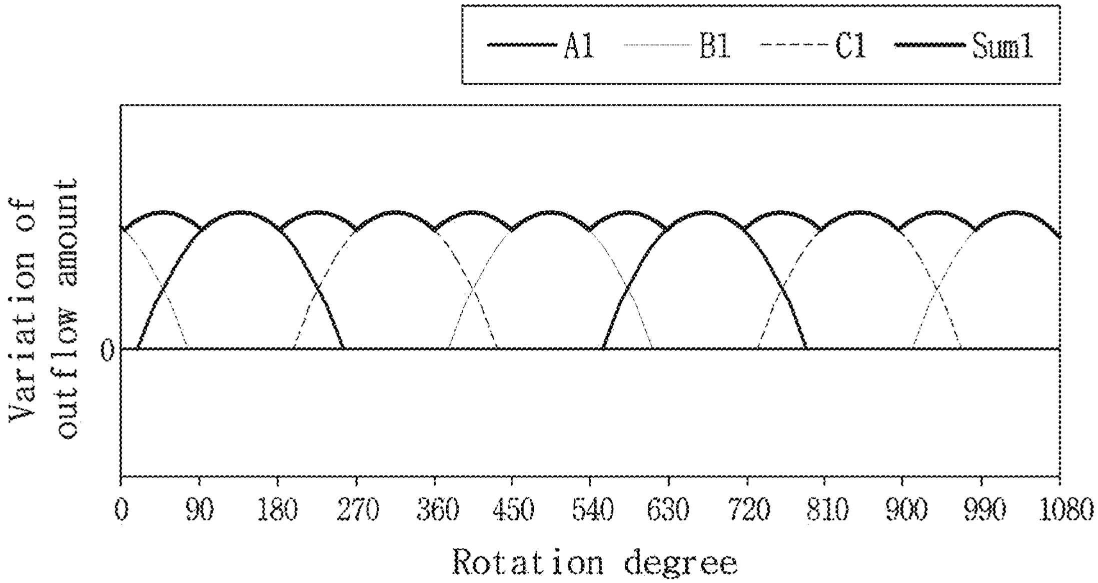
FIG. 11 is a graph showing an outflow amount of fluid according to a rotation angle of a rotating shaft in a fluid transfer apparatus (Comparative Example) having only a single rotor.

Since fluid is discharged only while each variable-volume space proceeds from the maximum volume to the minimum volume and is not discharged while proceeding from the minimum volume to the maximum volume, the variation of an outflow amount of fluid according to the rotation angle of the rotating shaft may be shown in FIG. 11. However, FIG. 11 illustrates a case corresponding to a fluid transfer apparatus having only a single rotor.

FIG. 11 is a graph showing an outflow amount of fluid according to a rotation angle of a rotating shaft in a fluid transfer apparatus (Comparative Example) having only a single rotor.

FIG. 11 shows a variation of an outflow amount of fluid by one rotor and one rotor housing, which corresponds to a comparative example. The comparative example shows an aspect different from the fluid transfer apparatus 100 having the two rotors 171 and 172 and the two rotor housings 121 and 122 as proposed in the present disclosure. For example, in the fluid transfer apparatus 100 of the present disclosure having the two rotors 171 and 172 and the two rotor housings 121 and 122, there may be a case in which an outflow of fluid occurs simultaneously in the first rotor housing 121 and the second rotor housing 122.

For example, while the rotating shaft rotates from the drawings (1) to (3) in FIGS. 9A and 9B, the fluid in the space B2 may be discharged through the channel 133*b*2 and simultaneously the fluid in the space B1 may also be discharged through the channel 133*b*2 via the channel 132*b*2. Also, while proceeding from the drawing (3) to the drawing (5), the volume of the space A2 may increase but the volume of the space A1 may decrease since the space A2 is connected to the channel 132*b*1. Due to this, the volume increase and decrease (volume variation) of the space A1 and the space A2 may be offset. As a result, an amount of fluid corresponding to a difference in volume variation between the spaces A1 and A2 may be discharged through the channel 133*b*1. While proceeding from the drawing (5) to the drawing (7), an amount of fluid corresponding to the sum of volume variations of the spaces A1 and A2 may be discharged through the channel 133*b*1.

Figure 12A:
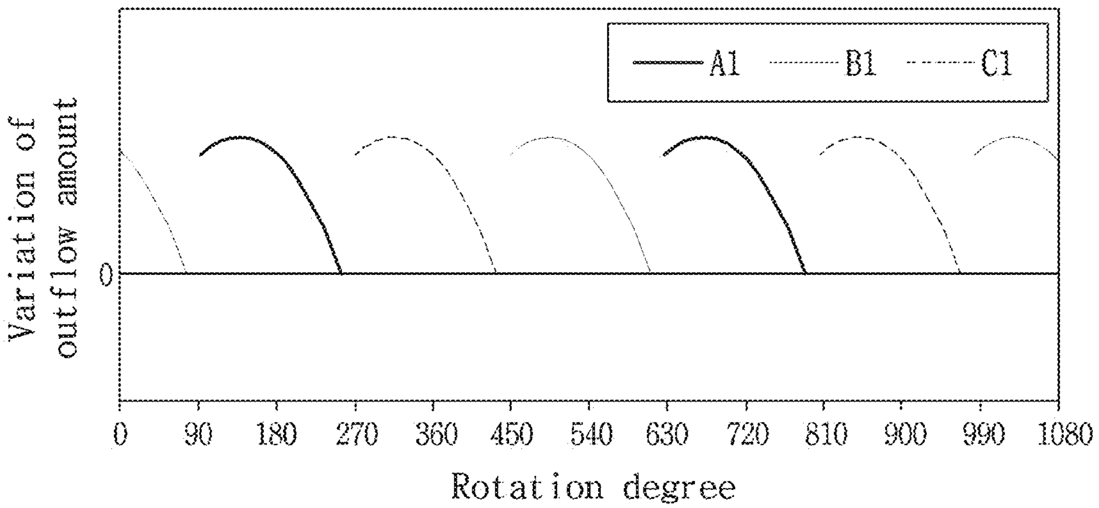
FIGS. 12A and 12B are graphs showing an outflow amount of fluid according to a rotation angle of a rotating shaft in a fluid transfer apparatus of the present disclosure having a first rotor and a second rotor.
Figure 12B:
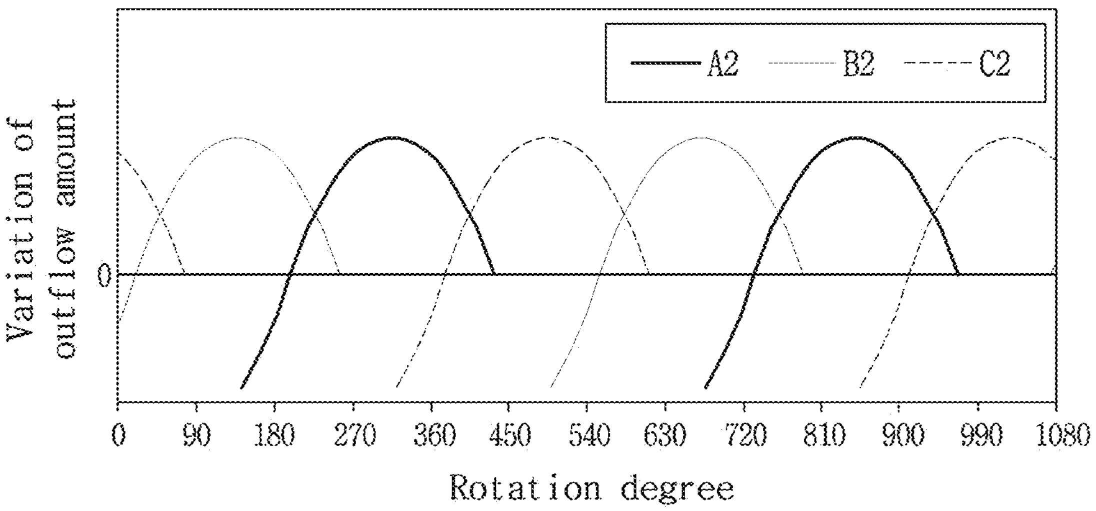

As such, the variation of the outflow amount of fluid in the fluid transfer apparatus 100 including the two rotors 171 and 172 and the two rotor housings 1121 and 122 may be illustrated in FIGS. 12A and 12B.

FIGS. 12A and 12B are graphs showing an outflow amount of fluid according to the rotation angle of the rotating shaft 110 in the fluid transfer apparatus 100 of the present disclosure having the first rotor 171 and the second rotor 172.

FIG. 12A illustrates a variation of an outflow amount of fluid occurred by the first rotor 171 and the first rotor housing 121 when the fluid transfer apparatus 100 operates according to the processes of FIGS. 9A and 9B. The variations of the outflow amount of the fluid in the spaces A1, B1, and C1 may have a phase difference of 180° with respect to the rotation angle of the rotating shaft. And FIG. 12B illustrates a variation of an outflow amount of fluid occurred by the second rotor 172 and the second rotor housing 122 when the fluid transfer apparatus 100 operates according to the processes of FIGS. 9A and 9B. There may also be a case where the variation of the outflow amount of fluid has a negative value by reflecting the case where the volume increase and decrease of the spaces A2, B2, and C2 is offset.

Figure 13:
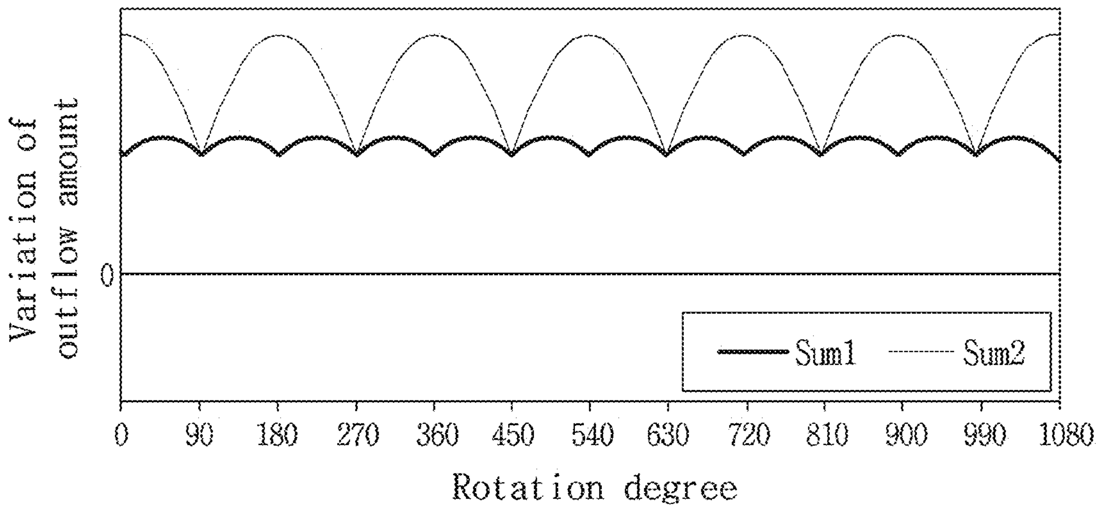
FIG. 13 is a graph for comparing an outflow amount of fluid in a fluid transfer apparatus having only a single rotor with an outflow amount of fluid in a fluid transfer apparatus proposed in the present disclosure.

Finally, the sum of the variations of the outflow amount of the fluid in FIGS. 12A and 12B is the same as Sum2 in FIG. 13. FIG. 13 is a graph for comparing an outflow amount of fluid in a fluid transfer apparatus (Sum1) having only a single rotor with an outflow amount of fluid in the fluid transfer apparatus (Sum2) proposed in the present disclosure.

Through the comparison of FIG. 13, it can be confirmed that the outflow amount of fluid of the present disclosure was improved (increased) by 50% per rotation of the rotating shaft 110, compared to the structure disclosed in Korean Registration Patent Application No. 10-1655160 (Sep. 1, 2016). In addition, unlike Korean Registration Patent Application No. 10-1655160 (Sep. 1, 2016), since the present disclosure does not require a check valve for fluid transfer, a flow rate can be increased by 1.5 times even while achieving simplification of a structure and miniaturization of the fluid transfer apparatus.

Hereinafter, a fluid transfer apparatus 200 according to another implementation proposed by the present disclosure will be described in detail with reference to the accompanying drawings.

Figure 14:
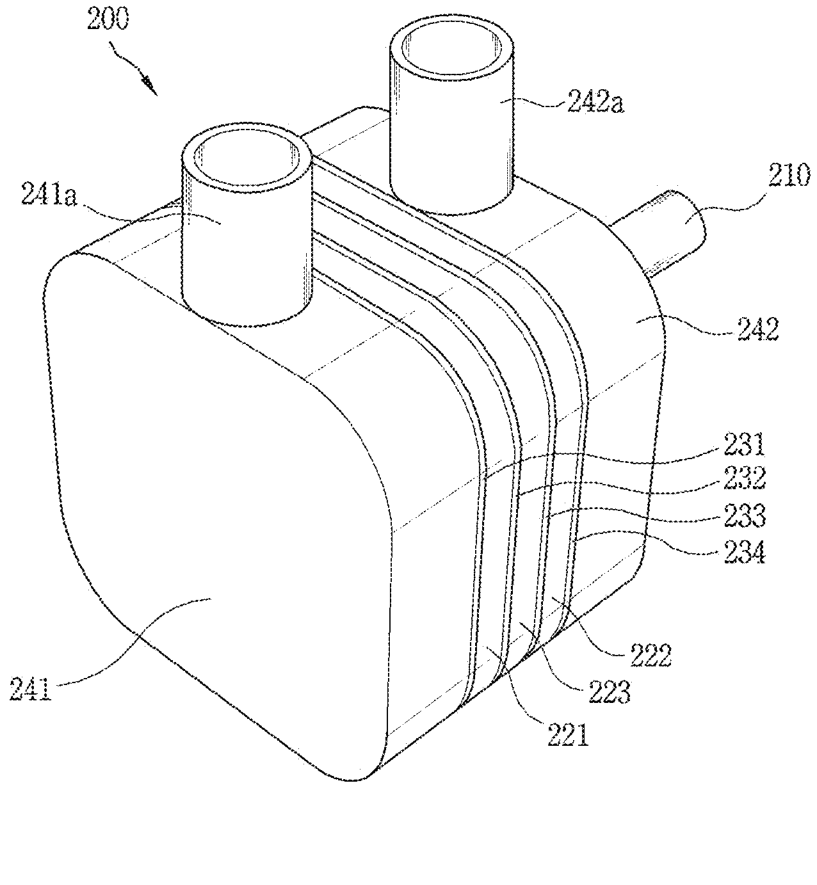
FIG. 14 is a perspective view illustrating appearance of a fluid transfer apparatus in accordance with another implementation proposed by the present disclosure.

FIG. 14 is a perspective view illustrating appearance of a fluid transfer apparatus 200 in accordance with the present disclosure.

The fluid transfer apparatus 200 may have appearance defined by a rotating shaft 210, a rotor housing 221, 222, a channel housing 223, a rotor housing cover 231, 232, 233, 234, and a fluid entrance housing 241, 242. The fluid transfer apparatus 200 may have appearance in a shape of a rectangular column with rounded corners, as illustrated in FIG. 14, but may not be limited thereto.

The rotor housing 221, 222 may be provided in plurality, referred to as a first rotor housing 221 and a second rotor housing 222. The rotor housing cover 231, 131, 132, 234 may be provided in plurality, referred to as a first rotor housing cover 131, a second rotor housing cover 132, a third rotor housing cover 233, and a fourth rotor housing cover 234. The fluid entrance housing 241, 242 may be provided in plurality, referred to as a first fluid entrance housing 241 and a second fluid entrance housing 242.

The first fluid entrance housing 241, the first rotor housing cover 231, the first rotor housing 221, the second rotor housing cover 232, the channel housing 223, the third rotor housing cover 233, the second rotor housing 222, the fourth rotor housing cover 234, and the second fluid entrance housing 242 may be disposed sequentially from one end to another end of the fluid transfer apparatus 200. And the rotating shaft 210 may be exposed to one side of the fluid transfer apparatus 200 as illustrated in FIG. 14.

The first fluid entrance housing 241 may be disposed on the one end of the fluid transfer apparatus 200. The second fluid entrance housing 242 may be disposed on the another end of the fluid transfer apparatus 200. The first fluid entrance housing 241 and the second fluid entrance housing 242 may define an outer surface of the fluid transfer apparatus 200.

The first fluid entrance housing 241 and the second fluid entrance housing 242 may be provided with fluid entrances 241*a* and 242*a*, respectively. The fluid entrances 241*a* and 242*a*, as illustrated in FIG. 14, may protrude from outer circumferential surfaces of the fluid entrance housings 241 and 242, respectively, but may not be limited thereto.

The fluid transfer apparatus 200 proposed in the present disclosure may transfer fluid in both directions. Accordingly, the two fluid entrances 241*a* and 242*a* may be either a fluid inlet or a fluid outlet depending on a direction in which the fluid is transferred.

The rotor housing covers 231, 232, 233, and 234, the rotor housings 221 and 222, and the channel housing 223 may be disposed in an alternating manner. The rotor housing covers 231, 232, 233, and 234 may also be spaced apart from one another. The rotor housings 221 and 222 and the channel housing 223 may be disposed between the adjacent rotor housing covers 231, 232, 233, and 234. The rotor housing covers 231, 232, 233, and 234, the rotor housings 221 and 222, and the channel housing 223 may define a continuous outer circumferential surface of the fluid transfer apparatus 200 together with the fluid entrance housings 241 and 242.

The rotating shaft 210 may be inserted through the fluid transfer apparatus 200. The rotating shaft 210 may be connected to a power source such as a motor or a generator, to receive rotational driving force from the power source and rotate by the received rotational driving force.

Hereinafter, the inner structure of the fluid transfer apparatus 200 will be described.

Figure 15:
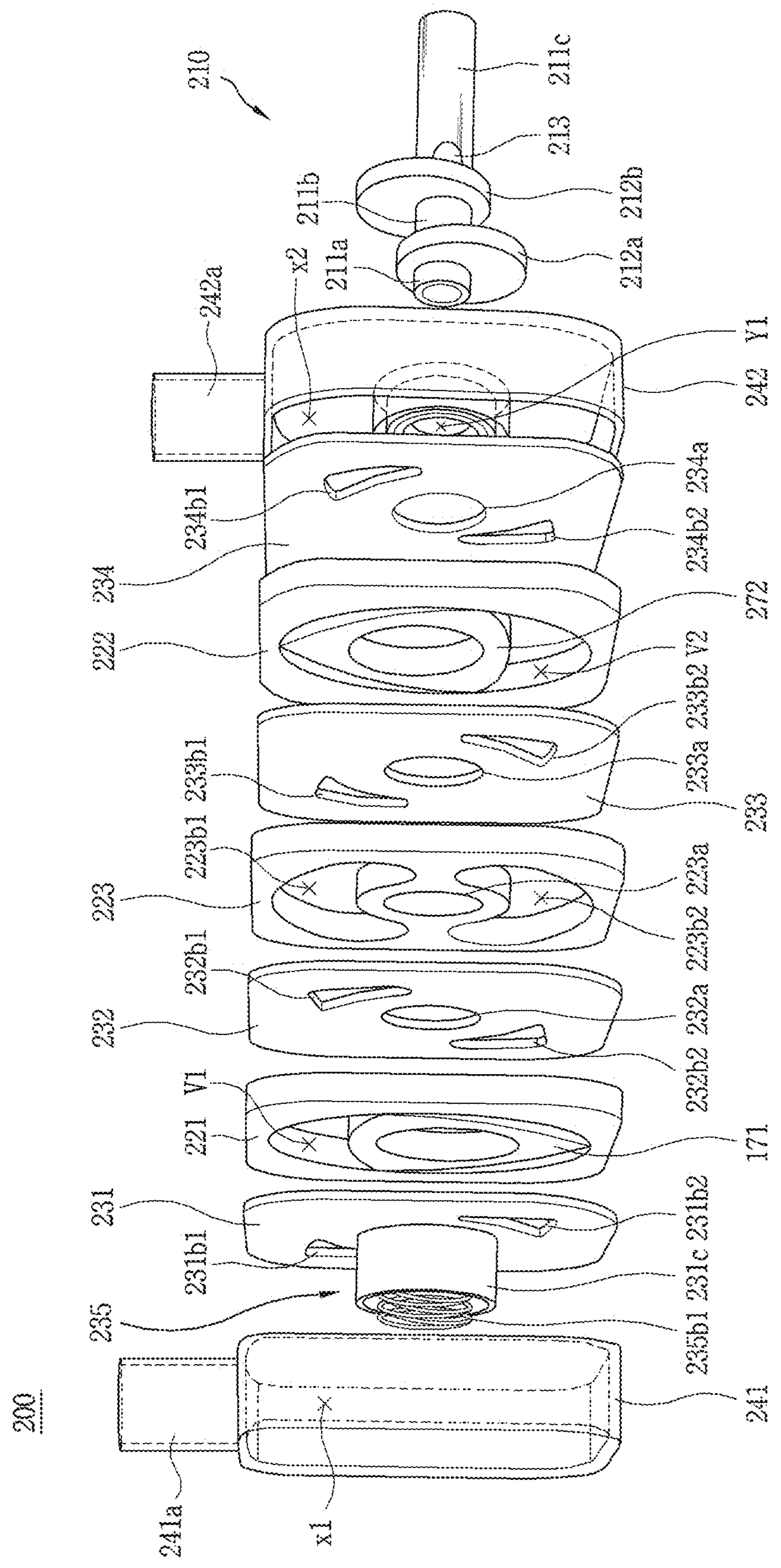
FIG. 15 is an exploded perspective view of the fluid transfer apparatus illustrated in FIG. 14.

FIG. 15 is an exploded perspective view of the fluid transfer apparatus 200 illustrated in FIG. 14.

Figure 16A:
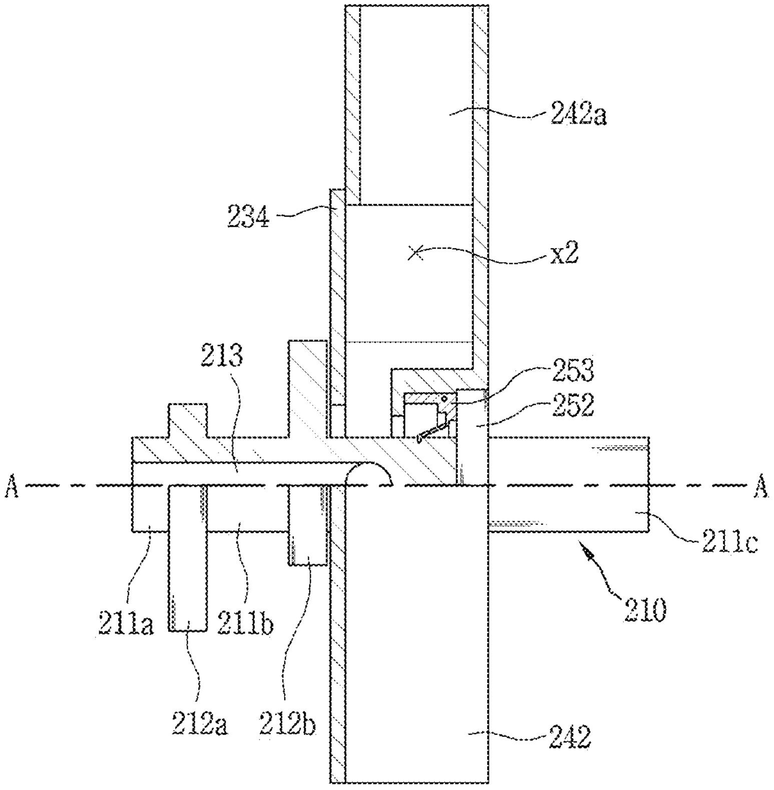
FIG. 16A is a conceptual view illustrating a structure of a second fluid entrance housing and a fourth rotor cover housing of the fluid transfer apparatus illustrated in FIG. 14.

FIG. 16A is a conceptual view illustrating a structure of the second fluid entrance housing 242 and the fourth rotor cover housing 234 of the fluid transfer apparatus illustrated in FIG. 14.

Figure 16B:
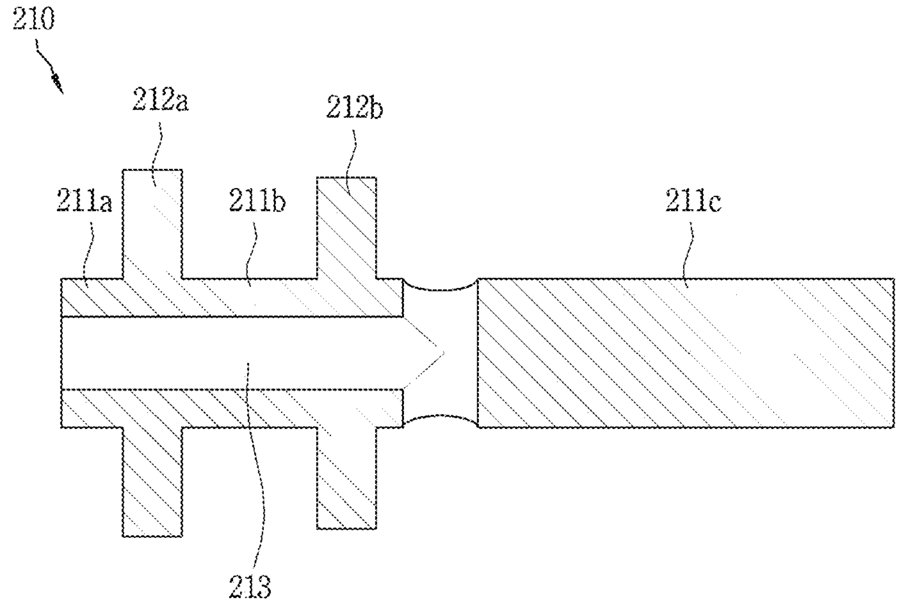
FIG. 16B is a conceptual view illustrating a cross-section of a rotating shaft taken along the line A-A of FIG. 16A.

FIG. 16B is a conceptual view illustrating a cross-section of the rotating shaft 210 taken along line A-A of FIG. 16A.

Figure 17:
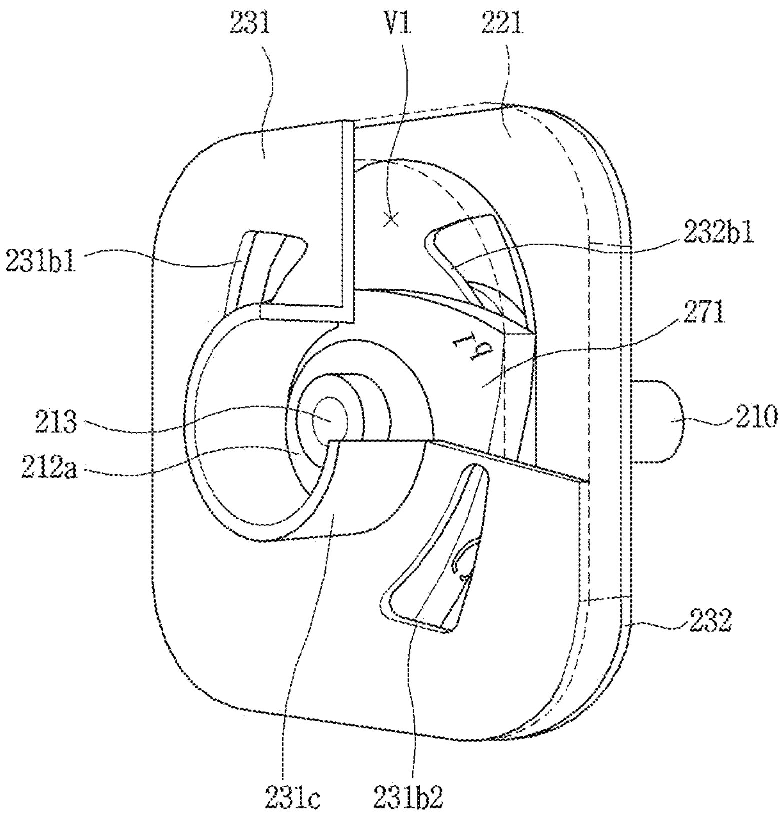
FIG. 17 is a conceptual view illustrating a structure of a first rotor housing of the fluid transfer apparatus illustrated in FIG. 14.

FIG. 17 is a conceptual view illustrating a structure of the first rotor housing 221 of the fluid transfer apparatus 200 illustrated in FIG. 14.

Figure 18:
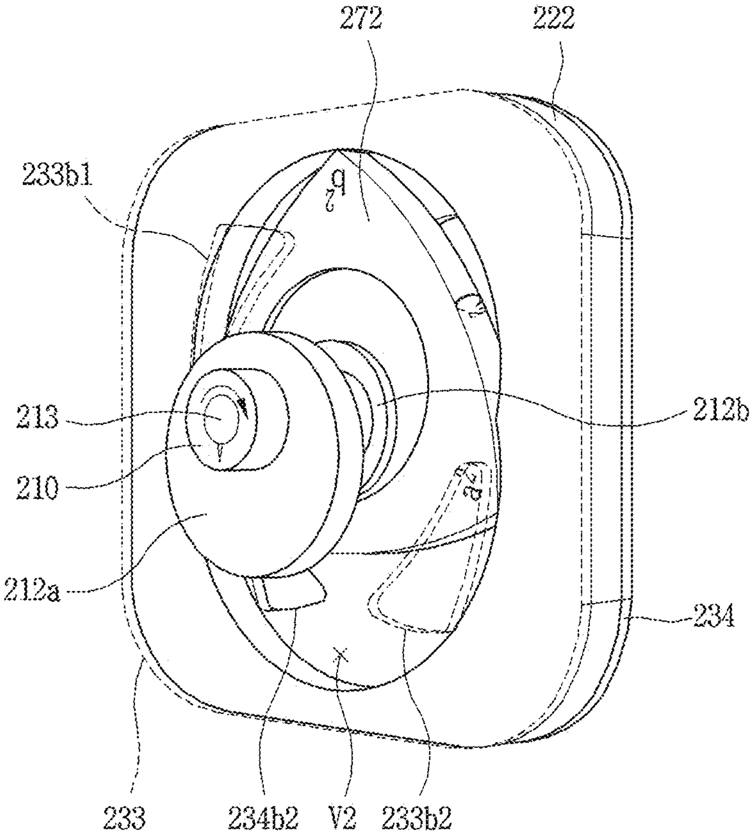
FIG. 18 is a conceptual view illustrating a structure of a second rotor housing of the fluid transfer apparatus illustrated in FIG. 14.

FIG. 18 is a conceptual view illustrating a structure of the second rotor housing 222 of the fluid transfer apparatus 200 illustrated in FIG. 14.

Figure 19:
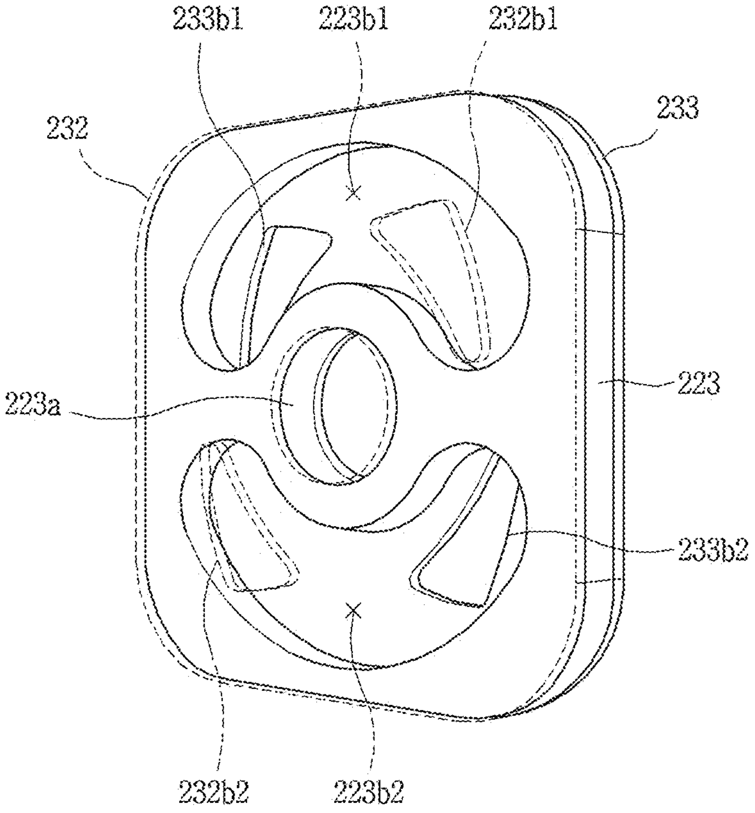
FIG. 19 is a conceptual view illustrating a structure of a channel housing of the fluid transfer apparatus illustrated in FIG. 14.

FIG. 19 is a conceptual view illustrating a structure of the channel housing 223 of the fluid transfer apparatus 200 illustrated in FIG. 14.

Figure 20:
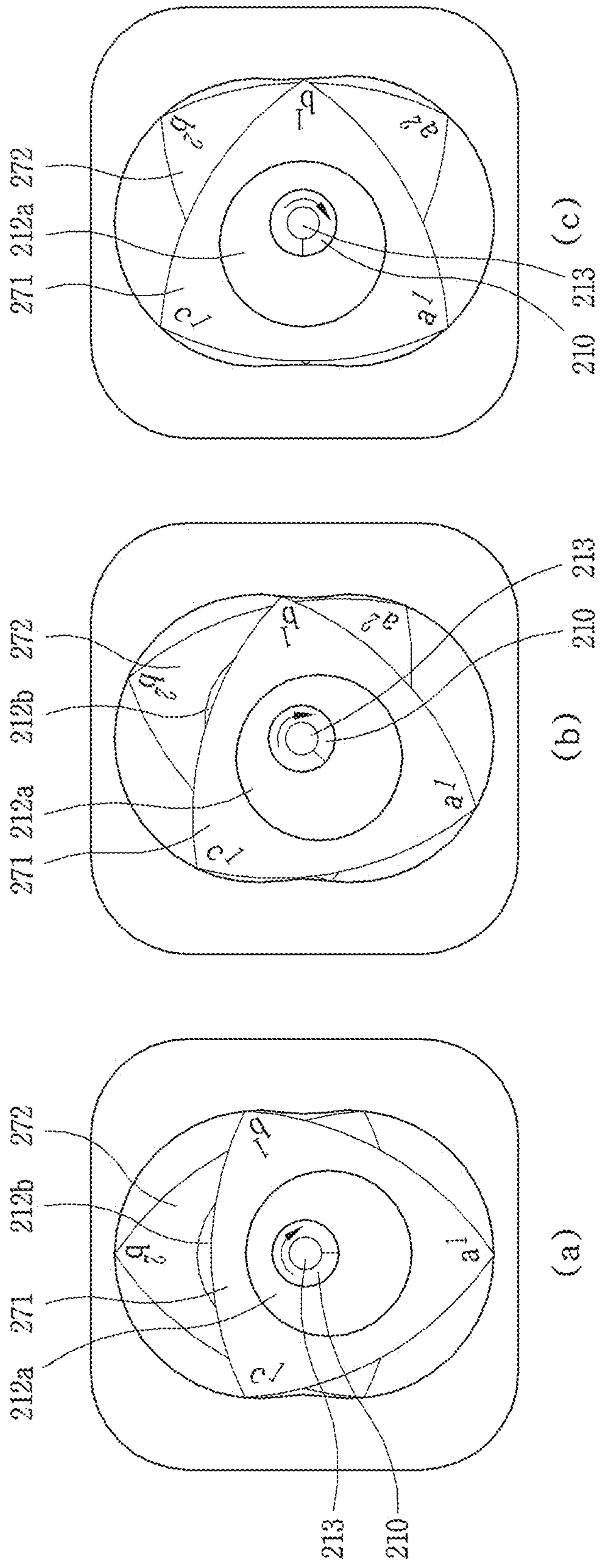
FIG. 20 is a conceptual view illustrating changes according to rotations of a first rotor and a second rotor, viewed in an axial direction of the first rotor and the second rotor.

FIG. 20 is a conceptual view illustrating changes according to rotations of a first rotor 271 and a second 272 when viewing the first rotor 271 and the second rotor 272 in the axial direction.

Figure 21:
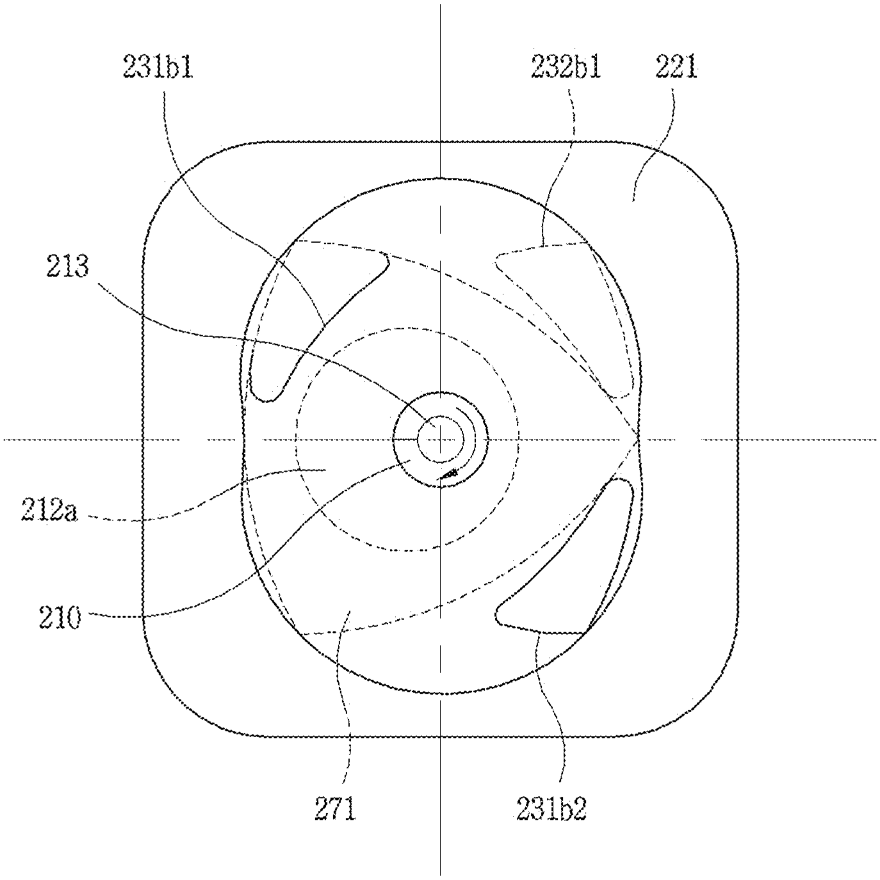
FIG. 21 is a conceptual view of a first rotor housing, viewed from the front.

FIG. 21 is a conceptual view of the first rotor housing 221, viewed from the front.

Figure 27A:
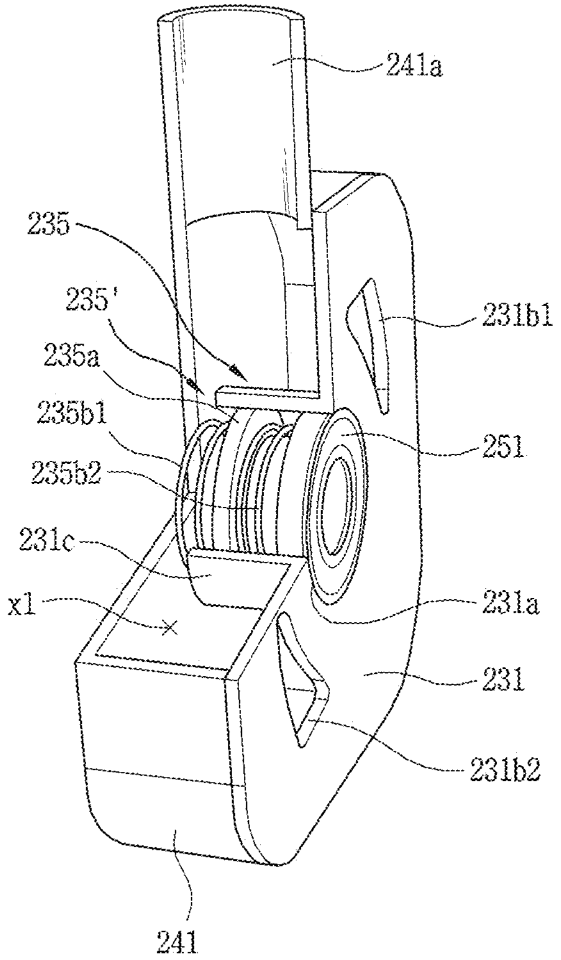
FIG. 27A is a conceptual view illustrating a structure of a first fluid entrance housing and a first rotor housing cover of the fluid transfer apparatus illustrated in FIG. 14.

FIG. 27A is a conceptual view illustrating a structure of the first fluid entrance housing 241 and the first rotor housing cover 231 of the fluid transfer apparatus 200 illustrated in FIG. 14.

Figure 27B:
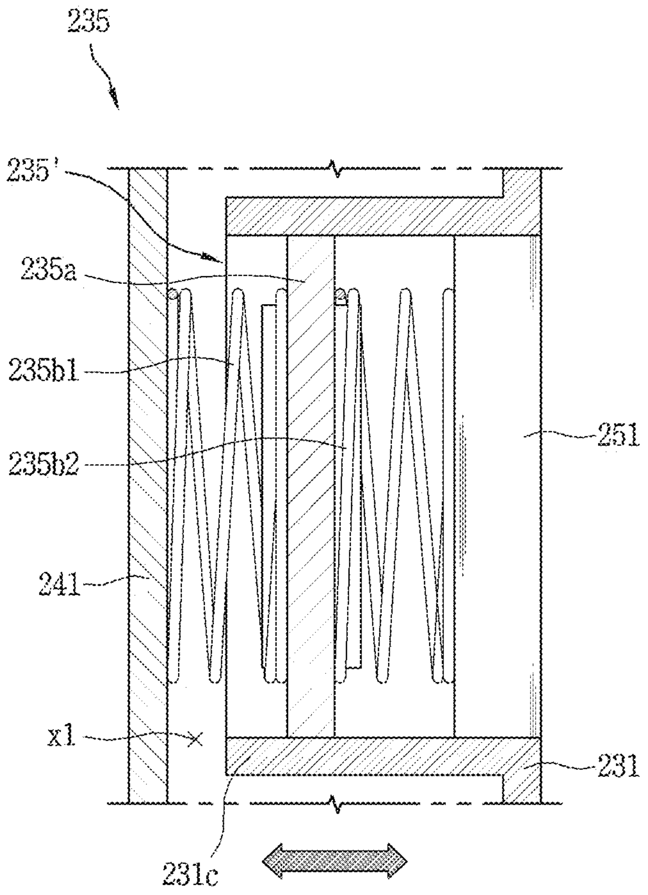
FIG. 27B is an enlarged conceptual view of a pulsation reducing unit illustrated in FIG. 14.

FIG. 27B is an enlarged conceptual view of a pulsation reducing unit 235 illustrated in FIG. 14.

Figure 27C:
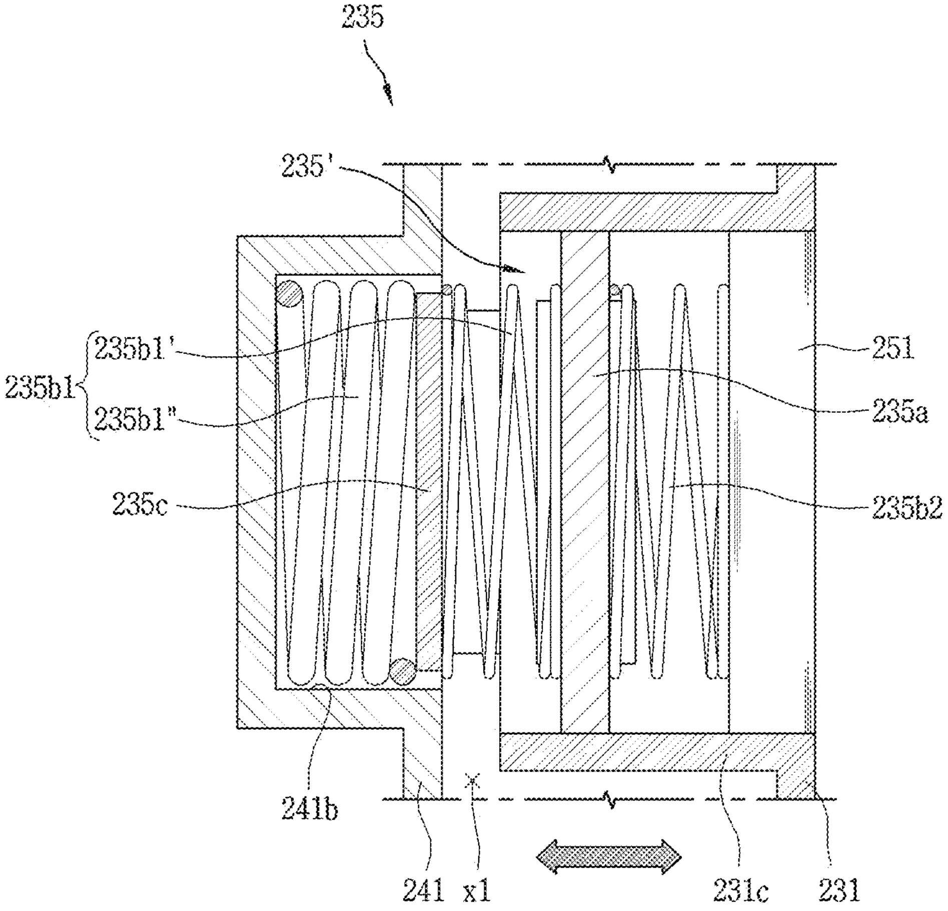
FIG. 27C is a conceptual view illustrating another implementation of the pulsation reducing unit illustrated in FIG. 27B.

FIG. 27C is a conceptual view illustrating another implementation of the pulsation reducing unit 235 illustrated in FIG. 27B.

The rotating shaft 210 may be inserted through a center of the fluid transfer apparatus 200, so that one end thereof is disposed inside the fluid transfer apparatus 200 and another end thereof is exposed to outside of the fluid transfer apparatus 200. The rotating shaft 210 may include rotation units 211*a*, 211*b*, and 211*c* rotating in place and eccentric units 212*a* and 212*b* rotating eccentrically. A connection channel 213 passing through the rotating shaft 210 may be formed in the rotating shaft 210. As illustrated in FIGS. 16A and 16B, the connection channel 213 may allow the fluid entrance space X1 of the first fluid entrance housing 241 to communicate with the fluid entrance space X2 of the second fluid entrance housing 242. The connection channel 213 will be described later.

The rotation units 211*a*, 211*b*, and 211*c* may extend in an axial direction. The axial direction refers to a direction extending from one end to another end of each rotation unit 211*a*, 211*b*, 211*c* or vice versa. The eccentric units 212*a* and 212*b* may be eccentrically coupled to the rotation units 211*a*, 211*b*, and 211*c*. Therefore, when the rotation units 211*a*, 211*b*, and 211*c* rotate in place, the eccentric units 212*a*, and 212*b* may rotate eccentrically centering on the rotation units 211*a*, 211*b*, and 211*c*.

The rotation units 211*a*, 211*b*, and 211*c* and the eccentric units 212*a* and 212*b* may be alternately disposed in the axial direction. The first rotation unit 211*a*, the first eccentric unit 212*a*, the second rotation unit 211*b*, the second eccentric unit 212*b*, and the third rotation unit 211*c* may be arranged sequentially from one end to another end of the rotating shaft 210. In the axial direction, the first rotation unit 211*a*, the second rotation unit 211*b*, and the third rotation unit 211*c* may be located at positions spaced apart from one another in the axial direction. In addition, the first eccentric unit 212*a* and the second eccentric unit 212*b* may also be located at positions spaced apart from each other in the axial direction.

The first rotation unit 211*a* may be formed on one end of the rotating shaft 210. The first rotation unit 211*a* may be coupled to the first eccentric unit 212*a* in the axial direction.

The first eccentric unit 212*a* may be disposed between the first rotation unit 211*a* and the second rotation unit 211*b* in the axial direction. The first eccentric unit 212*a* may be connected to the first rotation unit 211*a* and the second rotation unit 211*b* in the axial direction.

The second rotation unit 211*b* may be disposed between the first eccentric unit 212*a* and the second eccentric unit 212*b* in the axial direction. The second rotation unit 211*b* may be connected to the first eccentric unit 212*a* and the second eccentric unit 212*b* in the axial direction.

The second eccentric unit 212*b* may be disposed between the second rotation unit 211*b* and the third rotation unit 211*c* in the axial direction. The second eccentric unit 212*b* may be connected to the second rotation unit 211*b* and the third rotation unit 211*c* in the axial direction.

The third rotation unit 211*c* may be formed on another end of the rotating shaft 210. The third rotation unit 211*c* may be coupled to the second eccentric unit 212*b* in the axial direction.

The relative positions of the first eccentric unit 212*a* and the second eccentric unit 212*b* may be defined when the rotating shaft 210 is projected on a plane while viewing the rotating shaft 210 from the one end to the another end. For example, since the first eccentric unit 212*a* and the second eccentric unit 212*b* are eccentrically coupled to the rotation units 211*a*, 211*b*, and 211*c*, distances from a center of the rotation units 211*a*, 211*b*, and 211*c* to outer circumferential surfaces of the eccentric units 212*a* and 212*b* may not be constant. Accordingly, a direction having a longest distance of the distances from the center of the rotation units 211*a*, 211*b*, and 211*c* to the outer circumferential surfaces of the eccentric units 212*a* and 212*b* may be defined as a direction in which the eccentric units 212*a* and 212*b* are formed.

In this case, the first eccentric unit 212*a* and the second eccentric unit 212*b* may be disposed to have an angle of 180° with respect to the rotation units 211*a*, 211*b*, and 211*c*. That is, the first eccentric unit 212*a* and the second eccentric unit 212*b* may be symmetrically disposed with respect to the rotating shaft 210.

For smooth rotation and sealing of the rotating shaft 210, the fluid transfer apparatus 200 may include bearings 251 and 252. The bearings 251 and 252 may be formed in an annular shape to surround the rotating shaft 210. Inner circumferential surfaces of the bearings 251 and 252 may be brought into contact with the rotating shaft 210. The bearing 251 disposed at one end of the rotating shaft 210 may be coupled to a rotating shaft through hole 231*a* formed through the first rotor housing cover 231, and the bearing 252 disposed at another end of the rotating shaft 210 may be coupled to a rotating shaft accommodation hole Y1 formed through the second fluid entrance housing 242. As illustrated in FIG. 16A, the rotating shaft 210 may include an oil seal 253 that is disposed in the second fluid entrance space X2 to prevent fluid in the second fluid entrance space X2 from leaking to the outside through the bearing 252 located at the another side of the rotating shaft 210.

The first rotor housing 221 and the second rotor housing 222 may be spaced apart from each other in the axial direction. The first rotor housing 221 may be disposed at a position corresponding to the first eccentric unit 212*a*, and the second rotor housing 222 may be disposed at a position corresponding to the second eccentric unit 212*b*.

As illustrated in FIG. 17, the first rotor housing 221 may define a first fluid compression space V1. The first fluid compression space V1 may be opened toward the first rotor housing cover 231 and the second rotor housing cover 232. As illustrated in FIG. 18, the second rotor housing 222 may define a second fluid compression space V2. The second fluid compression space V2 may be opened toward the third rotor housing cover 233 and the fourth rotor housing cover 234.

The first rotor housing 221 and the second rotor housing 222 may be formed in a hollow cylindrical or polygonal shape. When the first rotor housing 221 and the second rotor housing 222 are viewed in the axial direction, an inner circumferential surface of the first rotor housing 221 and an inner circumferential surface of the second rotor housing 222 may have an epitrochoid shape. Regions in the epitrochoid shape may correspond to the first fluid compression space V1 and the second fluid compression space V2, respectively. Also, the first rotor housing 221 and the second rotor housing 222, as illustrated in FIG. 7, may be disposed such that each of the epitrochoid curves face the same direction.

The shapes of the first fluid compression space V1 and the second fluid compression space V2 may be seen in more detail with reference to FIG. 20.

As described above with reference to FIGS. 6A and 6B, the epitrochoid shape means a curve drawn by a point of a second circle that rolls outside the first circle while in contact with the first circle. The epitrochoid shape may vary depending on a size ratio of the first circle and the second circle, and may be shown in various manners.

Figure 23A:
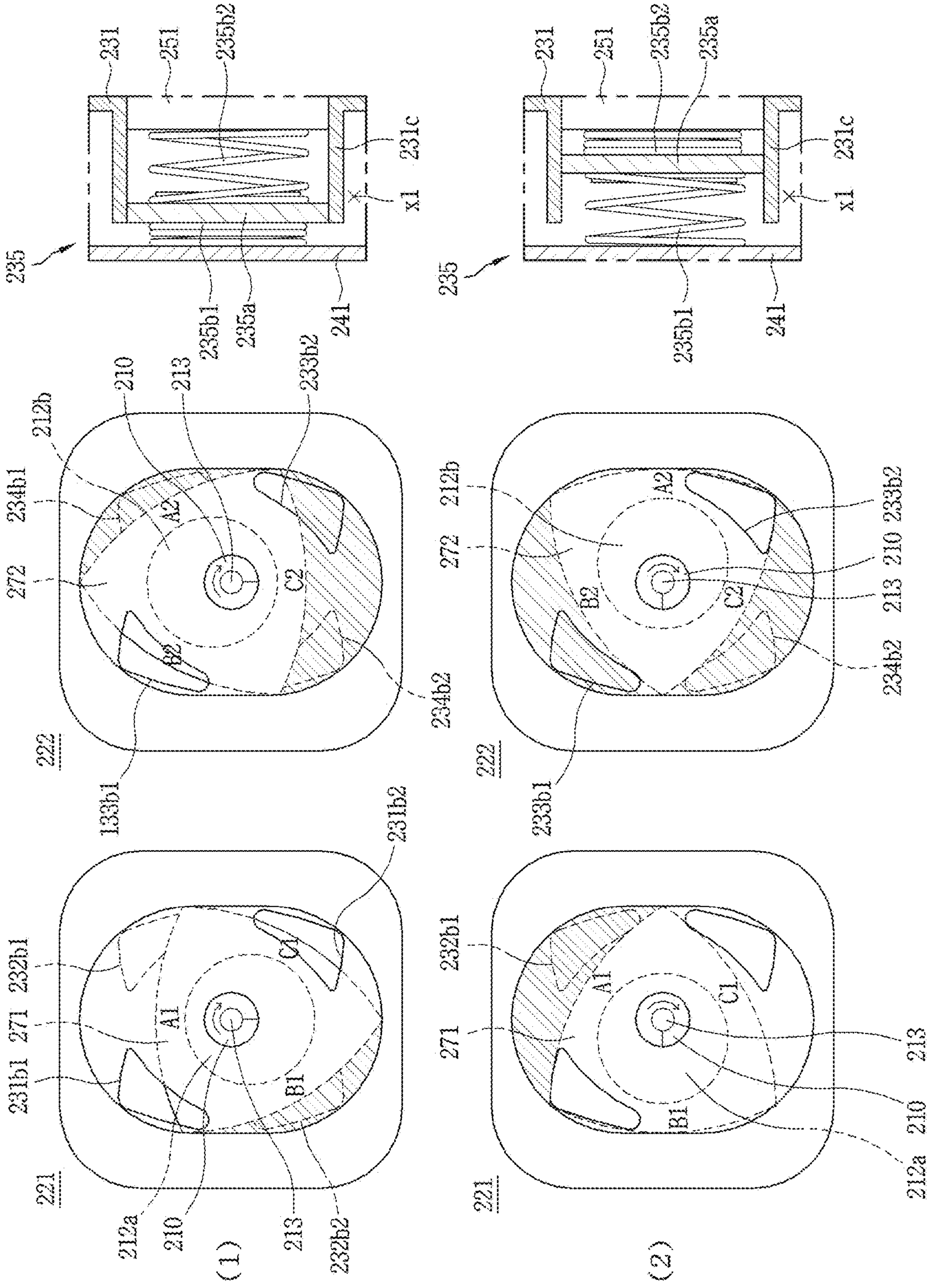
FIGS. 23A and 23B are conceptual views sequentially illustrating processes of discharging fluid introduced into the fluid transfer apparatus illustrated in FIG. 14.
Figure 23B:
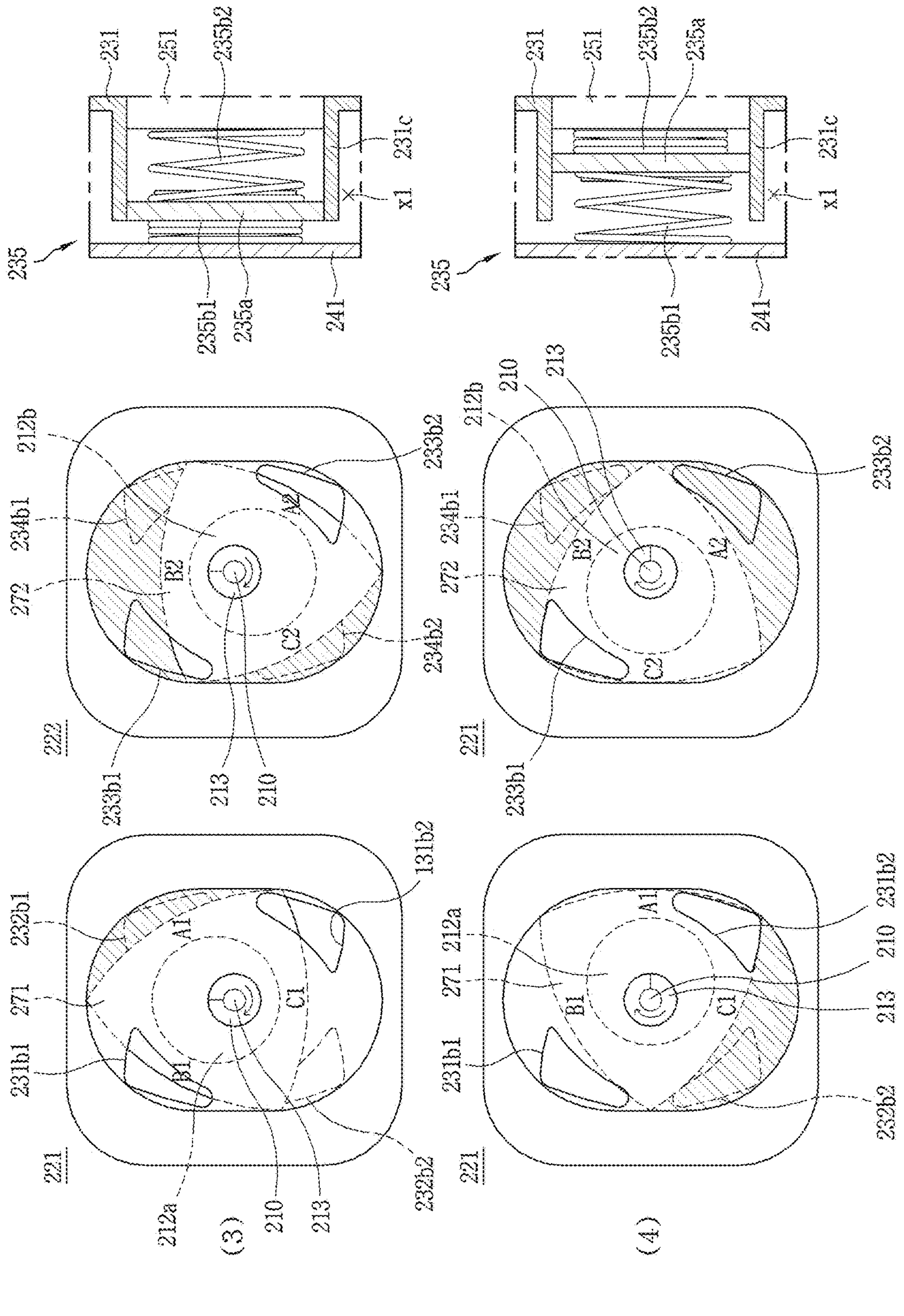

Arrangement directions of the first rotor housing 221 and the second rotor housing 222 may be determined based on a direction in which the epitrochoid surface is facing. For example, as illustrated in FIGS. 15, 23A, and 23B, when the epitrochoid curve of the first rotor housing 221 and the epitrochoid curve of the second rotor housing 222 exactly overlap each other on a plane, it can be said that the first rotor housing 221 and the second rotor housing 222 are arranged to face the same direction.

A first rotor 271 and a second rotor 272 each may have a shape of a triangular prism. It may be understood that the shape of the rotors 271 and 272 is similar to an equilateral triangular prism but its side surfaces are curved surfaces each having a shape which convexly protrudes outward. The curved surfaces correspond to the epitrochoid curves of the rotor housings 221 and 222. A triangle having rounded sides (edges) like a radial cross section of the first rotor 271 and the second rotor 272 is referred to as a Reuleaux triangle.

The first rotor 271 may be disposed in the first fluid compression space V1 so as to divide the first fluid compression space V1 of the first rotor housing 221 into a plurality of variable-volume spaces. Similar to this, the second rotor 272 may be disposed in the second fluid compression space V2 so as to divide the second fluid compression space V2 of the second rotor housing 222 into a plurality of variable-volume spaces. The volume is the same term as the capacity of a space accommodating or containing fluid to be compressed. Therefore, the variable-volume space means that a volume or capacity is inconstant and varies in response to the rotation of the rotor 271, 272.

As the first rotor 271 is disposed in the first fluid compression space V1 and the second rotor 272 is disposed in the second fluid compression space V2, the first fluid compression space V1 and the second fluid compression space V2 each may be divided into three variable-volume spaces. As the first rotor 271 and the second rotor 272 rotate, the three variable-volume spaces may change in volume or capacity while repeatedly being compressed and expanded.

The first eccentric unit 212*a* may be disposed in the first fluid compression space V1 of the first rotor housing 221. The first rotor 271 may be coupled to the first eccentric unit 212*a* while surrounding the first eccentric unit 212*a* in the radial direction of the first eccentric unit 212*a*. Likewise, the second eccentric unit 212*b* may be disposed in the second fluid compression space V2 of the second rotor housing 222. The second rotor 272 may be coupled to the second eccentric unit 212*b* while surrounding the second eccentric unit 212*b* in the radial direction of the second eccentric unit 212*b*.

The first rotor 271 may be coupled to the first eccentric unit 212*a* so as to move together with the first eccentric unit 212*a*. The second rotor 272 may be coupled to the second eccentric unit 212*b* so as to move together with the second eccentric unit 212*b*. The rotation units 211*a*, 211*b*, and 211*c* of the rotating shaft 210 may rotate in place, but the first eccentric unit 212*a* and the second eccentric unit 212*b* may rotate eccentrically unlike the rotation units 211*a*, 211*b*, and 211*c*. Accordingly, the first rotor 271 and the second rotor 272 coupled to the first eccentric unit 212*a* and the second eccentric unit 212*b*, respectively, may move within regions defined by the epitrochoid curves while rotating centering on the first eccentric unit 212*a* and the second eccentric unit 212*b*, respectively.

Meanwhile, the fluid transfer apparatus using a volume variation (volume change) caused by the eccentric rotation of the triangular rotor inside the rotor housing having the epitrochoid curve may transfer a large amount of fluid, but may generate vibration because a rotation center of the rotor and a centroid of the rotor are different from each other due to the eccentric rotation structure of the triangular rotor.

In the fluid transfer apparatus 200 of the present disclosure, as illustrated in FIG. 20, the first rotor 271 and the second rotor 272 may be arranged to form point symmetry relative to the rotating shaft 210. In other words, as the rotating shaft 210 rotates, the first rotor 271 and the second rotor 272 may always be symmetrical to each other with respect to the rotating shaft 210. Accordingly, since a centrifugal force of the first rotor 271 and a centrifugal force of the second rotor 272 generated by the eccentric rotation in response to the rotation of the rotating shaft 210 are the same, the centrifugal forces generated during the rotation of the first rotor 271 and the second rotor 272 are canceled out from each other. That is, the fluid transfer apparatus 200 may greatly reduce vibration, which occurs in a fluid transfer apparatus having a triangular rotor according to the related art, by symmetrically arranging the first rotor 221 and the second rotor 222 relative to the rotating shaft 210 and connecting channels by the channel housing 223.

Referring to FIG. 21, the channel housing 223 may define fluid communication spaces 223*b*1 and 223*b*2. The channel housing 223 may be disposed between the first rotor housing 221 and the second rotor housing 222. The channel housing 223 may serve as a channel such that the fluid in the first and second fluid compression spaces V1 and V2 flows from the first rotor housing 221 to the second rotor housing 222 or from the second rotor housing 222 to the first rotor housing 221 in a rotating direction of the rotating shaft 210 through the fluid communication spaces 223*b*1 and 223*b*2. The fluid communication spaces 223*b*1 and 223*b*2 may include a first communication space 223*b*1 and a second communication space 223*b*2. The first communication space 223*b*1 and the second communication space 223*b*2 will be described later.

On the other hand, referring to FIG. 17, the first rotor housing cover 231 may cover the first fluid communication space V1 at one side. The second rotor housing cover 231 may be disposed on one side of the first rotor housing 221. Here, the one side of the first rotor housing 221 refers to a position between the first fluid entrance housing 241 and the first rotor housing 221.

The second rotor housing cover 232 may cover the first fluid compression space V1 and the fluid communication spaces 223*b*1 and 223*b*2. The second rotor housing cover 232 may be disposed between the first rotor housing 221 and the channel housing 223. One surface of the second rotor housing cover 232 may face the first fluid compression space V1 and another surface of the second rotor housing cover 132 may face the fluid communication spaces 223*b*1 and 223*b*2.

Referring to FIG. 18, the third rotor housing cover 233 may cover the fluid communication spaces 223*b*1 and 223*b*2. The third rotor housing cover 233 may be disposed between the channel housing 223 and the second rotor housing 222. One surface of the third rotor housing cover 233 may face the fluid communication spaces 223*b*1 and 223*b*2, and another surface of the third rotor housing cover 233 may face the second fluid compression space V2.

The fourth rotor housing cover 234 may cover the second fluid communication space V2. The fourth rotor housing cover 234 may be disposed at an opposite side to the third rotor housing cover 233 based on the second rotor housing 222. One surface of the fourth rotor housing cover 234 may face the second fluid communication space V2 and another surface of the fourth rotor housing cover 244 may face the second fluid compression space X2.

The first rotor housing cover 231, the second rotor housing cover 232, the third rotor housing cover 234, and the fourth rotor housing cover 234 may commonly be formed in a shape of a circular or polygonal plate. In addition, each circular plate or the polygonal plate may commonly include a rotating shaft through hole 231*a*, 232*a*, 233*a*, 234*a* and channels 231*b*1, 231*b*2, 232*b*1, 232*b*2, 233*b*1, 233*b*2, 234*b*1, 234*b*2. In addition, the channel housing 223 may also be formed in a shape of a circular plate or a polygonal plate. The channel housing 223 may also be provided with a rotating shaft through hole 223*a*.

The rotating shaft through hole 231*a*, 232*a*, 233*a*, 234*a*, 223*a* may be formed through the center of the circular plate or polygonal plate in the axial direction. The rotating shaft through hole 231*a*, 232*a*, 233*a*, 234*a*, and 223*a* may be a region for accommodating the rotation unit 211*a*, 211*b*, 211*c* of the rotating shaft 210.

The first rotation unit 211*a* may be accommodated in the rotating shaft through hole 231*a* of the first rotor housing cover 231. The second rotation unit 211*b* may be accommodated in the rotating shaft through holes 232*a*, 233*a*, and 223*a* of the second rotor housing cover 232, the third rotor housing cover 233, and the channel housing 223. The third rotation unit 211*c* may be accommodated in the rotating shaft through hole 234*a* of the fourth rotor housing cover 234.

Here, the bearing 251 may be disposed between the outer circumferential surface of the first rotation unit 211*a* and the first rotor housing cover 231.

A distance between the first rotor housing cover 231 and the second rotor housing cover 232 in the axial direction may correspond to a thickness of the first rotor 271. Likewise, a distance between the third rotor housing cover 233 and the fourth rotor housing cover 234 in the axial direction may correspond to a thickness of the second rotor 272.

The channel 231*b*1, 231*b*2, 232*b*1, 232*b*2, 233*b*1, 233*b*2, 234*b*1, 234*b*2 may be formed through the circular plate or the polygonal plate in the axial direction. The channel 231*b*1, 231*b*2, 232*b*1, 232*b*2, 233*b*1, 233*b*2, 234*b*1, 234*b*2 may allow fluid to pass therethrough in the axial direction.

The channel 231*b*1, 231*b*2, 232*b*1, 232*b*2, 233*b*1, 233*b*2, 234*b*1, 234*b*2 may be provided in plurality for each of the rotor housing covers 231, 232, 233, and 234. For example, as shown in the drawings, one rotor housing cover 231, 232, 233, 234 may be provided with two (a pair of) channels 231*b*1 and 231*b*2, 232*b*1 and 232*b*2, 233*b*1 and 233*b*2, and 234*b*1 and 234*b*2. Each pair of channels 231*b*1 and 231*b*2, 232*b*1 and 232*b*2, 233*b*1 and 233*b*2, and 234*b*1 and 234*b*2 may be formed in a symmetrical shape at positions symmetrical to each other with respect to the rotating shaft through hole 231*a*, 232*a*, 233*a*, 234*a*. Each pair of channels 231*b*1 and 231*b*2, 232*b*1 and 232*b*2, 233*b*1 and 233*b*2, and 234*b*1 and 234*b*2 may have a triangular shape to correspond to positions of the first rotor 271 and the second rotor 272. For example, as illustrated in FIG. 21, the channel **231*b*1 of the first rotor housing cover 231 may have a shape covered by the first rotor 271** that eccentrically rotates.

Positions of the pair of channels **231*b*1 and 231*b*2, 232*b*1 and 232*b*2, 233*b*1 and 233*b*2, and 234*b*1 and 234*b*2 formed in each of the rotor housing covers 231, 232, 233, and 234 may be described in a manner that each of the rotor housing covers 231, 232, 233, and 234 is projected on one quadrant in a direction of viewing the rotating shaft 210 from one end toward another end. Here, the rotating shaft through holes 231*a*, 232*a*, 233*a*, and 234*a*** may be located at the center of the quadrant.

One channel **231*b*1 of the two channels 231*b*1 and 231*b*2 of the first rotor housing cover 231 may be located on a second quadrant, and another one channel 231*b*2 of the two channels 231*b*1 and 231*b*2 may be located on a fourth quadrant. One 232*b*1 of the two channels 232*b*1 and 232*b*2 of the second rotor housing cover 232 may be located on a first quadrant, and another one 232*b*2 of the two channels 232*b*1 and 232*b*2 of the second rotor housing cover 232 may lie on a third quadrant. One 233*b*1 of the two channels 233*b*1 and 233*b*2 of the third rotor housing cover 233 may be located on the second quadrant, and another one 233*b*2 of the two channels 233*b*1 and 233*b*2 of the third rotor housing cover 233 may be located on the fourth quadrant. One 234*b*1 of the two channels 234*b*1 and 234*b*2 of the fourth rotor housing cover 234 may be located on the first quadrant, and another one 234*b*2 of the two channels 234*b*1 and 234*b*2 of the fourth rotor housing cover 234** may be located on the third quadrant.

As the two channels **231*b*1 and 231*b*2 of the first rotor housing cover 231 and the two channels 233*b*1 and 233*b*2 of the third rotor housing cover 233 are located on the second quadrant and the fourth quadrant, the two channels 231*b*1 and 231*b*2 of the first rotor housing cover 231 and the two channels 233*b*1 and 233*b*2 of the third rotor housing cover 233 may be located on positions overlapping each other in the axial direction. In addition, the two channels 231*b*1 and 231*b*2 of the first rotor housing cover 231 and the two channels 233*b*1 and 233*b*2 of the third rotor housing cover 233 may also overlap each other even in terms of shape in the axial direction. In other words, the two channels 231*b*1 and 231*b*2 of the first rotor housing cover 231 and the two channels 233*b*1 and 233*b*2 of the third rotor housing cover 233 may have the same shape and may be arranged to overlap each other in a direction of viewing the rotating shaft 210** from one end toward another end.

In addition, as the two channels **232*b*1 and 232*b*2 of the second rotor housing cover 232 and the two channels 234*b*1 and 234*b*2 of the fourth rotor housing cover 234 are located on the first quadrant and the third quadrant, the two channels 232*b*1 and 232*b*2 of the second rotor housing cover 232 and the two channels 234*b*1 and 234*b*2 of the fourth rotor housing cover 234 may be at positions overlapping each other in the axial direction. In addition, the two channels 232*b*1 and 232*b*2 of the second rotor housing cover 232 and the two channels 234*b*1 and 234*b*2 of the fourth rotor housing cover 234 may also overlap each other even in terms of shape in the axial direction. In other words, the two channels 232*b*1 and 232*b*2 of the second rotor housing cover 232 and the two channels 234*b*1 and 234*b*2 of the fourth rotor housing cover 234 may have the same shape and may be arranged to overlap each other in a direction of viewing the rotating shaft 210** from one end toward another end.

Here, the shapes of the two channels **231*b*1 and 231*b*2, and 233*b*1 and 233*b*2 of the first and third rotor housing covers 231 and 233 and the shapes of the two channels 232*b*1 and 232*b*2, and 234*b*1 and 234*b*2 of the second and fourth rotor housing covers 232 and 234 may be symmetrical with respect to a straight line corresponding to x=0 on the quadrants. In other words, the channels formed inside the fluid transfer apparatus 200 may be symmetrical, like the first rotor 271 and the second rotor 272, thereby greatly reducing generation of vibration due to the operation of the fluid transfer apparatus 200**.

Shapes of the two channels **231*b*1 and 231*b*2 of the first rotor housing cover 231 viewed from opposite sides of the first rotor housing cover 131 may be the same as each other. Shapes of the two channels 232*b*1 and 232*b*2 of the second rotor housing cover 232 viewed from opposite sides of the second rotor housing cover 232 may be the same as each other. Shapes of the two channels 233*b*1 and 233*b*2 of the third rotor housing cover 233 viewed from opposite sides of the third rotor housing cover 233 may be the same as each other. Shapes of the two channels 234*b*1 and 234*b*2 of the fourth rotor housing cover 234 viewed from opposite sides of the fourth rotor housing cover 234 may be the same as each other. Therefore, it may be said that the two channels 231*b*1 and 231*b*2 of the first rotor housing cover 231, the two channels 232*b*1 and 232*b*2 of the second rotor housing cover 232, the two channels 233*b*1 and 233*b*2 of the third rotor housing cover 233, and the two channels 234*b*1 and 234*b*2 of the fourth rotor housing cover 234** are formed through the circular plates or the polygonal plates while maintaining the shape in the axial direction.

The channel housing 223 may have a fluid communication space **223*b*1, 223*b*2, and the fluid communication space 223*b*1, 223*b*2 may include a first communication space 223*b*1 and a second communication space 223*b*2. The channel housing 223 may serve to transfer fluid introduced through the channel 232*b*1 of the second rotor housing cover 232 to the channel 233*b*1 of the third rotor housing cover 233 through the first communication space 223*b*1 and transfer fluid introduced through the channel 232*b*2 of the second rotor housing cover 232 to the channel 233*b*2 of the third rotor housing cover 233 through the second communication space 223*b*2**.

The first communication space **223*b*1 may be configured such that the channel 232*b*1 on the first quadrant of the two channels 232*b*1 and 232*b*2 of the second rotor housing cover 232 communicates with the channel 233*b*1 on the second quadrant of the two channels 233*b*1 and 233*b*2 of the third rotor housing cover 233**.

The second communication space **223*b*2 may be configured such that the channel 232*b*2 on the third quadrant of the two channels 232*b*1 and 232*b*2 of the second rotor housing cover 232 communicate with the channel 233*b*2 on the fourth quadrant of the two channels 233*b*1 and 233*b*2 of the third rotor housing cover 233. Also, the first communication space 223*b*1 and the second communication space 223*b*2 may be formed in the same shape so as to have a point symmetry with respect to the rotating shaft 210. In addition, the shape of the first communication space 223*b*1 and the shape of the second communication space 223*b*2** may be symmetrical to each other with respect to a straight line corresponding to y=0 on the quadrants.

With this structure, the first fluid entrance **241*a* and the second fluid entrance 242*a* may not communicate with each other while the volumes of the variable-volume spaces formed in the first rotor housing 221 and the volume of the variable-volume spaces formed in the second rotor housing 222 are changing. Therefore, fluid can be transferred without a check valve only by the rotation of the first rotor 271 and the second rotor 272**, unlike the related art that check valves are essential for operations of a rotor piston pump and a vacuum self-priming buster pump.

On the other hand, the fluid entrance housings 241 and 242 may be disposed at both outermost sides of the fluid transfer apparatus 200, respectively. The fluid entrance housings 241 and 242 may define a part of the outer circumferential surface of the fluid transfer apparatus 200 and both side surfaces of the fluid transfer apparatus 200. The both side surfaces may be upper and lower surfaces depending on an installation direction of the fluid transfer apparatus 200.

The first fluid entrance housing 241 and the second fluid entrance housing 242 may have a shape of a rectangular column with rounded corners. The first fluid entrance housing 241 may be opened toward the first rotor housing cover 231 and the second fluid entrance housing 242 may be opened toward the fourth rotor housing cover 234. The opening of each of the first fluid entrance housing 241 and the second fluid entrance housing 242 may correspond to a portion where one of bottom surfaces of the rectangular column is formed.

When fluid is introduced through the first fluid entrance 241*a* formed at the first fluid entrance housing 241, the rotating shaft 210 may rotate in a first direction, which is a clockwise direction. While the rotating shaft 210 rotates in the first direction, the fluid introduced through the first fluid entrance 241*a* of the first fluid entrance housing 241 may be compressed sequentially in the first fluid compression space V1 and the second fluid compression space V2, and then discharged through the second fluid entrance 242*a* of the second fluid entrance housing 242.

On the other hand, when fluid is introduced through the second fluid entrance 242*a* formed at the second fluid entrance housing 242, the rotating shaft 210 may rotate in a second direction, which is opposite to the first direction. While the rotating shaft 210 rotates in the second direction, the fluid introduced through the second fluid entrance 242*a* of the second fluid entrance housing 242 may be compressed sequentially in the second fluid compression space V2 and the first fluid compression space V1, and then discharged through the second fluid entrance 241*a* of the first fluid entrance housing 241.

Hereinafter, the operation of the fluid transfer apparatus 200 will be described.

Figure 22:
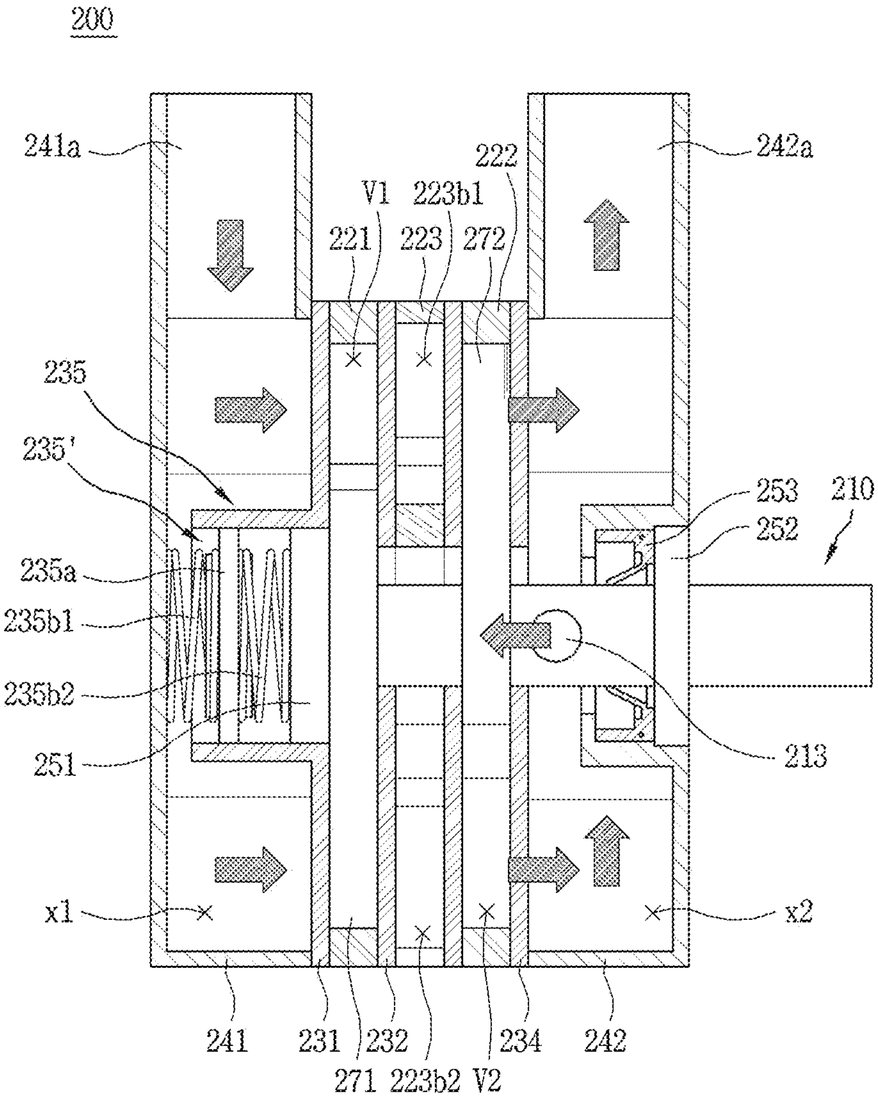
FIG. 22 is a conceptual view illustrating a process in which fluid is transferred in the fluid transfer apparatus illustrated in FIG. 14.

FIG. 22 is a conceptual view illustrating a process of transferring fluid in the fluid transfer apparatus 200 illustrated in FIG. 14.

FIGS. 23A and 23B are conceptual views sequentially illustrating processes of discharging fluid introduced into the fluid transfer apparatus 200 illustrated in FIG. 14.

For the description of the operation of the fluid transfer apparatus 200, FIGS. 23A and 23B illustrate an initial state in which fluid is filled inside the rotor housings 221 and 222. In addition, a discharged fluid is indicated by a hatched line, and an introduced fluid is a portion without a hatch.

First, a drawing (1) is an initial state before the fluid transfer apparatus 200 is operated, a drawing (2) is a state in which the rotating shaft 210 rotated 90° in a clockwise direction, and drawings (3) and (4) are states in which the rotating shaft 210 rotated 180° and 270°, respectively. When the rotating shaft 210 rotates 360°, it may be the same as in the drawing (1).

As shown in the drawing (1), when the rotating shaft 110 starts to rotate clockwise from the initial state, the fluid in the first rotor housing 221 may flow into the fluid communication space 223*b*2 of the channel housing 223 through the channel 232*b*2 of the second rotor housing cover 232 so as to be transferred to the second rotor housing 222 through the channel 233*b*2 of the third rotor housing cover 233, and may be discharged to the second fluid entrance housing 242 through the channel 234*b*2 of the fourth rotor housing cover 234. At the same time, the fluid in the second rotor housing 222 may be discharged to the second fluid entrance housing 242 through the channel 234*b*1 of the fourth rotor housing cover 234.

When the rotating shaft 210 continues to rotate over 90°, the space through which the fluid is discharged may be shown in the drawing (2). That is, the fluid in the first rotor housing 221 may flow into the fluid communication space 223*b*1 of the channel housing 223 through the channel 232*b*1 of the second rotor housing cover 232 so as to be transferred to the second rotor housing 222 through the channel 233*b*1 of the third rotor housing cover 233, and may be discharged to the second fluid entrance housing 242 through the channel 234*b*1 of the fourth rotor housing cover 234. At the same time, the fluid of the second rotor housing 222 may be discharged to the second fluid entrance housing 242 through the channel 234*b*2 of the fourth rotor housing cover 234. Afterward, a state when the rotating shaft 210 rotates over 180° may be as shown in the drawing (3), and a state when the rotating shaft 210 rotates over 270° may be as shown in the drawing (4). Then, as the rotating shaft 210 rotates, the outflow of the fluid may be continuously repeated. Since the fluid in the first rotor housing 221 and the fluid in the second rotor housing 222 are discharged at the same time as described above, an amount of fluid transferred when the rotating shaft rotates by one turn (rotation) can be large, compared to the rotary piston pump and vacuum self-priming buster pump having the rotor, the rotor housing, and the check valve according to the related art. At the same time, an inflow of fluid may occur along with an outflow of fluid, and the inflow and outflow of the fluid may occur in the same manner.

During the process of going back to the position of the drawing (1) sequentially via those states of the drawings (1) to (4), the rotating shaft 210 may rotate 360°. While the rotating shaft 210 rotates, the fluid may be transferred through the repetitive increase and decrease in volume of each variable-volume space. During the process, the first fluid entrance 241*a* and the second fluid entrance 242*a* may always be blocked from each other. For example, referring to FIG. 22, while the first rotor 271 and the second rotor 272 are rotating, the channel 231*b*1, which is an inflow channel of the fluid, may be always blocked from the channel 234*b*1, which is an outflow channel, and the inflow channel 231*b*2 may always be blocked from the outflow channel 234*b*2.

Therefore, the fluid transfer apparatus 200 of the present disclosure can continuously transfer fluid from the first fluid entrance 241*a* to the second fluid entrance 242*a* or vice versa in the state in which the first fluid entrance 241*a* and the second fluid entrance 242*a* do not directly communicate with each other. This may result in achieving excellent vacuum and pressurization performance without the need for a check valve.

Figure 24:
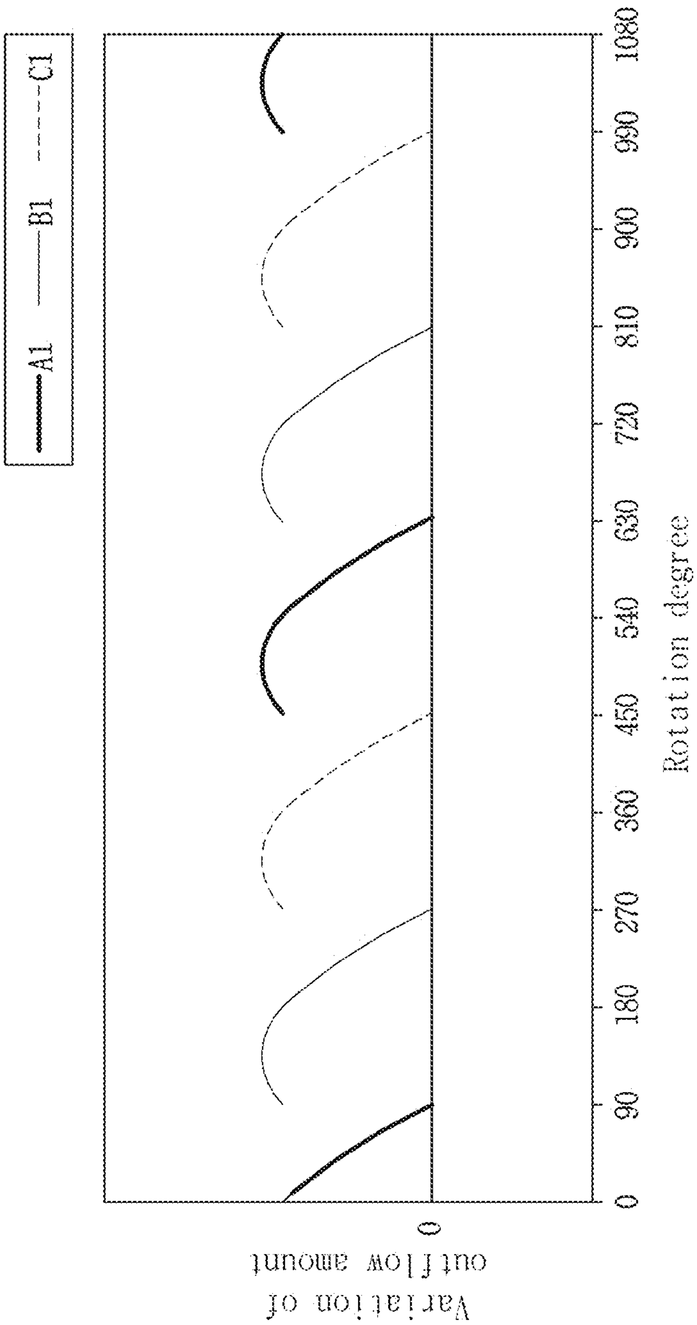
FIG. 24 is a graph showing a variation of an outflow amount of fluid occurred according to a rotation angle of a rotating shaft in a first rotor housing illustrated in FIG. 14.
Figure 25:
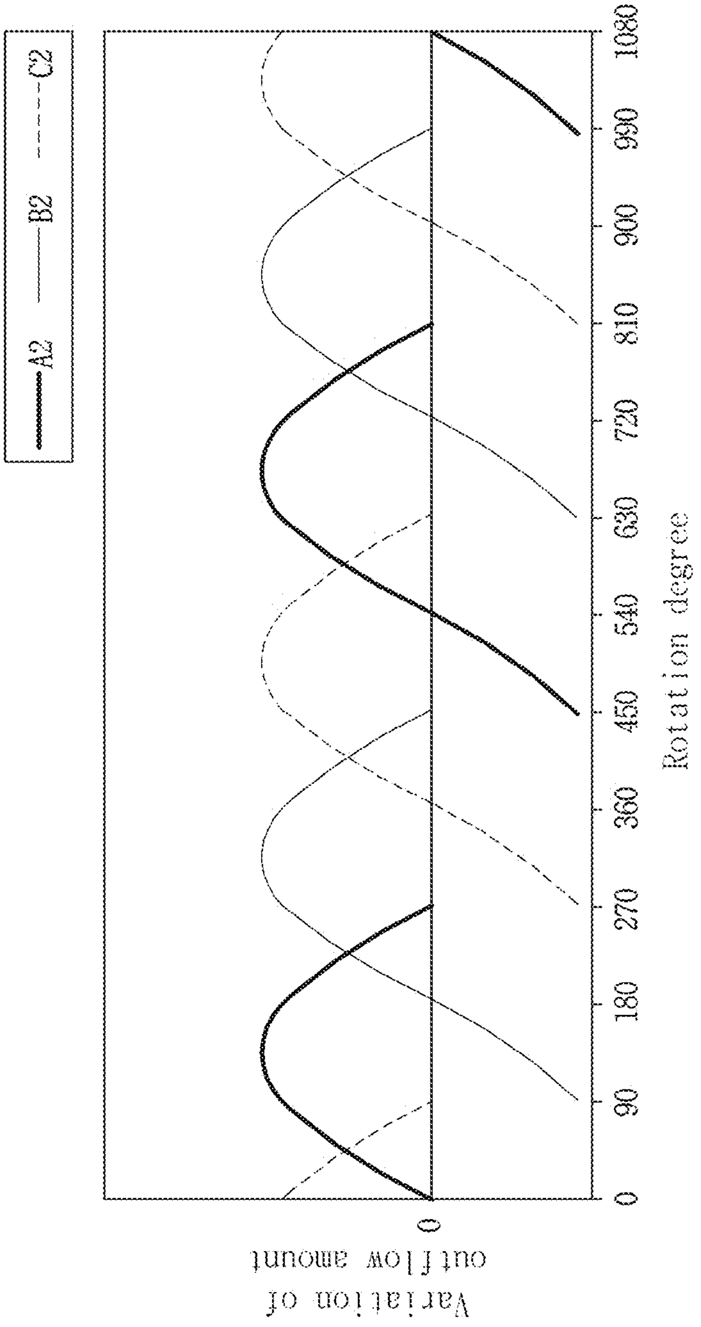
FIG. 25 is a graph showing a variation of an outflow amount of fluid occurred according to a rotation angle of a rotating shaft in a second rotor housing illustrated in FIG. 14.

As described above, the changes in volume of the variable-volume spaces occurred due to the eccentric rotation of the rotors 271 and 272 inside the rotor housing 221 and 222 having the epitrochoid surfaces may follow a sinusoidal curve as shown in FIGS. 24 and 25. The outflow amount generated in each of the first rotor housing 221 and the second rotor housing 222 may be expressed as shown in FIGS. 24 and 25.

FIG. 24 is a graph showing a variation of an outflow amount of fluid occurred according to a rotation angle of the rotating shaft in the first rotor housing 221 illustrated in FIG. 14.

FIG. 25 is a graph showing a variation of an outflow amount of fluid occurred according to a rotation angle of the rotating shaft in the second rotor housing 222 illustrated in FIG. 14.

Figure 26:
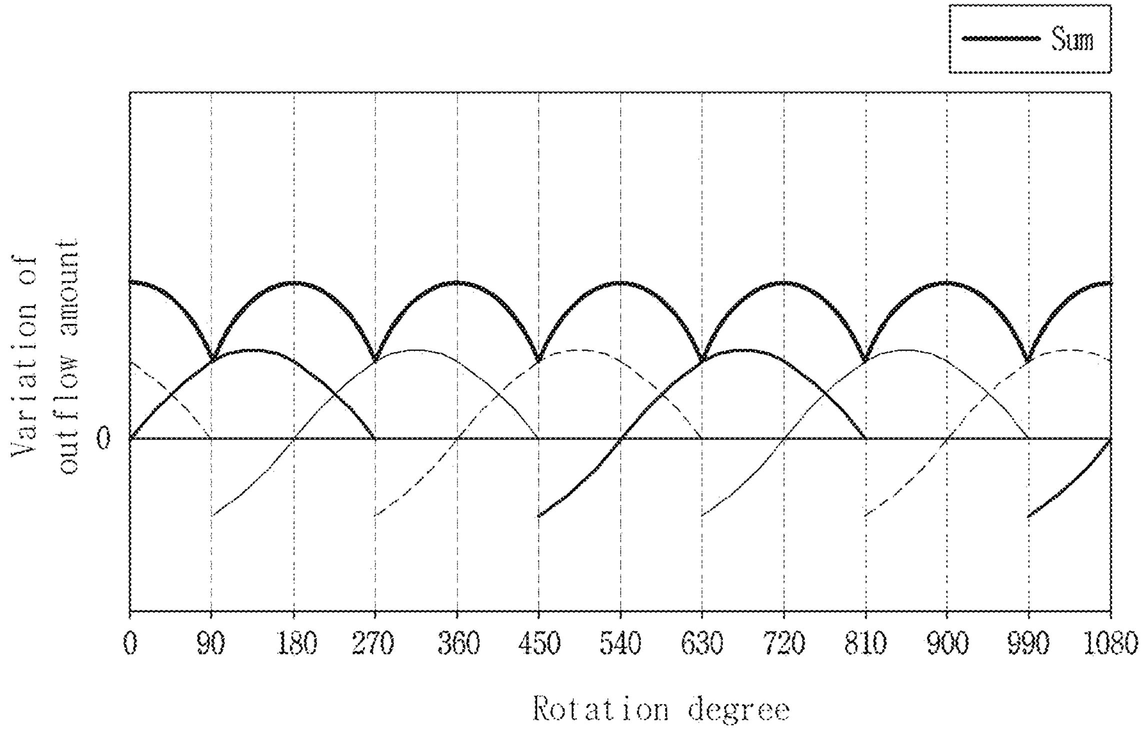
FIG. 26 is a graph showing a variation of the sum of outflow amounts of fluids generated in the first and second rotor housings illustrated in FIGS. 24 and 25.

FIG. 26 is a graph showing a variation of the sum of outflow amounts of fluid occurred in the first and second rotor housings 221 and 222 illustrated in FIGS. 25 and 26.

As shown in FIG. 26, a variation of an outflow amount of fluid in the fluid transfer apparatus 200 may have a constant amplitude and the fluid may be discharged through the first fluid entrance 241*a* or the second fluid entrance 242*a*. That is, the variation of the outflow amount may cause a pulsation of the fluid transfer apparatus 200. Here, the pulsation means a movement that occurs periodically like a pulse.

Hereinafter, a pulsation reducing unit 235 for reducing a pulsation generated in the fluid transfer apparatus 200 will be described.

The fluid transfer apparatus 200 may further include a pulsation reducing unit 235 configured to reduce a pulsation caused by variations of an inflow amount and an outflow amount of fluid according to volume variations in the first and second rotor housings 221 and 222.

The pulsation reducing unit 235 may include a connection channel 213 and a response portion 235'.

The connection channel 213 may connect the fluid entrance spaces X1 and X2 of the first fluid entrance housing 241 and the second fluid entrance housing 242 to each other to provide a movement path of fluid. For example, the connection channel 213 may be formed through the rotating shaft 210 inserted through the fluid transfer apparatus 200. The structure in which the connection channel 213 is formed through the rotating shaft 210 is one implementation of the connection channel 213. Although not shown in the drawings, the connection channel 213 may alternatively be implemented to connect a part of the first fluid entrance 241*a* and a part of the second fluid entrance 242*a* so as to connect the fluid entrance spaces X1 and X2.

Referring to FIGS. 27A and 27B, the response portion 235' may be disposed at one point on the connection channel 213 to divide the connection channel 213 into two regions, and configured to move on the connection channel 213 according to variations of an inflow amount and an outflow amount of fluid in the fluid entrance spaces X1 and X2 so as to vary the volumes of the fluid entrance spaces X1 and X2. The response portion 235' may include a piston 235*a* disposed to block one point of the connection channel 213. The pulsation reducing unit 235 may be configured such that the piston 235*a* moves on the connection channel 213 according to the variations of the inflow amount and the outflow amount of fluid in the fluid entrance spaces X1 and X2 so as to vary the volumes of the fluid entrance spaces X1 and X2.

In addition, the piston 235*a* provided in the response portion 235' may be disposed to block one point of a pulsation response tube 231*c* provided in the first rotor housing cover 231.

The piston 235*a* may be disposed to block one point of the connection channel 213. However, even when a predetermined gap is present between the piston 235*a* and the connection channel 213, the operation of the piston 235*a* may be allowed. Accordingly, the piston 235*a* may be formed so as not to completely divide the connection channel 213 into two regions.

The pulsation response pipe 231*c* may protrude toward the fluid entrance space X1, and may have one side communicating with the fluid entrance space X1, X2, and another side communicating with the connection channel 213. The pulsation response tube 231*c* may protrude toward the first fluid entrance space X1 or the second fluid entrance space X2. However, when the pulsation response tube 231*c* protrudes toward the second fluid entrance space X2, the pulsation response tube 231*c* may be formed in the fourth rotor housing cover 234 other than the first rotor housing cover 231.

In the description of the present disclosure, a case in which the pulsation response tube 131*c* protrudes toward the first fluid entrance space X1 will be described as an example.

On the other hand, the response portion 235' may be implemented with only the piston 235*a*, but may alternatively further include a first elastic body 235*b*1 and a second elastic body 235*b*2 in addition to the piston 235*a*.

The first elastic body 235*b*1 and the second elastic body 235*b*2 may be respectively disposed on both sides of the piston 235*a* to elastically press the piston 235*a* in opposite directions. The first elastic body 235*b*1 and the second elastic body 235*b*2 may be configured as springs, for example. One side of the first elastic body 235*b*1 may be supported by being in contact with an inner surface of the first fluid entrance housing 241 and another side may be supported by being in contact with one side of the piston 235*a*. Similarly, one side of the second elastic body 235*b*2 may be supported by being in contact with another side of the piston 235*a* and another side may be supported by being in contact with one surface of the bearing 251.

Also, the response portion 235' may be configured to include only one of the first elastic body 235*b*1 and the second elastic body 235*b*2.

According to the configuration of the pulsation reducing unit 235 as described above, the piston 235*a* may move to the left or right on the connection channel 213, in response to pressure transferred through the connection channel 213, when pressure is generated at the left side of the piston 235*a*, namely, in the first fluid entrance space X1 or at the right side of the piston 235*a*, namely, in the second fluid entrance space X2. The movement of the piston 235*a* according to the pressure change may vary the volumes of the first fluid entrance space X1 and the second fluid entrance space X2 in real time. If the piston 235*a* is not provided in the response portion 235', the fluid entrance spaces X1 and X2 may communicate with each other and thereby fluid discharged to the second fluid entrance space X2 may flow back into the first entrance space X1 through the connection channel 213. As a result, the fluid cannot be transferred. In addition, if the piston 235*a* of the response portion 235' is fixed, fluid may be transferred but the fluid discharged into the fluid entrance space X2 may cause a pulsation as shown in FIG. 26.

As described above, the fluid transfer of the fluid transfer apparatus 200 can be achieved by the volume variation due to the eccentric rotation of the first rotor 271 and the second rotor 272 located in the first rotor housing 221 and the second rotor housing 222. Fluid introduced into the first fluid entrance space X1 of the first fluid entrance housing 241 through the first fluid entrance 241*a* can flow into the first rotor housing 221 and the second rotor housing 222 through the channels 231*b*1 and 231*b*2 of the first rotor housing cover 231 so as to be introduced into the second fluid entrance space X2 of the second fluid entrance housing 242 through the channels 234*b*1 and 234*b*2 of the fourth rotor housing cover 234. Thereafter, the fluid may be discharged through the second fluid entrance 242*a* provided in the second fluid entrance housing 242.

Here, since the second fluid entrance housing 242 communicates with the pulsation response tube 231*c* of the first rotor housing cover 231 through the connection channel 213 formed through the rotating shaft 210, fluid may partially come in contact with the piston 235*a* located in the pulsation response tube 231*c*. The piston 235*a* may respond to the pulsation while being moved by a volume of a transferred fluid in a direction of increasing or expanding the volume of the second fluid entrance space X2. The pulsation generated in the fluid transfer apparatus 200 can be canceled by the operation of the pulsation reducing unit 235. In addition, the variation of the outflow amount of fluid is the same as the variation of the inflow amount of fluid. Therefore, the pulsation may be generated in the first fluid entrance 241*a* even according to the variation of the inflow amount of the fluid, but may also be canceled by the movement of the piston 235*a*.

Referring back to FIGS. 23A, 23B, and 26, when the rotating shaft 210 starts to rotate in the clockwise direction from the initial state as shown in the drawing (1), the outflow amount of fluid in the second fluid entrance housing 242 may decrease from the maximum to the minimum so that the piston 235*a* can be moved to the right from a state moved to the left. As the rotation proceeds as shown in the drawing (2), the outflow amount of fluid may increase from the minimum to the maximum, so that the piston 235*a* can be moved back to the left from the right. When the rotating shaft 210 continues to rotate, the piston 235*a* may reciprocate as shown in the drawings (3) and (4). Accordingly, the volumes of the fluid entrance spaces X1 and X2 may vary by the variation of the inflow and outflow of the fluid, thereby remarkably reducing the pulsation.

This may result in greatly reducing the pulsation phenomenon that inevitably occurs in the fluid transfer apparatus which uses the rotor housings each having the epitrochoid surface and the triangular rotor rotating eccentrically.

On the other hand, when the rotating shaft 210 of the fluid transfer apparatus 200 rotates and operates, a side, namely, the first fluid entrance 241*a* through which fluid is introduced may always have negative pressure, and in this case, the second fluid entrance 242*a* through which the fluid is discharged may have positive pressure. That is, since pressure in an inflow direction (left) of fluid is lower than pressure in an outflow direction (right) of fluid based on the piston 235*a*, the center point of the reciprocating motion of the piston 235*a* may be shifted to the inflow direction of the fluid. As described above, when outflow pressure of fluid increases, a phenomenon in which the piston 235*a* is brought into close contact with an inner side of the first fluid entrance housing 241 may occur, which may cause the function of the pulsation reducing unit 235 to be deteriorated.

Accordingly, as shown in FIG. 27C, at least one of the first elastic body 235*b*1 and the second elastic body 235*b*2 may be provided with a first portion and a second portion each having a different magnitude of elastic force. For example, the first elastic body 235*b*1 may include a first portion 235*b*1' having relatively weak elastic force and a second portion 235*b*" having relatively strong elastic force. A support plate 235*c* which has both surfaces supporting the first portion 235*b*1' and the second portion 235*b*" of the first elastic body 235*b*1, respectively, may be disposed between the first portion 235*b*1' and the second portion 235*b*". In addition, a groove 241*b* may be recessed in the axial direction into the first fluid entrance housing 241 to accommodate the first portion 235*b*1'.

As such, with the two-stage configuration of the first elastic body 235*b*1 and the second elastic body 235*b*2, the piston 235*a* can be prevented from moving to the first fluid entrance space X1 having relatively low pressure even though outflow pressure of fluid increases. Accordingly, the piston 235*a* can perform its function stably even when a difference in pressure between the first fluid entrance space X1 and the second fluid entrance space X2 increases or decreases.

The foregoing description is merely exemplary, and various changes and variations may be made by those skilled in the art to which the present disclosure pertains, without departing from the scope and technical idea of the described implementations. The foregoing implementations may be implemented individually or in any combination.

INDUSTRIAL AVAILABILITY

The present disclosure can be used in industrial fields related to fluid transfer apparatuses.

The invention claimed is:

1. A fluid transfer apparatus comprising:

a rotating shaft having a rotation unit extending in an axial direction, and a first eccentric unit and a second eccentric unit disposed to be spaced apart from each other along the axial direction;

a first rotor housing defining a first fluid compression space having an epitrochoid shape;

a second rotor housing defining a second fluid compression space having an epitrochoid shape, and disposed to be spaced apart from the first rotor housing in the axial direction;

a first rotor disposed in the first fluid compression space so as to divide the first fluid compression space into a plurality of variable-volume spaces, and coupled to the first eccentric unit while surrounding the first eccentric unit in a radial direction of the first eccentric unit;

a first rotor housing cover configured to cover the first fluid compression space and disposed at one side of the first rotor housing;

a second rotor disposed in the second fluid compression space so as to divide the second fluid compression space into a plurality of variable-volume spaces, and coupled to the second eccentric unit while surrounding the second eccentric unit in a radial direction of the second eccentric unit;

a second rotor housing cover configured to cover the first fluid compression space and fluid communication space and disposed between the first rotor housing and the second rotor housing; and a third rotor housing cover configured to cover the second fluid compression space, and disposed at an opposite side of the second rotor housing cover with respect to the second rotor housing, wherein fluid accommodated in the first fluid compression space is transferred to the second fluid compression space or vice versa according to a rotating direction of the rotating shaft, wherein the first eccentric unit and the second eccentric unit are disposed to have an angle of 90° with respect to the rotation unit, wherein the first rotor housing and the second rotor housing are disposed to have an angle of 90° with respect to the rotation unit, and wherein the first rotor housing cover, the second rotor housing cover, and the third rotor housing cover each comprises:

a rotating shaft through hole formed in the axial direction through a center of a plate defining the first rotor housing cover, the second rotor housing cover, and the third rotor housing cover to accommodate the rotation unit; and two channels formed symmetrically to each other with respect to the rotating shaft through hole and allowing fluid to pass therethrough in the axial direction, wherein, when the rotating shaft through holes are located at a center of quadrants in a direction of viewing the rotating shaft from one end to another end, one of the two channels of the first rotor housing cover is located on a second quadrant and another one is located on a fourth quadrant, one of the two channels of the second rotor housing cover is located on a first quadrant and another one is located on a third quadrant, and one of the two channels of the third rotor housing cover is located on the fourth quadrant and another one is located on the second quadrant.

2. The fluid transfer apparatus of claim 1, wherein the second rotor housing cover has a first surface facing the first rotor and a second surface facing the second rotor, wherein one of the two channels of the second rotor housing cover corresponds to a first channel and another one corresponds to a second channel, wherein a shape of the first channel exposed to the first surface and a shape of the first channel exposed to the second surface are symmetric to each other with respect to a straight line corresponding to y=x on the first, second, third and fourth quadrants, and wherein a shape of the second channel exposed to the first surface and a shape of the second channel exposed to the second surface are symmetric to each other with respect to a straight line corresponding to y=x on the first, second, third and fourth quadrants.

3. A fluid transfer apparatus comprising:

a rotating shaft having a rotation unit extending in an axial direction, and a first eccentric unit and a second eccentric unit disposed to be spaced apart from each other along the axial direction;

a first rotor housing defining a first fluid compression space having an epitrochoid shape;

a second rotor housing defining a second fluid compression space having an epitrochoid shape, and disposed to be spaced apart from the first rotor housing in the axial direction;

a first rotor disposed in the first fluid compression space so as to divide the first fluid compression space into a plurality of variable-volume spaces, and coupled to the first eccentric unit while surrounding the first eccentric unit in a radial direction of the first eccentric unit;

a first rotor housing cover configured to cover the first fluid compression space and disposed at one side of the first rotor housing;

a second rotor disposed in the second fluid compression space so as to divide the second fluid compression space into a plurality of variable-volume spaces, and coupled to the second eccentric unit while surrounding the second eccentric unit in a radial direction of the second eccentric unit;

a second rotor housing cover configured to cover the first fluid compression space and fluid communication space and disposed between the first rotor housing and the second rotor housing; and a third rotor housing cover configured to cover the second fluid compression space, and disposed at an opposite side of the second rotor housing cover with respect to the second rotor housing, wherein fluid accommodated in the first fluid compression space is transferred to the second fluid compression space or vice versa according to a rotating direction of the rotating shaft, wherein the first eccentric unit and the second eccentric unit are disposed to have an angle of 90° with respect to the rotation unit, wherein the first rotor housing and the second rotor housing are disposed to have an angle of 90° with respect to the rotation unit, wherein the first rotor firstly compresses fluid flowing into the first fluid compression space and the second rotor secondarily compresses the fluid flowing into the second fluid compression space from the first fluid compression space, while the rotating shaft rotates in a first direction, wherein the second rotor firstly compresses fluid flowing into the second fluid compression space and the first rotor secondarily compresses the fluid flowing into the first fluid compression space from the second fluid compression space, while the rotating shaft rotates in a second direction opposite to the first direction, wherein the first eccentric unit rotates eccentrically ahead of the second eccentric unit by 90° while the rotating shaft rotates in the first direction, and wherein the second eccentric unit rotates eccentrically ahead of the first eccentric unit by 90° while the rotating shaft rotates in the second direction.

4. A fluid transfer apparatus comprising:

a rotating shaft having a rotation unit extending in an axial direction, and a first eccentric unit and a second eccentric unit disposed to be spaced apart from each other along the axial direction;

a first rotor housing defining a first fluid compression space having an epitrochoid shape;

a second rotor housing defining a second fluid compression space having an epitrochoid shape, and disposed to be spaced apart from the first rotor housing in the axial direction;

a first rotor disposed in the first fluid compression space so as to divide the first fluid compression space into a plurality of variable-volume spaces, and coupled to the first eccentric unit while surrounding the first eccentric unit in a radial direction of the first eccentric unit;

a first rotor housing cover configured to cover the first fluid compression space and disposed at one side of the first rotor housing;

a second rotor disposed in the second fluid compression space so as to divide the second fluid compression space into a plurality of variable-volume spaces, and coupled to the second eccentric unit while surrounding the second eccentric unit in a radial direction of the second eccentric unit;

a second rotor housing cover configured to cover the first fluid compression space and fluid communication space and disposed between the first rotor housing and the second rotor housing; and a third rotor housing cover configured to cover the second fluid compression space, and disposed at an opposite side of the second rotor housing cover with respect to the second rotor housing, wherein fluid accommodated in the first fluid compression space is transferred to the second fluid compression space or vice versa according to a rotating direction of the rotating shaft, wherein the first eccentric unit and the second eccentric unit are disposed to have an angle of 90° with respect to the rotation unit, wherein the first rotor housing and the second rotor housing are disposed to have an angle of 90° with respect to the rotation unit, and wherein the rotating shaft comprises:

an axial hole formed through at least one of the first eccentric unit and the second eccentric unit in the axial direction;

a radial hole formed through at least one of the first eccentric unit and the second eccentric unit so that an outer circumferential surface of the first eccentric unit and an inner circumferential surface of the axial hole communicate with each other or an outer circumferential surface of the second eccentric unit and an inner circumferential surface of the axial hole communicate with each other; and a circumferential groove formed in at least one of the first eccentric unit and the second eccentric unit to correspond to the radial hole.

5. The fluid transfer apparatus of claim 4, wherein at least one of the first rotor and the second rotor is formed in a shape of a triangular prism having three rounded edges, and wherein at least one of the first rotor and the second rotor comprises a body and vanes, wherein the body comprises:

an accommodating portion formed through a center of the triangular prism having the rounded edges in the axial direction to accommodate the first eccentric unit or the second eccentric unit;

vane slots formed in vertexes of the triangular prism having the rounded edges, respectively, in a radial direction; and vane slot holes formed in the radial directions at positions corresponding to the circumferential groove so that outer circumferential surfaces of the vane slots and an inner circumferential surface of the accommodating portion communicate with each other, and wherein the vanes are inserted into the vane slots, and move together with the body in a state of being in close contact with an inner circumferential surface of the first rotor housing or an inner circumferential surface of the second rotor housing by pressure applied through the vane slot holes.

6. The fluid transfer apparatus of claim 5, wherein each of the vanes is provided with a rod coupling hole at a position facing a vane slot hole of the vane slot holes in the radial directions of the first rotor or the second rotor, and wherein each of the vanes is fixed in the axial direction by a vane rod inserted into the rod coupling hole and the vane slot hole.

7. A fluid transfer apparatus comprising:

a rotating shaft having a rotation unit extending in an axial direction, and a first eccentric unit and a second eccentric unit disposed to be spaced apart from each other along the axial direction;

a first rotor housing defining a first fluid compression space having an epitrochoid shape;

a second rotor housing defining a second fluid compression space having an epitrochoid shape, and disposed to be spaced apart from the first rotor housing in the axial direction;

a first rotor disposed in the first fluid compression space so as to divide the first fluid compression space into a plurality of variable-volume spaces, and coupled to the first eccentric unit while surrounding the first eccentric unit in a radial direction of the first eccentric unit;

a second rotor disposed in the second fluid compression space so as to divide the second fluid compression space into a plurality of variable-volume spaces, and coupled to the second eccentric unit while surrounding the second eccentric unit in a radial direction of the second eccentric unit;

a first fluid entrance housing and a second fluid entrance housing defining fluid entrance spaces and disposed at positions spaced apart from the first rotor housing and the second rotor housing in the axial direction, respectively; and a pulsation reducing unit configured to reduce a pulsation caused by variations of an inflow amount and an outflow amount of fluid due to a volume variation in the first and second rotor housings, wherein fluid accommodated in the first fluid compression space is transferred to the second fluid compression space or vice versa according to a rotating direction of the rotating shaft, and wherein the pulsation reducing unit comprises:

a connection channel connecting the fluid entrance spaces of the first and second fluid entrance housings to each other so as to provide a movement path of the fluid; and a response portion disposed at one point on the connection channel to divide the connection channel into two regions, and configured to move on the connection channel according to the variations of the inflow amount and the outflow amount of the fluid in the fluid entrance spaces so as to change volumes of the fluid entrance spaces.

8. The fluid transfer apparatus of claim 7, wherein the connection channel is formed through the rotating shaft.

9. The fluid transfer apparatus of claim 7, wherein the response portion is provided with a piston disposed to block one point of the connection channel, and wherein the piston moves in the connection channel according to the variations of the inflow amount and the outflow amount of the fluid in the fluid entrance spaces so as to change volumes of the fluid entrance spaces.

10. The fluid transfer apparatus of claim 9, wherein the response portion is further provided with a first elastic body and a second elastic body disposed at both sides of the piston to elastically press the piston in opposite directions.

11. The fluid transfer apparatus of claim 10, wherein at least one of the first elastic body and the second elastic body is provided with a first portion and a second portion each having a different magnitude of elastic force.

12. A fluid transfer apparatus comprising:

a rotating shaft having a rotation unit extending in an axial direction, and a first eccentric unit and a second eccentric unit disposed to be spaced apart from each other along the axial direction;

a first rotor housing defining a first fluid compression space having an epitrochoid shape;

a second rotor housing defining a second fluid compression space having an epitrochoid shape, and disposed to be spaced apart from the first rotor housing in the axial direction;

a first rotor disposed in the first fluid compression space so as to divide the first fluid compression space into a plurality of variable-volume spaces, and coupled to the first eccentric unit while surrounding the first eccentric unit in a radial direction of the first eccentric unit;

a second rotor disposed in the second fluid compression space so as to divide the second fluid compression space into a plurality of variable-volume spaces, and coupled to the second eccentric unit while surrounding the second eccentric unit in a radial direction of the second eccentric unit;

a channel housing defining fluid communication spaces and disposed between the first rotor housing and the second rotor housing;

a first rotor housing cover configured to cover the first fluid compression space and disposed at one side of the first rotor housing;

a second rotor housing cover configured to cover the first fluid compression space and the fluid communication spaces and disposed between the first rotor housing and the channel housing;

a third rotor housing cover configured to cover the fluid communication spaces and disposed between the channel housing and the second rotor housing; and a fourth rotor housing cover configured to cover the second fluid compression space, and disposed at an opposite side of the third rotor housing cover with respect to the second rotor housing, wherein fluid accommodated in the first fluid compression space is transferred to the second fluid compression space or vice versa according to a rotating direction of the rotating shaft, and wherein the channel housing provides a channel so that fluid in the first and second fluid compression spaces moves to the first rotor housing or the second rotor housing through the fluid communication spaces.

13. The fluid transfer apparatus of claim 12, wherein the first rotor and the second rotor are installed to have a point symmetry with respect to the rotating shaft.

14. The fluid transfer apparatus of claim 12, wherein the first eccentric unit and the second eccentric unit are disposed to have an angle of 180° with respect to the rotation unit, wherein the first rotor housing and the second rotor housing are disposed such that epitrochoid curves thereof face the same direction, and wherein the first rotor housing cover, the second rotor housing cover, the third rotor housing cover, and the fourth rotor housing cover each comprises:

a rotating shaft through hole formed in the axial direction through a center of a plate defining the first rotor housing cover, the second rotor housing cover, the third rotor housing cover, and the fourth rotor housing cover to accommodate the rotation unit; and two channels formed symmetrically to each other with respect to the rotating shaft through hole and allowing fluid to pass therethrough in the axial direction.

15. The fluid transfer apparatus of claim 14, wherein, when the rotating shaft through hole are located a center of quadrants in a direction of viewing the rotating shaft from one end toward another end, one of the two channels of the first rotor housing cover is located on a second quadrant and another one is located on a fourth quadrant, one of the two channels of the second rotor housing cover is located on a first quadrant and another one is located on a third quadrant, one of the two channels of the third rotor housing cover is located on the second quadrant and another one is located on the fourth quadrant, and one of the two channels of the fourth rotor housing cover is located on the first quadrant and another one is located on the third quadrant.

16. The fluid transfer apparatus of claim 15, wherein the fluid communication spaces comprise:

a first communication space configured such that the channel on the first quadrant of the two channels of the second rotor housing cover communicates with the channel on the second quadrant of the two channels of the third rotor housing cover; and a second communication space configured such that the channel on the third quadrant of the two channels of the second rotor housing cover communicates with the channel on the fourth quadrant of the two channels of the third rotor housing cover.

17. The fluid transfer apparatus of claim 15, wherein the two channels of the first rotor housing cover and the two channels of the third rotor housing cover have the same shape, and are arranged to overlap each other in a direction of viewing the rotating shaft from one end toward another end, and wherein the two channels of the second rotor housing cover and the two channels of the fourth rotor housing cover have the same shape, and are arranged to overlap each other in the direction of viewing the rotating shaft from the one end toward the another end.

18. The fluid transfer apparatus of claim 17, wherein a shape of the two channels of each of the first and third rotor housing covers and a shape of the two channels of each of the second and fourth rotor housing covers are symmetrical to each other with respect to a straight line corresponding to y=x on the first, second, third and fourth quadrants.

* * * * *